(12) United States Patent
Song

(10) Patent No.: US 12,441,690 B2
(45) Date of Patent: Oct. 14, 2025

(54) BENZAMIDE DERIVATIVE COMPOUND, METHOD FOR PREPARING SAME, AND PHARMACEUTICAL COMPOSITION FOR TREATING OR PREVENTING INFLAMMATORY DISEASE CONTAINING SAME AS ACTIVE INGREDIENT

(71) Applicant: SEOUL NATIONAL UNIVERSITY R&DB FOUNDATION, Seoul (KR)

(72) Inventor: Joon Myong Song, Seoul (KR)

(73) Assignee: SEOUL NATIONAL UNIVERSITY R&DBFOUNDATION, Seoul (KR)

( * ) Notice: Subject to any disclaimer, the term of this patent is extended or adjusted under 35 U.S.C. 154(b) by 493 days.

(21) Appl. No.: 16/764,843

(22) PCT Filed: Nov. 16, 2018

(86) PCT No.: PCT/KR2018/014076
§ 371 (c)(1),
(2) Date: May 16, 2020

(87) PCT Pub. No.: WO2019/098738
PCT Pub. Date: May 23, 2019

(65) Prior Publication Data
US 2020/0339534 A1     Oct. 29, 2020

(30) Foreign Application Priority Data
Nov. 16, 2017  (KR) .......................... 10-2017-0153106

(51) Int. Cl.
| | | |
|---|---|---|
| *C07D 239/34* | (2006.01) | |
| *A61K 31/505* | (2006.01) | |
| *A61K 31/506* | (2006.01) | |
| *A61P 17/04* | (2006.01) | |
| *C07D 239/38* | (2006.01) | |
| *C07D 239/40* | (2006.01) | |
| *C07D 239/42* | (2006.01) | |
| *C07D 239/56* | (2006.01) | |

(52) U.S. Cl.
CPC .......... *C07D 239/38* (2013.01); *A61K 31/505* (2013.01); *A61K 31/506* (2013.01); *A61P 17/04* (2018.01); *C07D 239/34* (2013.01); *C07D 239/40* (2013.01); *C07D 239/56* (2013.01); *C07D 239/42* (2013.01)

(58) Field of Classification Search
CPC .. C07D 401/12; C07D 239/42; C07D 405/12; C07D 239/34; C07D 239/38; C07D 239/40; C07D 239/56; A61P 17/04; A61K 31/505; A61K 31/506
See application file for complete search history.

(56) References Cited

U.S. PATENT DOCUMENTS

| | | | |
|---|---|---|---|
| 7,176,310 B1 | 2/2007 | Baughman et al. | |
| 7,459,460 B2 * | 12/2008 | Yang ................... | C07D 239/42 514/275 |
| 8,236,815 B2 * | 8/2012 | Martinborough .... | A61K 31/506 514/275 |
| 2006/0041006 A1 | 2/2006 | Ibrahim et al. | |
| 2011/0092526 A1 | 4/2011 | Bennett et al. | |
| 2012/0053346 A1 | 3/2012 | Maehr | |

FOREIGN PATENT DOCUMENTS

| | | |
|---|---|---|
| WO | 0073279 A1 | 12/2000 |
| WO | 2004039795 A2 | 5/2004 |
| WO | 2006050476 A2 | 5/2006 |
| WO | 2011065800 A2 | 6/2011 |

OTHER PUBLICATIONS

Song, J. et al. European Journal of Medicinal Chemistry 145 (2018) 673-690.*
CAS Abstract of RN 893308-48-0 (Year: 2006).*
CAS Abstract of RN 893312-07-7 (Year: 2006).*
Journal of Medicinal Chemisry, 1204-1208 (2009) (Yang) (Year: 2009).*
Chemazone: Online Chemical Service of Aurora Fine Chemicals. Product No. 174.959.245. 2-methylsulfanyl-4-phenyl-N-pyridin-4-ylpyrimidine-5-carboxamide. Accessed Jul. 23, 2025. (Year: 2025).*
International Search Report for International application No. PCT/KR2018/014076, Feb. 19, 2019, 7 pages, ISA/KR.
Wang et al., Phosphodiesterase 4B2 Is the Predominant Phosphodiesterase Species and Undergoes Differential Regulation of Gene Expression in Human Monocytes and Neutrophils, Molecular Pharmacology, 1999, pp. 170-174, vol. 56.
Baskaran Purushothaman et al., "Design, synthesis, and biological evaluation of novel catecholopyrimidine based PDE4 inhibitor for the treatment of atopic dermatitis", European Journal of Medicinal Chemistry, Dec. 19, 2017, pp. 673-690, XP055748988, https://www.sciencedirect.com/search?p ub=European%20Journal%20of%20Medicinal%20C hemistry&cid=271932&date=2018&title=catech olopyrimidine.

* cited by examiner

*Primary Examiner* — James H Alstrum-Acevedo
*Assistant Examiner* — Chris E Simmons
(74) *Attorney, Agent, or Firm* — LEYDIG, VOIT & MAYER, LTD.

(57) ABSTRACT

The present invention relates to a benzamide derivative compound, a method for preparing the same, and a pharmaceutical composition for treating or preventing an inflammatory disease containing the same as an active ingredient. The benzamide derivative compound according to the present invention inhibits the expression of PDE4 and regulates the expression of an inflammatory disease-related substance such as IL-4 (interleukin-4), IL-5 (interleukin-4), IFN-γ (interferon-γ), IL-17 (interluekin-17), IgE (immunoglobulin E), and TNF-α (tumor necrosis factor-α), and thus may be utilized as a pharmaceutical composition for treating or preventing an inflammatory disease.

8 Claims, 73 Drawing Sheets

BENZAMIDE DERIVATIVE COMPOUND, METHOD FOR PREPARING SAME, AND PHARMACEUTICAL COMPOSITION FOR TREATING OR PREVENTING INFLAMMATORY DISEASE CONTAINING SAME AS ACTIVE INGREDIENT

CROSS-REFERENCE TO RELATED APPLICATION

This application is a 371 U.S. national stage of PCT/KR2018/014076, filed Nov. 16, 2018, which claims the benefit of Korean Patent Application No. KR 10-2017-0153106 filed Nov. 16, 2017, and the contents of which are incorporated herein by reference.

BACKGROUND OF THE INVENTION

1. Field of the Invention

The present invention relates to a benzamide derivative compound, a method for preparing the same, and a pharmaceutical composition for treating or preventing an inflammatory disease containing the same as an active ingredient.

2. Description of the Related Art

Atopic dermatitis is an inflammatory skin disease most commonly seen in young children, with a prevalence of 10-25% worldwide. Clinical features of atopic dermatitis include eczema, skin lesions, scaling and intolerable itching. The development of atopic dermatitis is related to complex interactions between genetic, environmental, and immunological factors.

Previous studies have reported that increased phosphodiesterase-4B (PDE4B) causes an increase of inflammatory disease mediators in leukocytes of atopic dermatitis patients. Therefore, the decrease of cAMP level can be a factor that exacerbates inflammation in the atopic skin disease. The intracellular cAMP homeostasis is regulated by the synthesis of cAMP by adenylcyclase and the synthesis of cAMP by PDE (phosphodiesterase) in response to extracellular signals.

Phosphodiesterases (PDEs) are enzymes that hydrolyze cAMP and cGMP to 5'AMP and 5'GMP, respectively. PDEs are subdivided into 11 different groups based on sequence similarity, biochemical properties and inhibitor selectivity. Particularly, PDEs are classified as follows. (i) cAMP specific PDEs (PDE4, 7 and 8); (ii) cGMP specific PDEs (PDES, 6 and 9); and (iii) cAMP or cGMP specific PDEs (PDE1, 2, 3, 10 and 11). Herein, PDE11 is known to be specific to both cAMP and cGMP. Among the cAMP specific PDEs, PDE4 is significantly expressed in inflammatory cells. PDE4B is known to be the major iso form of PDE4 expressed in lymphocytes and macrophages (non-patent literature 01: Wang, P., Wu, P., Ohleth, K. M., Egan, R. W. & Billah, M. M. Phosphodiesterase 4B2 is the predominant phosphodiesterase species and undergoes differential regulation of gene expression in human monocytes and neutrophils. Molecular pharmacology 56, 170-174 (1999).). Inhibition of PDE4B in lymphocytes and macrophages can effectively induce inhibition of expression of inflammatory cytokines by raising the intracellular cAMP level.

Therefore, for the effective treatment of inflammatory diseases, a pharmaceutical composition capable of effectively inhibiting PDE4B is required, and the related research is also required. Accordingly, the present inventors have studied various compounds having a therapeutic effect on inflammatory diseases. During the study, the present inventors found that the benzamide derivative compound according to the present invention was effective in inhibiting the expression of PDE4B and completed this invention.

SUMMARY OF THE INVENTION

It is an object of the present invention to provide a benzamide derivative compound and a preparation method thereof.

It is another object of the present invention to provide a pharmaceutical composition for the prevention or treatment of inflammatory diseases.

It is another object of the present invention to provide a health functional food composition for the prevention or amelioration of inflammatory diseases.

To achieve the above objects, the present invention provides a compound represented by formula 1, an optical isomer thereof, or a pharmaceutically acceptable salt thereof.

[Formula 1]

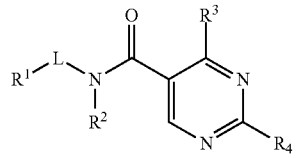

(In formula 1,
L, $R^1$, $R^2$, $R^3$ and $R^4$ are as defined in this specification).

The present invention also provides a preparation method of a compound represented by formula 1 comprising a step of preparing a compound represented by formula 1 by reacting a compound represented by formula 2 with a compound represented by formula 3, as shown in reaction formula 1 below.

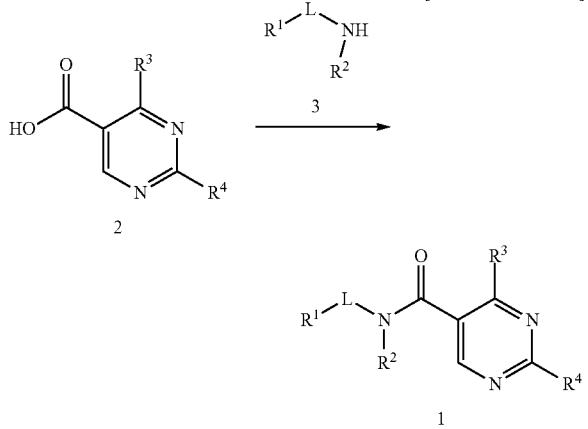

[Reaction Formula 1]

(In reaction formula 1,
$R^1$, $R^2$, $R^3$ and $R^4$ are as defined in formula 1 of claim 1).

The present invention also provides a pharmaceutical composition comprising a compound represented by formula 1, an optical isomer thereof or a pharmaceutically acceptable salt thereof as an active ingredient for the prevention or treatment of inflammatory diseases.

In addition, the present invention provides a health functional food composition comprising a compound represented by formula 1, an optical isomer thereof or a pharmaceutically acceptable salt thereof as an active ingredient for preventing or ameliorating inflammatory diseases.

ADVANTAGEOUS EFFECT

The benzamide derivative compound according to the present invention inhibits the expression of PDE4 and regulates the expressions of inflammatory disease-related substances such as IL-4 (interleukin-4), IL-5 (interleukin-4), IFN-γ (interferon-γ), IL-17 (interluekin-17), IgE (immunoglobulin E), and TNF-α (tumor necrosis factor-α), and thus may be utilized as a pharmaceutical composition for treating or preventing inflammatory diseases.

BRIEF DESCRIPTION OF THE DRAWINGS

In FIG. 2, the bar graph represents the fluorescence intensity, and the line graph represents the GFP cover area.

FIG. 4(a) is a graph showing the dermatitis score for the compound of example 1, and FIG. 4(b) is a graph showing the dermatitis score for the compound of example 25.

DESCRIPTION OF THE PREFERRED EMBODIMENTS

Figure 1:
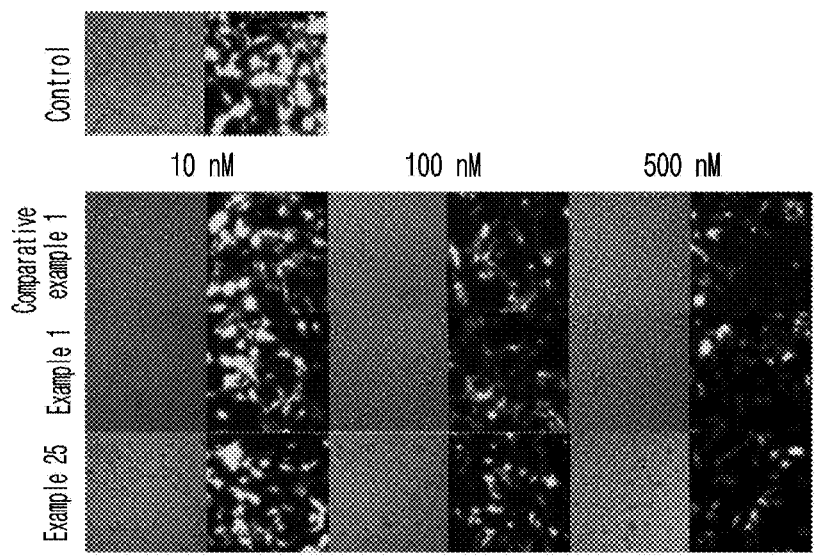
FIG. 1 is a set of confocal photomicrographs of the fluorescence emission in PDE4B GFP fusion protein-inhibitor assay with the compounds of example 1, example 2 and comparative example 1.

Hereinafter, the present invention is described in detail.

The present invention provides a compound represented by formula 1 below, an isomer thereof or a pharmaceutically acceptable salt thereof

[Formula 1]

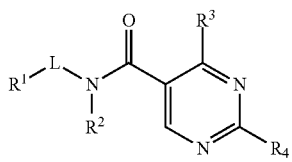

In formula 1 above,
  L is single bond or straight or branched $C_1$-$C_6$ alkylene;
  $R^1$ is hydrogen; $C_3$-$C_8$ cycloalkyl; nonsubstituted or substituted $C_6$-$C_{12}$ aryl; heteroaryl consisting of 6 to 12 atoms containing one or more heteroatoms selected from the group consisting of N and O; or heterocycloalkyl consisting of 6 to 10 atoms containing one or more heteroatoms selected from the group consisting of N and O; at this time, the substituted $C_6$-$C_{12}$ aryl can be substituted with one or more substituents selected from the group consisting of halogen, —$NH_2$, straight or branched $C_1$-$C_3$ alkyl, and straight or branched $C_1$-$C_3$ alkoxy, and the substituted heteroaryl consisting of 6 to 12 atoms can be substituted with one or more halogens;
  $R^2$ is hydrogen or straight or branched $C_1$-$C_3$ alkyl;
  $R^3$ is nonsubstituted or substituted $C_6$-$C_{10}$ aryl; or heterocycloalkyl consisting of 6 to 8 atoms containing one or more heteroatoms selected from the group consisting of N and O; at this time, the substituted $C_6$-$C_{10}$ aryl can be substituted with one or more methoxy groups, the substituted heterocycloalkyl consisting of 6 to 8 atoms can be substituted with one or more hydroxyl ethyl groups; and
  $R^4$ is $C_1$-$C_3$ haloalkyl, —$SR^5$ or —$SO_2R^5$, at this time, $R^5$ is straight or branched $C_1$-$C_6$ alkyl.

In addition, in formula 1 above,
  L is single bond or straight or branched $C_1$-$C_3$ alkylene;
  $R^1$ is hydrogen; $C_3$-$C_6$ cycloalkyl; nonsubstituted or substituted $C_6$-$C_{10}$ aryl; heteroaryl consisting of 6 to 10 atoms containing one or more heteroatoms selected from the group consisting of N and O; or heterocycloalkyl consisting of 6 to 8 atoms containing one or more heteroatoms selected from the group consisting of N and O; at this time, the substituted $C_6$-$C_{10}$ aryl can be substituted with one or more substituents selected from the group consisting of fluoro, —$NH_2$, methoxy and isopropyl, and the substituted heteroaryl consisting of 6 to 10 atoms can be substituted with one or more chloro;
  $R^2$ is hydrogen or straight or branched $C_1$-$C_3$ alkyl;
  $R^3$ is $C_6$-$C_{10}$ aryl nonsubstituted or substituted with one or more methoxy groups; or heterocycloalkyl consisting of 6 to 8 atoms nonsubstituted or substituted with one or more hydroxyl ethyl groups containing one or more heteroatoms selected from the group consisting of N and O; and
  $R^4$ is —$CH_2F$, —$CHF_2$, —$CF_3$, —$CH_2Cl$, —$CHCl_2$, —$CCl_3$, —$CH_2Br$, —$CHBr_2$, —$CBr_3$, —$SR^5$ or —$SO_2R^5$, at this time, $R^5$ is straight or branched $C_1$-$C_3$ alkyl.

Further, in formula 1 above,
  L is single bond, —$CH_2$— or —$CH_2CH_2$—;
  $R^1$ is hydrogen, cyclopropyl, morpholinyl, tetrahydropyranyl, indolyl, phenyl or pyridinyl nonsubstituted or substituted with one or more chloro; at this time, phenyl can be substituted with one or more substituents selected from the group consisting of methoxy, fluoro, isopropyl and —$NH_2$;
  $R^2$ is hydrogen, methyl or ethyl;
  $R^3$ is morpholinyl; phenyl nonsubstituted or substituted with one or more methoxy; or piperazinyl nonsubstituted or substituted with one or more hydroxy ethyl groups; and
  $R^4$ is —$CHF_2$, —$CH_2F$, —$CF_3$, —$SCH_3$ or —$SO_2CH_3$.

Moreover, in formula 1 above,
  L is single bond or —$CH_2CH_2$—;
  $R^1$ is hydrogen,

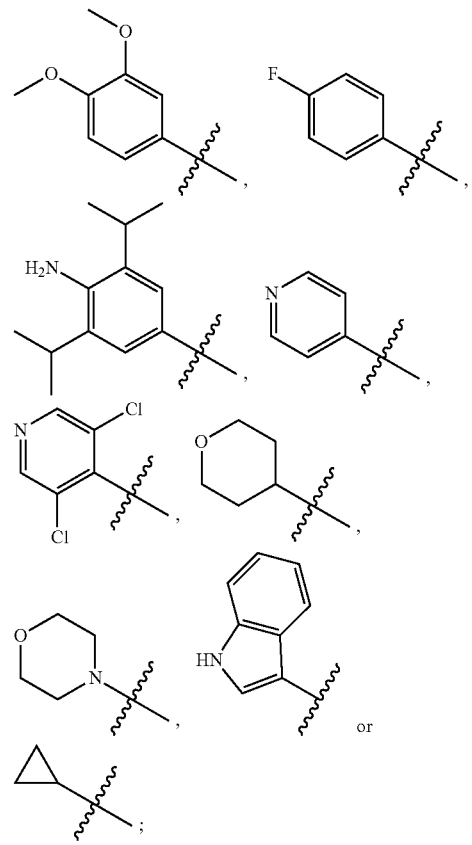

R² is hydrogen or ethyl;
R³ is

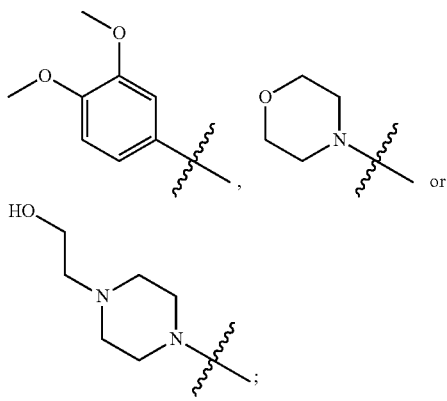

and
R⁴ is —CF₃, —SCH₃ or —SO₂CH₃.

Furthermore, the compound represented by formula 1 above can be any compound selected from the group consisting of the following compounds, an optical isomer thereof or a pharmaceutically acceptable salt thereof.

(1) N-(3,4-dimethoxyphenyl)-2-(methylthio)-4-morpholinopyrimidine-5-carboxamide;
(2) N-(3,5-dichloropyridine-4-yl)-4-(3,4-dimethoxyphenyl)-2-(methylthio)pyrimidine-5-carboxamide;
(3) 4-(3,4-dimethoxyphenyl)-2-(methylthio)-N-(pyridine-4-yl)pyrimidine-5-carboxamide;
(4) N-(2-(1H-indole-3-yl)ethyl)-2-(methylthio)-4-morpholinopyrimidine-5-carboxamide;
(5) 4-(3,4-dimethoxyphenyl)-2-(methylthio)-N-(tetrahydro-2H-pyran-4-yl)pyrimidine-5-carboxamide;
(6) N-(4-fluorophenyl)-2-(methylthio)-4-morpholinopyrimidine-5-carboxamide;
(7) N-(3,4-dimethoxyphenetyl)-2-(methylthio)-4-morpholinopyrimidine-5-carboxamide;
(8) N-(2,4-dimethoxybenzyl)-4-morpholino-2-(trifluoromethyl)pyrimidine-5-carboxamide;
(9) N-(2,4-dimethoxybenzyl)-2-(methylthio)-4-morpholinopyrimidine-5-carboxamide;
(10) N-(3,5-dichloropyridine-4-yl)-2-(methylthio)-4-morpholinopyrimidine-5-carboxamide;
(11) N-(3,4-dimethoxyphenyl)-4-morpholino-2-(trifluoromethyl)pyrimidine-5-carboxamide;
(12) 4-(3,4-dimethoxyphenyl)-N-(tetrahydro-2H-pyran-4-yl)-2-(trifluoromethyl)pyrimidine-5-carboxamide;
(13) 4-(3,4-dimethoxyphenyl)-N,N-diethyl-2-(trifluoromethyl)pyrimidine-5-carboxamide;
(14) 4-(3,4-dimethoxyphenyl)-2-(methylsulfonyl)-N-(tetrahydro-2H-pyran-4-yl)pyrimidine-5-carboxamide;
(15) N-cyclopropyl-4-(3,4-dimethoxyphenyl)-2-(trifluoromethyl)pyrimidine-5-carboxamide;
(16) N-(3,5-dichloropyridine-4-yl)-4-(3,4-dimethoxyphenyl)-2-(trifluoromethyl)pyrimidine-5-carboxamide;
(17) 4-(3,4-dimethoxyphenyl)-N,N-diethyl-2-(methylthio)pyrimidine-5-carboxamide;
(18) N-cyclopropyl-4-(3,4-dimethoxyphenyl)-2-(methylthio)pyrimidine-5-carboxamide;
(19) N-cyclopropyl-4-(3,4-dimethoxyphenyl)-2-(methylsulfonyl)pyrimidine-5-carboxamide;
(20) N-(4-amino-3,5-diisopropylphenyl)-4-(3,4-dimethoxyphenyl)-2-(methylthio)pyrimidine-5-carboxamide;
(21) N-(4-amino-3,5-diisopropylphenyl)-4-(3,4-dimethoxyphenyl)-2-(trifluoromethyl)pyrimidine-5-carboxamide;
(22) N-(3,4-dimethoxyphenyl)-4-(4-(2-hydroxyethyl)piperazine-1-yl)-2-(methylthio)pyrimidine-5-carboxamide;
(23) N-(3,4-dimethoxyphenetyl)-4-morpholino-2-(trifluoromethyl)pyrimidine-5-carboxamide;
(24) N-(2-(1H-indole-3-yl)ethyl)-4-morpholino-2-(trifluoromethyl)pyrimidine-5-carboxamide;
(25) 4-(3,4-dimethoxyphenyl)-N-(pyridine-4-yl)-2-(trifluoromethyl)pyrimidine-5-carboxamide;
(26) 4-(3,4-dimethoxyphenyl)-N-(2-morpholinoethyl)-2-(trifluoromethyl)pyrimidine-5-carboxamide;
(27) 4-(3,4-dimethoxyphenyl)-2-(methylthio)-N-(2-morpholinoethyl)pyrimidine-5-carboxamide;
(28) N-(3,4-dimethoxyphenetyl)-4-(4-(2-hydroxyethyl)piperazine-1-yl)-2-(methylthio)pyrimidine-5-carboxamide;
(29) N,4-bis(3,4-dimethoxyphenyl)-2-(methylthio)pyrimidine-5-carboxamide; and
(30) N,4-bis(3,4-dimethoxyphenyl)-2-(trifluoromethyl)pyrimidine-5-carboxamide.

The compound represented by formula 1 of the present invention can be used as a form of a pharmaceutically acceptable salt, in which the salt is preferably acid addition salt formed by pharmaceutically acceptable free acids. The acid addition salt herein can be obtained from inorganic acids such as hydrochloric acid, nitric acid, phosphoric acid, sulfuric acid, hydrobromic acid, hydroiodic acid, nitrous acid, and phosphorous acid; non-toxic organic acids such as aliphatic mono/dicarboxylate, phenyl-substituted alkanoate, hydroxy alkanoate, alkandioate, aromatic acids, and aliphatic/aromatic sulfonic acids; or organic acids such as acetic acid, benzoic acid, citric acid, lactic acid, maleic acid, gluconic acid, methanesulfonic acid, 4-toluenesulfonic acid, tartaric acid, and fumaric acid. The pharmaceutically non-toxic salts are exemplified by sulfate, pyrosulfate, bisulfate, sulphite, bisulphite, nitrate, phosphate, monohydrogen phosphate, dihydrogen phosphate, metaphosphate, pyrophosphate, chloride, bromide, iodide, fluoride, acetate, propionate, decanoate, caprylate, acrylate, formate, isobutylate, caprate, heptanoate, propiolate, oxalate, malonate, succinate, suberate, cabacate, fumarate, maliate, butyne-1,4-dioate, hexane-1,6-dioate, benzoate, chlorobenzoate, methylbenzoate, dinitrobenzoate, hydroxybenzoate, methoxybenzoate, phthalate, terephthalate, benzenesulfonate, toluenesulfonate, chlorobenzenesulfonate, xylenesulfonate, phenylacetate, phenylpropionate, phenylbutylate, citrate, lactate, hydroxybutylate, glycolate, malate, tartrate, methanesulfonate, propanesulfonate, naphthalene-1-sulfonate, naphthalene-2-sulfonate, and mandelate.

The acid addition salt in this invention can be prepared by the conventional method known to those in the art. For example, the derivative represented by formula 1 is dissolved in an organic solvent such as methanol, ethanol, acetone, dichloromethane, and acetonitrile, to which organic acid or inorganic acid is added to induce precipitation. Then, the precipitate is filtered and dried to give the salt. Or the solvent and the excessive acid are distilled under reduced pressure, and dried to give the salt. Or the precipitate is crystallized in an organic solvent to give the same.

A pharmaceutically acceptable metal salt can be prepared by using a base. Alkali metal or alkali earth metal salt is obtained by the following processes: dissolving the compound in excessive alkali metal hydroxide or alkali earth metal hydroxide solution; filtering non-soluble compound salt; evaporating the remaining solution and drying thereof. At this time, the metal salt is preferably prepared in the pharmaceutically suitable form of sodium, potassium, or calcium salt. And the corresponding silver salt is prepared by the reaction of alkali metal or alkali earth metal salt with proper silver salt (ex; silver nitrate).

The compound represented by formula 1 according to the present invention, the optical isomer thereof or the pharmaceutically acceptable salt thereof inhibits the expression of PDE4, and has excellent ability to control the expressions of inflammatory disease-related substances such as IL-4 (Interleukin-4), IL-5 (Interleukin-5), IFN-γ (Interferon-γ), IL-17 (Interleukin-17), IgE (immunoglobulin E) and TNF-α (Tumor necrosis factor-α), so it can be effectively used for the treatment or prevention of inflammatory diseases (see Experimental Examples 1~5).

In addition, since the ability to bind to PDE4B at the molecular level was confirmed through molecular docking experiments, it effectively suppresses the expression of PDE4B in the body, thereby enabling treatment or prevention of inflammatory diseases (see Experimental Example 6).

In addition, the present invention provides a preparation method of a compound represented by formula 1 comprising the step of preparing a compound represented by formula 1 by reacting the compound represented by formula 2 with a compound represented by formula 3, as shown in reaction formula 1 below.

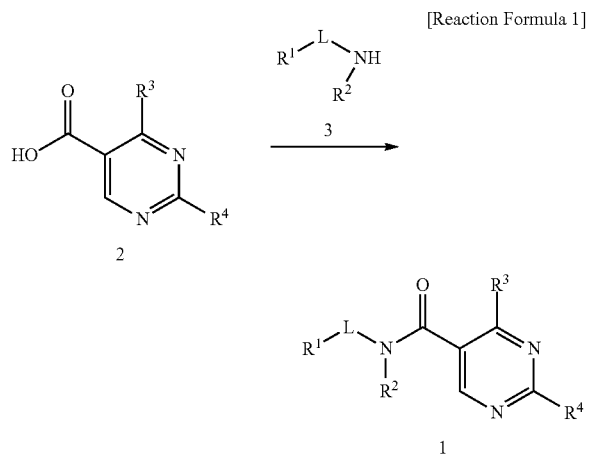

[Reaction Formula 1]

In reaction formula 1, L, $R^1$, $R^2$, $R^3$ and $R^4$ are as defined in formula 1 above.

Hereinafter, the preparation method according to the present invention is described in more detail.

The preparation method represented by reaction formula 1 is a method to prepare the compound represented by formula 1 according to the present invention by reacting an aldehyde group of the compound represented by formula 2 with an amine compound represented by formula 3.

At this time, to react the amine compound represented by formula 3, a step of adding chloro to the aldehyde group of the compound represented by formula 2 can be added, as shown in reaction formula 2 below.

Particularly, after dissolving the compound of formula 2 in a solvent such as DCM, oxalyl chloride and anhydrous DMF can be added to the solution and reacted by stirring.

Then, the resulting mixture is concentrated under reduced pressure to obtain a compound represented by formula 2' in which chloro is added to the aldehyde group.

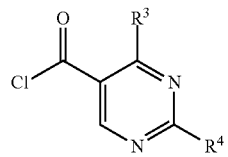

[Formula 2']

After the step of preparing the compound of formula 2' is completed, the compound represented by formula 2' is dissolved in a solvent in the next process, and the compound represented by formula 3 is added, followed by stirring the reaction mixture. Next, it is possible to react while slowly raising the reaction temperature to around room temperature for 1 hour. The resulting mixture can be concentrated under reduced pressure, and the concentrated mixture can be purified by column chromatography or the like. Upon completion of the purification, the target compound represented by formula 1 can be obtained.

The present invention also provides a pharmaceutical composition comprising a compound represented by formula 1, an optical isomer thereof or a pharmaceutically acceptable salt thereof as an active ingredient for the prevention or treatment of inflammatory disease.

At this time, the inflammatory disease includes dermatitis, atopic dermatitis, asthma, rhinitis, arthritis, rheumatoid arthritis, gastritis, enteritis, nephritis, hepatitis, allergy, gastric ulcer, duodenal ulcer, esophagitis, colitis, systemic edema, local edema, keratitis, bronchitis, pleurisy, peritonitis, spondylitis, inflammatory pain, urethritis, prostatitis, cystitis, periodontitis, gingivitis, chronic obstructive pulmonary disease (COPD), pulmonary fibrosis, irritable bowel syndrome, inflammatory pain, migraine, headache, low back pain, fibromyalgia, fascial disease, viral infections, bacterial infections, fungal infections, burns, wounds caused by surgical or dental operation, excessive PGE syndrome, atherosclerosis, gout, ankylosing spondylitis, Hodgkin's disease, pancreatitis, conjunctivitis, irisitis, scleritis, uveitis, eczema and multiple sclerosis, and if it is a common inflammatory disease, it is not limited to the above-mentioned types and may include all.

In addition, the pharmaceutical composition for the prevention or treatment of inflammatory disease according to the present invention can be characterized in that the compound represented by formula 1 inhibits the expression of PDE4.

In particular, the composition can effectively treat and prevent inflammatory disease through the selective response to PDE4B among PDE4 (see Experimental Example 6).

In addition, the pharmaceutical composition for the prevention or treatment of inflammatory disease according to the present invention can be characterized in that the compound represented by formula 1 regulates the expressions of IL-4 (Interleukin-4), IL-5 (Interleukin-5), IFN-γ (Interferon-γ), IL-17 (Interleukin-17), IgE (immunoglobulin E) and TNF-α (Tumor necrosis factor-α).

pharmacological profile (PDE4B enzyme inhibitor assay, PDE4B-GFP fusion protein assay, molecular docking with PDE4B enzyme), anti-atopic profile (DNCB-induced AD-like skin inflammation in Nc/Nga mice)

The compound represented by formula 1 or the pharmaceutically acceptable salt thereof included in the pharmaceutical composition of the present invention can be applied directly to the skin or administered orally or parenterally and be used in general forms of pharmaceutical formulation.

That is, the composition of the present invention can be prepared for oral or parenteral administration by mixing with generally used diluents or excipients such as fillers, extenders, binders, wetting agents, disintegrating agents and surfactants.

The formulations for oral administration are exemplified by tablets, pills, hard/soft capsules, solutions, suspensions, emulsions, syrups, granules, elixirs, and troches, etc. These formulations can include diluents (for example, lactose, dextrose, sucrose, mannitol, sorbitol, cellulose, and/or glycine) and lubricants (for example, silica, talc, stearate and its magnesium or calcium salt, and/or polyethylene glycol) in addition to the active ingredient. Tablets can include binding agents such as magnesium aluminum silicate, starch paste, gelatin, methylcellulose, sodium carboxymethylcellulose and/or polyvinylpyrolidone, and if necessary disintegrating agents such as starch, agarose, alginic acid or its sodium salt or azeotropic mixtures and/or absorbents, coloring agents, flavours, and sweeteners can be additionally included thereto.

The pharmaceutical composition comprising the compound represented by formula 1 or the pharmaceutically acceptable salt thereof as an active ingredient can be administered by parenterally and the parenteral administration includes subcutaneous injection, intravenous injection, intramuscular injection, or intrathoracic injection. In addition, the composition can be applied directly to the skin. In this case, the composition can be prepared and applied in the form of ointment, spray, beauty wash, lotion, cream, massage cream, essence, cleansing product, pack, powder, patch, gel, etc. The application method is not particularly limited, and any conventional application method can be used.

To prepare the compound represented by formula 1 or the pharmaceutically acceptable salt thereof as a formulation for parenteral administration, the compound represented by formula 1 or the pharmaceutically acceptable salt thereof is mixed with a stabilizer or a buffering agent in water to produce a solution or suspension, which is then formulated as ampoules or vials. The composition herein can be sterilized and additionally contains preservatives, stabilizers, wettable powders or emulsifiers, salts and/or buffers for the regulation of osmotic pressure, and other therapeutically useful materials, and the composition can be formulated by the conventional mixing, granulating or coating method.

The effective dosage of the pharmaceutical composition comprising the compound represented by formula 1 or the pharmaceutically acceptable salt thereof as an active ingredient can be determined according to age, weight, gender, administration method, health condition, and severity of disease. The dosage is generally 0.1~1000 mg/day, and preferably 1~500 mg/day based on an adult patient weighing 70 kg, which can be administered once or several times a day at intervals of a certain time depending on the judgment of a doctor or a pharmacist.

At this time, the pharmaceutical composition according to the present invention can be preferably administered by a method of directly applying to the skin among the above administration methods, and a remarkably high therapeutic effect on inflammatory disease is exhibited by skin application only without oral administration (Experimental Examples 1~5).

Accordingly, the pharmaceutical composition according to the present invention has the advantage that no side effects such as vomiting, nausea, or dizziness may occur during oral administration, which has been a problem with conventional atopic medicines.

The pharmaceutical composition comprising the compound represented by formula 1 or the pharmaceutically acceptable salt thereof as an active ingredient can be administered alone or together with surgical operation, hormone therapy, chemo-therapy and biological regulators to prevent or treat inflammatory disease.

In addition, the present invention provides a health functional food composition comprising a compound represented by formula 1, an optical isomer thereof or a pharmaceutically acceptable salt thereof as an active ingredient for preventing or ameliorating inflammatory diseases.

The health functional food composition according to the present invention can be prepared by adding the compound of formula 1 above to food or beverages for the purpose of preventing or alleviating inflammatory diseases.

The food herein is not limited. For example, the composition of the present invention can be added to drinks, meats, sausages, breads, biscuits, rice cakes, chocolates, candies, snacks, pizza, ramyuns, flour products, gums, dairy products including ice cream, soups, beverages, alcohol drinks and vitamin complex, etc., and in wide sense, almost every health functional food can be included.

The compound represented by formula 1 of the present invention can be used as food additive. In that case, the compound can be added as it is or as mixed with other food components according to the conventional method. The mixing ratio of active ingredients can be regulated according to the purpose of use (prevention or alleviation). In general, the compound represented by formula 1 of the present invention can be added at 0.1 to 90 weight parts by the total food weight. However, if long term administration is required for health and hygiene or regulating health condition, the content can be lower than the above but higher content can be accepted as well since the compound has been proved to be very safe.

The composition for health beverages of the present invention can additionally include various flavors or natural carbohydrates, etc., like other beverages in addition to the compound. The natural carbohydrates above can be one of monosaccharides such as glucose and fructose; disaccharides such as maltose and sucrose; polysaccharides such as dextrin and cyclodextrin; and sugar alcohols such as xilytole, sorbitol and erythritol. Besides, natural sweetening agents (thaumatin, stevia extract, for example rebaudioside A, glycyrrhizin, etc.) and synthetic sweetening agents (saccharin, aspartame, etc.) can be included as a sweetening agent. The content of the natural carbohydrate is preferably 1-20 g and more preferably 5-12 g in 100 g of the composition of the present invention.

In addition to the ingredients mentioned above, the compound represented by formula 1 of the present invention can include in variety of nutrients, vitamins, minerals (electrolytes), flavors including natural flavors and synthetic flavors, coloring agents and extenders (cheese, chocolate, etc.), pectic acid and its salts, alginic acid and its salts, organic acid, protective colloidal viscosifiers, pH regulators, stabilizers, antiseptics, glycerin, alcohols, carbonators which used to be added to soda, etc. The pyrazole derivative represented by formula 1 of the present invention can also include natural fruit juice, fruit beverages and fruit flesh addable to vegetable beverages. All the mentioned ingredients can be added singly or together. The mixing ratio of those ingredients does not matter in fact, but in general, each can be added by 0.1-20 weight part per 100 weight part of the pyrazole derivative represented by formula 1 of the present invention.

Hereinafter, the present invention will be described in detail by the following examples and experimental examples.

However, the following examples and experimental examples are only for illustrating the present invention, and the contents of the present invention are not limited thereto.

<Preparative Example 1> Preparation of 4-(3,4-Dimethoxyphenyl)-2-(Trifluoromethyl)Pyrimidine-5-Carboxylic Acid

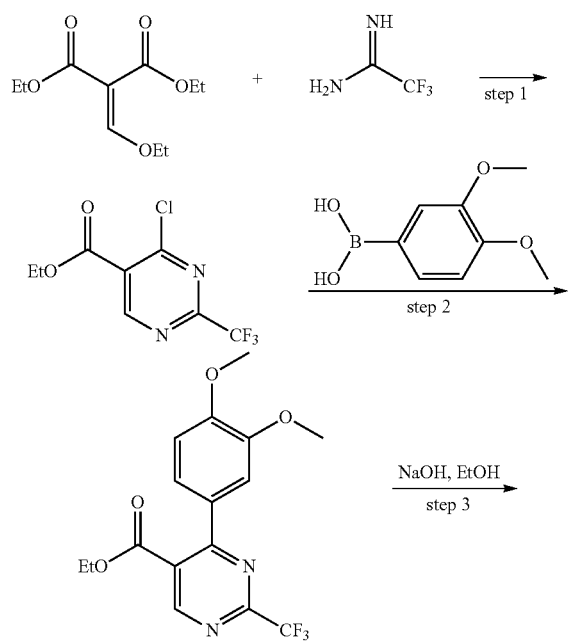

Step 1: Preparation of Ethyl 4-Chloro-2-(Trifluoromethyl)Pyrimidine-5-Carboxylate Sodium ethoxide (3.15 g, 46.24 mmol) was added to anhydrous EtOH (60 mL) containing diethyl (ethoxymethylene) malonate (10 g, 46.24 mmol) and trifluoroacetamidine (6.2 g, 55.48 mmol). The reaction mixture was refluxed at 80° C. for 9 hours in nitrogen atmosphere. Upon completion of the reaction, the reaction mixture was cooled to room temperature, and excess ethanol was evaporated using a rotavapor, and the rest was poured into ice water to obtain a solid. The solid was filtered, washed with DI water and hexane, and then dried in vacuo. As a result, ethyl 2-(trifluoromethyl)-1,6-dihydro-6-oxopyrimidine-5-carboxylate was obtained as a pale yellow solid (5 g, 60%), which was used in the next step without further purification. The intermediate (2.4 g) was slowly added to phosphoryl(V) oxychloride (25 ml) and the reaction mixture was heated at 100° C. for 3 hours. The reactant was cooled to room temperature, which was poured slowly into crushed ice. The reaction mixture was stirred slowly to obtain a solid. The solid was filtered, and purified by silica gel column chromatography (EtOAc 5% hexane) to give a target compound as a white solid.

Yield: 2.5 g, 95%. $^1$H NMR (DMSO-$d_6$, 400 MHz): 9.41 (1 H, s), 4.41 (2 H, q), 1.36 (3 H, t). ESIMS: 255 (M+1).

Step 2: Preparation of Ethyl 4-(3,4-Dimethoxyphenyl)-2-(Trifluoromethyl)Pyrimidine-5-Carboxylate 10 ml of THF solution containing P(t-Bu)$_3$ (0.32 g, 1.57 mmol) and tris(dibenzylideneacetone)dipalladium(Pd$_2$(dba)$_3$ (0.72 g, 0.78 mmol) was stirred at room temperature for 30 minutes to form a dark red heterogeneous solution of Pd(P(t-Bu)$_3$)$_2$. Dry THF (50 ml) containing KF (2.74 g, 47.24 mmol) and 3,4-dimethoxyphenylboronic acid (2.15 g, 11.80 mmol) was added thereto. Finally, ethyl 4-chloro-2-(trifluoromethyl)pyrimidine-5-carboxylate (2 g, 7.8 mmol) was added thereto in nitrogen atmosphere. The reaction mixture was heated at 55° C. for 17 hours. Upon completion of the reaction, the mixture was cooled, concentrated in vacuo to obtain a crude residue. The crude residue was purified by silica gel column chromatography (ethyl acetate/hexane, 1:3) to give a target compound as a white solid (74% yield).

Step 3: Preparation of 4-(3,4-Dimethoxyphenyl)-2-(Trifluoromethyl)Pyrimidine-5-Carboxylic Acid 1 N NaOH aqueous solution (5 ml) was added to ethyl 4-(3,4-dimethoxyphenyl)-2-(trifluoromethyl)pyrimidine-5-carboxylate (2.5 g, 7.61 mmol) in ethanol (25 mL). The reaction mixture was stirred at room temperature for overnight. Upon completion of the reaction, the organic solvent was evaporated, and 1 N HCl aqueous solution (5 ml) was added to the residue. The resulting precipitate was collected by filtration, which was dried under a high vacuum pump to give a target compound as a white solid. Yield: 2 g, 90%.

<Preparative Example 2> Preparation of 4-(3,4-Dimethoxyphenyl)-2-(Methylthio)Pyrimidine-5-Carboxylic Acid

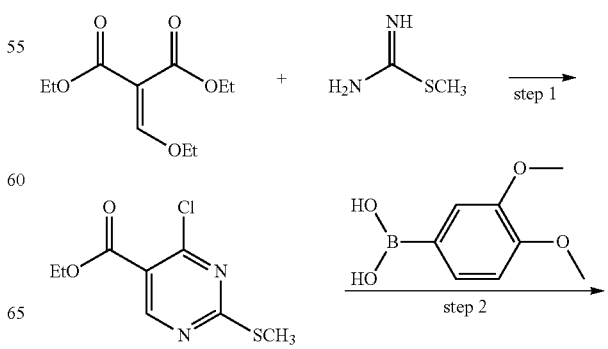

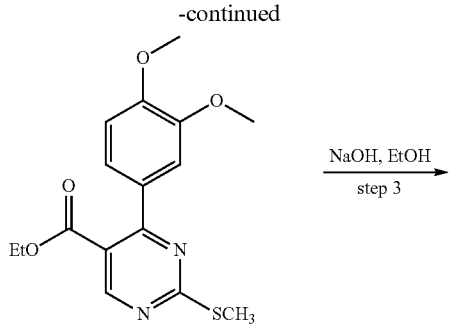

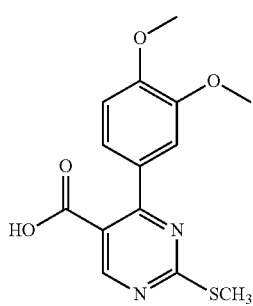

4-(3,4-Dimethoxyphenyl)-2-(methylthio)pyrimidine-5-carboxylic acid was prepared in the same manner as described in Preparative Example 1, except that methyl carbamidothioate (55.48 mmol) was used instead of 2,2,2-trifluoroacetimidamide in step 1 of Preparative Example 1 (Yield: 90%).

<Preparative Example 3> Preparation of 4-Morpholino-2-(Trifluoromethyl)Pyrimidine-5-Carboxylic Acid

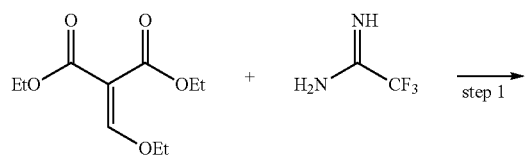

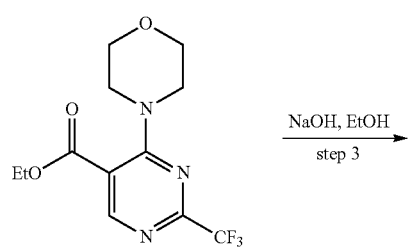

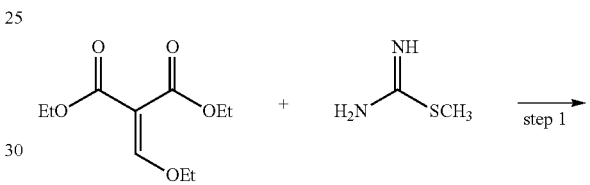

4-Morpholino-2-(trifluoromethyl)pyrimidine-5-carboxylic acid was prepared in the same manner as described in Preparative Example 1, except that morpholine (0.42 mL, 4.92 mmol) was used instead of 3,4-dimethoxyphenylboronic acid in step 2 of Preparative Example 1 (Yield: 98%).

<Preparative Example 4> Preparation of 2-(Methylthio)-4-Morpholinopyrimidine-5-Carboxylic Acid 2-(Methylthio)-4-morpholinopyrimidine-5-carboxylic acid was prepared in the same manner as described in Preparative Example 1, except that methyl carbamidothioate (55.48 mmol) was used instead of 2,2,2-trifluoroacetimidamide in step 1 of Preparative Example 1, and morpholine (0.42 mL, 4.92 mmol) was used instead of 3,4-dimethoxyphenylboronic acid in step 2 of Preparative Example 1 (Yield: 98%).

<Preparative Example 5> Preparation of 4-(3,4-Dimethoxyphenyl)-2-(Methylthio)Pyrimidine-5-Carboxylic Acid

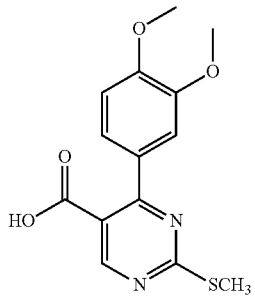 [SMILES: COc1ccc(-c2nc(SC)ncc2C(=O)O)cc1OC]

4-(3,4-Dimethoxyphenyl)-2-(methylthio) pyrimidine-5-carboxylic acid was prepared in the same manner as described in Preparative Example 1 (Yield: 90%).

<Preparative Example 6> Preparation of 4-(4-(2-Hydroxyethyl)Piperazine-1-Yl)-2-(Methylthio)Pyrimidine-5-Carboxylic Acid

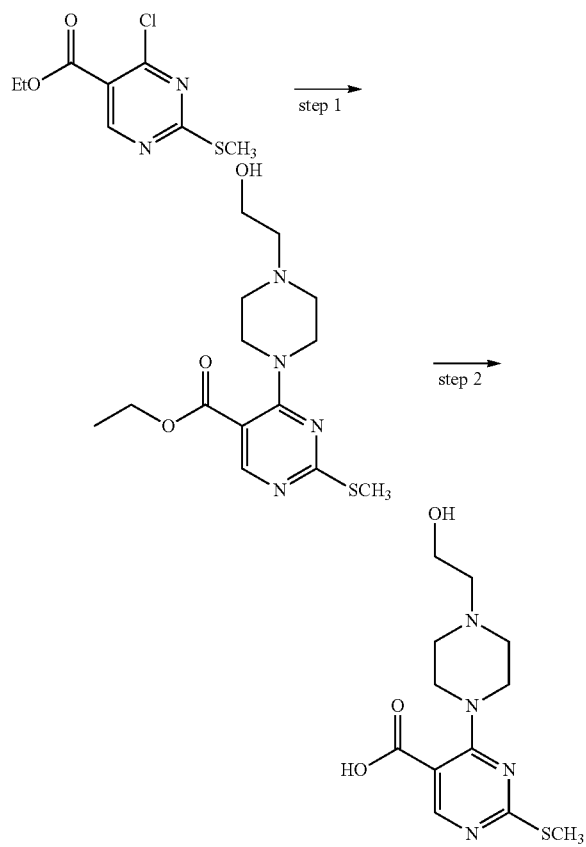

1-(2-Hydroxyethyl)piperazine (95 μl, 0.766 mmol) was added to dry THF (8 mL) containing ethyl 4-chloro-2-(methylthio)pyrimidine-5-carboxylate (250 mg, 0.766 mmol) and N,N-diisopropylethylamine (258 μl, 1.53 mmol). The reaction mixture was stirred at room temperature for 24 hours. Upon completion of the reaction, the reaction mixture was concentrated in vacuo, and purified by column chromatography (ethyl acetate:hexane, 4:6) to give ethyl 4-(4-(2-hydroxyethyl)piperazine-1-yl)-2-(methylthio)pyrimidine-5-carboxylate as a white solid (300 mg, 88%). Then, the ester intermediate was used in the next step without further analysis. Ethyl 4-(4-(2-hydroxyethyl)piperazine-1-yl)-2-(methylthio)pyrimidine-5-carboxylate was dissolved in 5 ml of ethanol, to which 1 N NaOH aqueous solution (2 mL) was added. The reaction mixture was stirred at room temperature for overnight. Then, the organic solvent was evaporated, and 1 N HCl aqueous solution (2.5 ml) was added thereto (pH ∼7.0). The resulting precipitate was collected by filtration, which was dried under a high vacuum pump to give a target compound as a white solid.

<Example 1> Preparation of N-(3,4-Dimethoxyphenyl)-2-(Methylthio)-4-Morpholinopyrimidine-5-Carboxamide N-(3,4-dimethoxyphenyl)-2-(methylthio)-4-morpholinopyrimidine-5-carboxamide was prepared in the same manner as described in Example 25, except that 3,4-dimethoxyphenyl was used instead of 4-aminopyrimidine using the compound prepared in Preparative Example 4.

<Example 2> Preparation of N-(3,5-Dichloropyridine-4-yl)-4-(3,4-Dimethoxyphenyl)-2-(Methylthio)Pyrimidine-5-Carboxamide N-(3,5-dichloropyridine-4-yl)-4-(3,4-dimethoxyphenyl)-2-(methylthio)pyrimidine-5-carboxamide was prepared in the same manner as described in Example 25, except that 3,5-dichloro-4-pyridinyl was used instead of 4-aminopyrimidine using the compound prepared in Preparative Example 2.

<Example 3> Preparation of 4-(3,4-Dimethoxyphenyl)-2-(Methylthio)-N-(Pyridine-4-Yl)Pyrimidine-5-Carboxamide 4-(3,4-Dimethoxyphenyl)-2-(methylthio)-N-(pyridine-4-yl)pyrimidine-5-carboxamide was prepared in the same manner as described in Example 25, except that 4-pyridinyl was used instead of 4-aminopyrimidine using the compound prepared in Preparative Example 2.

<Example 4> Preparation of N-(2-(1H-Indole-3-Yl)Ethyl)-2-(Methylthio)-4-Morpholinopyrimidine-5-Carboxamide N-(2-(1H-indole-3-yl)ethyl)-2-(methylthio)-4-morpholinopyrimidine-5-carboxamide was prepared in the same manner as described in Example 25, except that tryptamine was used instead of 4-aminopyrimidine using the compound prepared in Preparative Example 4.

<Example 5> Preparation of 4-(3,4-Dimethoxyphenyl)-2-(Methylthio)-N-(Tetrahydro-2H-Pyran-4-Yl)Pyrimidine-5-Carboxamide 4-(3,4-Dimethoxyphenyl)-2-(methylthio)-N-(tetrahydro-2H-pyran-4-yl)pyrimidine-5-carboxamide was prepared in the same manner as described in Example 25, except that 4-fluorophenyl was used instead of 4-aminopyrimidine using the compound prepared in Preparative Example 2.

\<Example 6\> Preparation of N-(4-Fluorophenyl)-2-(Methylthio)-4-Morpholinopyrimidine-5-Carboxamide N-(4-fluorophenyl)-2-(methylthio)-4-morpholinopyrimidine-5-carboxamide was prepared in the same manner as described in Example 25, except that 4-fluorophenyl was used instead of 4-aminopyrimidine using the compound prepared in Preparative Example 4.

\<Example 7\> Preparation of N-(3,4-Dimethoxyphenetyl)-2-(Methylthio)-4-Morpholinopyrimidine-5-Carboxamide N-(3,4-dimethoxyphenetyl)-2-(methylthio)-4-morpholinopyrimidine-5-carboxamide was prepared in the same manner as described in Example 25, except that 3,4-dimethoxyphenylethyl was used instead of 4-aminopyrimidine using the compound prepared in Preparative Example 4.

\<Example 8\> Preparation of N-(2,4-Dimethoxybenzyl)-4-Morpholino-2-(Trifluoromethyl)Pyrimidine-5-Carboxamide N-(2,4-dimethoxybenzyl)-4-morpholino-2-(trifluoromethyl)pyrimidine-5-carboxamide was prepared in the same manner as described in Example 25, except that 2,4-dimethoxyphenylmethyl was used instead of 4-aminopyrimidine using the compound prepared in Preparative Example 3.

\<Example 9\> Preparation of N-(2,4-Dimethoxybenzyl)-2-(Methylthio)-4-Morpholinopyrimidine-5-Carboxamide N-(2,4-dimethoxybenzyl)-2-(methylthio)-4-morpholinopyrimidine-5-carboxamide was prepared in the same manner as described in Example 25, except that 2,4-dimethoxyphenylmethyl was used instead of 4-aminopyrimidine using the compound prepared in Preparative Example 4.

\<Example 10\> Preparation of N-(3,5-Dichloropyridine-4-Yl)-2-(Methylthio)-4-Morpholinopyrimidine-5-Carboxamide N-(3,5-dichloropyridine-4-yl)-2-(methylthio)-4-morpholinopyrimidine-5-carboxamide was prepared in the same manner as described in Example 25, except that 3,5-dichloro-4-pyridyl was used instead of 4-aminopyrimidine using the compound prepared in Preparative Example 4.

\<Example 11\> Preparation of N-(3,4-Dimethoxyphenyl)-4-Morpholino-2-(Trifluoromethyl)Pyrimidine-5-Carboxamide N-(3,4-dimethoxyphenyl)-4-morpholino-2-(trifluoromethyl)pyrimidine-5-carboxamide was prepared in the same manner as described in Example 25, except that 3,4-dimethoxyphenyl was used instead of 4-aminopyrimidine using the compound prepared in Preparative Example 3.

\<Example 12\> Preparation of 4-(3,4-Dimethoxyphenyl)-N-(Tetrahydro-2H-Pyran-4-Yl)-2-(Trifluoromethyl)Pyrimidine-5-Carboxamide 4-(3,4-Dimethoxyphenyl)-N-(tetrahydro-2H-pyran-4-yl)-2-(trifluoromethyl)pyrimidine-5-carboxamide was prepared in the same manner as described in Example 25, except that tetrahydropyran-4-amine was used instead of 4-aminopyrimidine using the compound prepared in Preparative Example 1.

\<Example 13\> Preparation of 4-(3,4-Dimethoxyphenyl)-N,N-Diethyl-2-(Trifluoromethyl)Pyrimidine-5-Carboxamide 4-(3,4-Dimethoxyphenyl)-N,N-diethyl-2-(trifluoromethyl)pyrimidine-5-carboxamide was prepared in the same manner as described in Example 25, except that N,N-diethylamine was used instead of 4-aminopyrimidine using the compound prepared in Preparative Example 1.

\<Example 14\> Preparation of 4-(3,4-Dimethoxyphenyl)-2-(Methylsulfonyl)-N-(Tetrahydro-2H-Pyran-4-Yl)Pyrimidine-5-Carboxamide 4-(3,4-Dimethoxyphenyl)-2-(methylsulfonyl)-N-(tetrahydro-2H-pyran-4-yl)pyrimidine-5-carboxamide was prepared in the same manner as described in Example 25, except that tetrahydropyran-4-amine was used instead of 4-aminopyrimidine using the compound prepared in Preparative Example 2.

\<Example 15\> Preparation of N-Cyclopropyl-4-(3,4-Dimethoxyphenyl)-2-(Trifluoromethyl)Pyrimidine-5-Carboxamide N-cyclopropyl-4-(3,4-dimethoxyphenyl)-2-(trifluoromethyl)pyrimidine-5-carboxamide was prepared in the same manner as described in Example 25, except that cyclopropanamine was used instead of 4-aminopyrimidine using the compound prepared in Preparative Example 1.

\<Example 16\> Preparation of N-(3,5-Dichloropyridine-4-Yl)-4-(3,4-Dimethoxyphenyl)-2-(Trifluoromethyl)Pyrimidine-5-Carboxamide N-(3,5-dichloropyridine-4-yl)-4-(3,4-dimethoxyphenyl)-2-(trifluoromethyl)pyrimidine-5-carboxamide was prepared in the same manner as described in Example 25, except that 3,5-dichloro-4-pyridyl was used instead of 4-aminopyrimidine using the compound prepared in Preparative Example 1.

\<Example 17\> Preparation of 4-(3,4-Dimethoxyphenyl)-N,N-Diethyl-2-(Methylthio)Pyrimidine-5-Carboxamide 4-(3,4-Dimethoxyphenyl)-N,N-diethyl-2-(methylthio)pyrimidine-5-carboxamide was prepared in the same manner as described in Example 25, except that N,N-diethylamine was used instead of 4-aminopyrimidine using the compound prepared in Preparative Example 2.

\<Example 18\> Preparation of N-Cyclopropyl-4-(3,4-Dimethoxyphenyl)-2-(Methylthio)Pyrimidine-5-Carboxamide N-cyclopropyl-4-(3,4-dimethoxyphenyl)-2-(methylthio)pyrimidine-5-carboxamide was prepared in the same manner as described in Example 25, except that cyclopropanamine was used instead of 4-aminopyrimidine using the compound prepared in Preparative Example 2.

<Example 19> Preparation of N-Cyclopropyl-4-(3,4-Dimethoxyphenyl)-2-(Methylsulfonyl)Pyrimidine-5-Carboxamide N-cyclopropyl-4-(3,4-dimethoxyphenyl)-2-(methylsulfonyl)pyrimidine-5-carboxamide was prepared in the same manner as described in Example 25, except that cyclopropanamine was used instead of 4-aminopyrimidine using the compound prepared in Preparative Example 2.

<Example 20> Preparation of N-(4-Amino-3,5-Diisopropylphenyl)-4-(3,4-Dimethoxyphenyl)-2-(Methylthio)Pyrimidine-5-Carboxamide N-(4-amino-3,5-diisopropylphenyl)-4-(3,4-dimethoxyphenyl)-2-(methylthio)pyrimidine-5-carboxamide was prepared in the same manner as described in Example 25, except that 2,6-diisopropylaniline was used instead of 4-aminopyrimidine using the compound prepared in Preparative Example 2.

<Example 21> Preparation of N-(4-Amino-3,5-Diisopropylphenyl)-4-(3,4-Dimethoxyphenyl)-2-(Trifluoromethyl)Pyrimidine-5-Carboxamide N-(4-amino-3,5-diisopropylphenyl)-4-(3,4-dimethoxyphenyl)-2-(trifluoromethyl)pyrimidine-5-carboxamide was prepared in the same manner as described in Example 25, except that 2,6-diisopropylaniline was used instead of 4-aminopyrimidine using the compound prepared in Preparative Example 1.

<Example 22> Preparation of N-(3,4-Dimethoxyphenyl)-4-(4-(2-Hydroxyethyl)Piperazine-1-Yl)-2-(Methylthio)Pyrimidine-5-Carboxamide N-(3,4-dimethoxyphenyl)-4-(4-(2-hydroxyethyl)piperazine-1-yl)-2-(methylthio)pyrimidine-5-carboxamide was prepared in the same manner as described in Example 25, except that 3,4-dimethoxyphenyl was used instead of 4-aminopyrimidine using the compound prepared in Preparative Example 4.

<Example 23> Preparation of N-(3,4-Dimethoxyphenetyl)-4-Morpholino-2-(Trifluoromethyl)Pyrimidine-5-Carboxamide N-(3,4-dimethoxyphenetyl)-4-morpholino-2-(trifluoromethyl)pyrimidine-5-carboxamide was prepared in the same manner as described in Example 25, except that 2-(3,4-dimethoxyphenylethyl)ethyl was used instead of 4-aminopyrimidine using the compound prepared in Preparative Example 3.

<Example 24> Preparation of N-(2-(1H-Indole-3-Yl)Ethyl)-4-Morpholino-2-(Trifluoromethyl)Pyrimidine-5-Carboxamide N-(2-(1H-indole-3-yl)ethyl)-4-morpholino-2-(trifluoromethyl)pyrimidine-5-carboxamide was prepared in the same manner as described in Example 25, except that tryptamine was used instead of 4-aminopyrimidine using the compound prepared in Preparative Example 3.

<Example 25> Preparation of 4-(3,4-Dimethoxyphenyl)-N-(Pyridine-4-Yl)-2-(Trifluoromethyl)Pyrimidine-5-Carboxamide 4-(3,4-Dimethoxyphenyl)-N-(pyridine-4-yl)-2-(trifluoromethyl)pyrimidine-5-carboxamide was prepared through the synthesis process shown in reaction formula 6 using the compound prepared in Preparative Example 1.

[Reaction Formula 6]

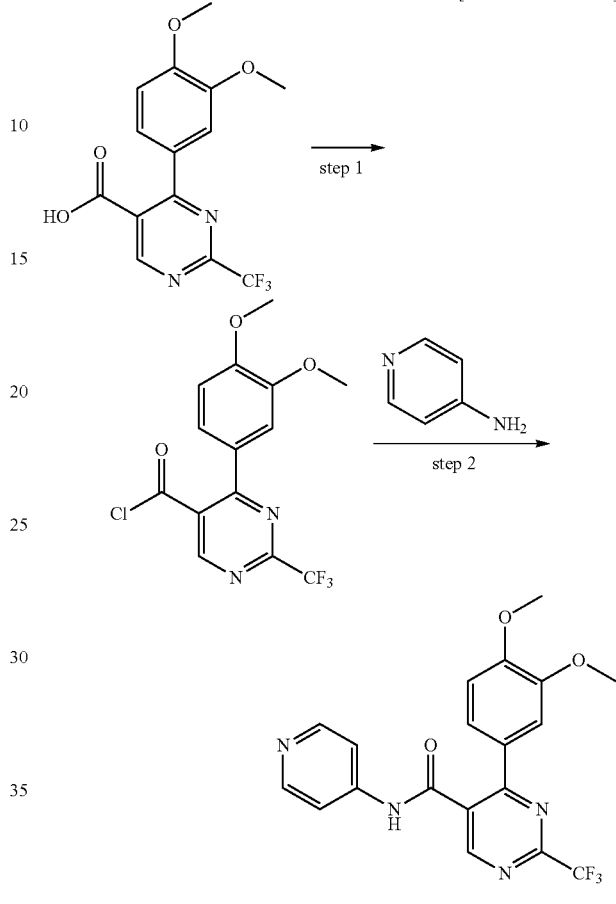

Step 1: Preparation of 4-(3,4-Dimethoxyphenyl)-2-(Trifluoromethyl)Pyrimidine-5-Carbonylchloride Oxalyl chloride (260 μl, 3.04 mmol) and anhydrous DMF (catalytic amount) were added to 5 ml of dry DCM in which the 4-(3,4-dimethoxyphenyl)-2-(trifluoromethyl)pyrimidine-5-carboxylic acid (500 mg, 1.52 mmol) prepared in Preparative Example 1 was dissolved at 0° C. The reaction mixture was stirred at 0° C. for 30 minutes and left at room temperature for 1 hour.

Then, the reaction mixture was concentrated under reduced pressure to give crude 4-(3,4-dimethoxyphenyl-2-(trifluoromethyl)pyrimidine-5-carbonyl chloride as a pale yellow solid (0.6 g, 1.73 mmol).

Step 2: Preparation of 4-(3,4-Dimethoxyphenyl)-N-(Pyridine-4-Yl)-2-(Trifluoromethyl)Pyrimidine-5-Carboxamide The 4-(3,4-dimethoxyphenyl)-2-(trifluoromethyl)pyrimidine-5-carbonyl chloride obtained in step 1 was dissolved in 5 ml of dry DCM, to which triethylamine (2.5 mmol) and 4-aminopyridine (0.2 g, 2.32 mmol) were added, which was maintained at 0° C. The reaction mixture was stirred at 0° C. for 15 minutes. Then, the reaction temperature was slowly raised to room temperature for 1 hour. The reaction was confirmed by TLC, and the reaction mixture was concentrated in vacuo. The concentrated mixture was purified by column chromatography using silica gel as a stationary phase. As a result, 4-(3,4-dimethoxyphenyl)-N-(pyridine-4-yl)-2-(trifluoromethyl)pyrimidine-5-carboxamide was obtained as a pale yellow solid (yield: 0.6 g, 70%).

TLC ($CH_2Cl_2$: $CH_3OH$, 9:0.5 v/v)
$R_f$=0.4
IR: 1687, 1591, 1266, 1146, 1024, 814 $cm^{-1}$
$^1$H NMR (500 MHz, $CDCl_3$) δ9.06 (s, 1 H), 8.43-8.38 (m, 2 H), 8.07 (s, 1 H), 7.48 (dd, J=8.4, 2.2 Hz, 1 H), 7.42 (d, J=2.2 Hz, 1 H), 7.37-7.32 (m, 2 H), 6.93 (d, J=8.4 Hz, 1 H), 3.90 (s, 3 H), 3.82 (s, 3 H); $^{13}$C NMR (500 MHz, $CDCl_3$) δ164.61, 163.04, 158.74, 152.61, 150.83, 149.58, 144.06, 128.39, 126.61, 123.33, 120.30, 113.60, 111.76, 111.33, 56.12, 56.03, 31.57, 22.63, 14.10; Q-TOF MS (ESI+) $C_{19}H_{15}F_3N_4O_3$ Calcd: 404.3492, found: 406.1403 (M+2).

<Example 26> Preparation of 4-(3,4-Dimethoxyphenyl)-N-(2-Morpholinoethyl)-2-(Trifluoromethyl)Pyrimidine-5-Carboxamide 4-(3,4-Dimethoxyphenyl)-N-(2-morpholinoethyl)-2-(trifluoromethyl)pyrimidine-5-carboxamide was prepared in the same manner as described in Example 25, except that 2-morpholinoethane-1-amine was used instead of 4-aminopyrimidine using the compound prepared in Preparative Example 1.

<Example 27> Preparation of 4-(3,4-Dimethoxyphenyl)-2-(Methylthio)-N-(2-Morpholinoethyl)Pyrimidine-5-Carboxamide 4-(3,4-Dimethoxyphenyl)-2-(methylthio)-N-(2-morpholinoethyl)pyrimidine-5-carboxamide was prepared in the same manner as described in Example 25, except that 2-morpholinoethane-1-amine was used instead of 4-aminopyrimidine using the compound prepared in Preparative Example 2.

<Example 28> Preparation of N-(3,4-Dimethoxyphenetyl)-4-(4-(2-Hydroxyethyl)Piperazine-1-Yl)-2-(Methylthio)Pyrimidine-5-Carboxamide N-(3,4-Dimethoxyphenetyl)-4-(4-(2-hydroxyethyl)piperazine-1-yl)-2-(methylthio)pyrimidine-5-carboxamide was prepared in the same manner as described in Example 25, except that 2-(3,4-dimethoxyphenyl)ethyl was used instead of 4-aminopyrimidine using the compound prepared in Preparative Example 4.

<Example 29> Preparation of N,4-Bis(3,4-Dimethoxyphenyl)-2-(Methylthio)Pyrimidine-5-Carboxamide N,4-bis(3,4-dimethoxyphenyl)-2-(methylthio)pyrimidine-5-carboxamide was prepared in the same manner as described in Example 25, except that 3,4-dimethoxyphenyl was used instead of 4-aminopyrimidine using the compound prepared in Preparative Example 2.

<Example 30> Preparation of N,4-Bis(3,4-Dimethoxyphenyl)-2-(Trifluoromethyl)Pyrimidine-5-Carboxamide N,4-bis(3,4-dimethoxyphenyl)-2-(trifluoromethyl)pyrimidine-5-carboxamide was prepared in the same manner as described in Example 25, except that 3,4-dimethoxyphenyl was used instead of 4-aminopyrimidine using the compound prepared in Preparative Example 1.

The chemical structures and formula names of the example compounds are shown in Table 1 below.

TABLE 1

| Example | Chemical Structure | Formula Name |
|---|---|---|
| 1 | | N-(3,4-dimethoxyphenyl)-2-(methylthio)-4-morpholinopyrimidine-5-carboxamide |
| 2 | | N-(3,5-dichloropyridine-4-yl)-4-(3,4-dimethoxyphenyl)-2-(methylthio)pyrimidine-5-carboxamide |

TABLE 1-continued

| Example | Chemical Structure | Formula Name |
|---|---|---|
| 3 | | 4-(3,4-dimethoxyphenyl)-2-(methylthio)-N-(pyridine-4-yl)pyrimidine-5-carboxamide |
| 4 | | N-(2-(1H-indole-3-yl)ethyl)-2-(methylthio)-4-morpholinopyrimidine-5-carboxamide |
| 5 | | 4-(3,4-dimethoxyphenyl)-2-(methylthio)-N-(tetrahydro-2H-pyran-4-yl)pyrimidine-5-carboxamide |
| 6 | | N-(4-fluorophenyl)-2-(methylthio)-4-morpholinopyrimidine-5-carboxamide |
| 7 | | N-(3,4-dimethoxyphenetyl)-2-(methylthio)-4-morpholinopyrimidine-5-carboxamide |
| 8 | | N-(2,4-dimethoxybenzyl)-4-morpholino-2-(trifluoromethyl)pyridine-5-carboxamide |

TABLE 1-continued

| Example | Chemical Structure | Formula Name |
|---|---|---|
| 9 | | N-(2,4-dimethoxybenzyl)-2-(methylthio)-4-morpholinopyrimidine-5-carboxamide |
| 10 | | N-(3,5-dichloropyridine-4-yl)-2-(methylthio)-4-morpholinopyrimidine-5-carboxamide |
| 11 | | N-(3,4-dimethoxyphenyl)-4-morpholino-2-(trifluoromethyl)pyrimidine-5-carboxamide |
| 12 | | 4-(3,4-dimethoxyphenyl)-N-(tetrahydro-2H-pyran-4-yl)-2-(trifluoromethyl)pyrimidine-5-carboxamide |
| 13 | | 4-(3,4-dimethoxyphenyl)-N,N-diethyl-2-(trifluoromethyl)pyrimidine-5-carboxamide |

TABLE 1-continued

| Example | Chemical Structure | Formula Name |
|---|---|---|
| 14 | | 4-(3,4-dimethoxyphenyl)-2-(methylsulfonyl)-N-(tetrahydro-2H-pyran-4-yl)pyrimidine-5-carboxamide |
| 15 | | N-cyclopropyl-4-(3,4-dimethoxyphenyl)-2-(trifluoromethyl)pyrimidine-5-carboxamide |
| 16 | | N-(3,5-dichloropyridine-4-yl)-4-(3,4-dimethoxyphenyl)-2-(trifluoromethyl)pyrimidine-5-carboxamide |
| 17 | | 4-(3,4-dimethoxyphenyl)-N,N-diethyl-2-(methylthio)pyrimidine-5-carboxamide |
| 18 | | N-cyclopropyl-4-(3,4-dimethoxyphenyl)-2-(methylthio)pyrimidine-5-carboxamide |

TABLE 1-continued

| Example | Chemical Structure | Formula Name |
|---|---|---|
| 19 | | N-cyclopropyl-4-(3,4-dimethoxyphenyl)-2-(methylsulfonyl)pyrimidine-5-carboxamide |
| 20 | | N-(4-amino-3,5-diisopropylphenyl)-4-(3,4-dimethoxyphenyl)-2-(methylthio)pyrimidine-5-carboxamide |
| 21 | | N-(4-amino-3,5-diisopropylphenyl)-4-(3,4-dimethoxyphenyl)-2-(trifluoromethyl)pyrimidine-5-carboxamide |
| 22 | | N-(3,4-dimethoxyphenyl)-4-(4-(2-hydroxyethyl)piperazine-1-yl)-2-(methylthio)pyrimidine-5-carboxamide |
| 23 | | N-(3,4-dimethoxyphenetyl)-4-morpholino-2-(trifluoromethyl)pyrimidine-5-carboxamide |

TABLE 1-continued

| Example | Chemical Structure | Formula Name |
| --- | --- | --- |
| 24 | | N-(2-(1H-indole-3-yl)ethyl)-4-morpholino-2-(trifluoromethyl)pyrimidine-5-carboxamide |
| 25 | | 4-(3,4-dimethoxyphenyl)-N-(pyridine-4-yl)-2-(trifluoromethyl)pyrimidine-5-carboxamide |
| 26 | | 4-(3,4-dimethoxyphenyl)-N-(2-morpholinoethyl)-2-(trifluoromethyl)pyrimidine-5-carboxamide |
| 27 | | 4-(3,4-dimethoxyphenyl)-2-(methylthio)-N-(2-morpholinoethyl)pyrimidine-5-carboxamide |
| 28 | | N-(3,4-dimethoxyphenetyl)-4-(4-(2-hydroxyethyl)piperazine-1-yl)-2-(methylthio)pyrimidine-5-carboxamide |

TABLE 1-continued

| Example | Chemical Structure | Formula Name |
|---|---|---|
| 29 | | N,4-bis(3,4-dimethoxyphenyl)-2-(methylthio)pyrimidine-5-carboxamide |
| 30 | | N,4-bis(3,4-dimethoxyphenyl)-2-(trifluoromethyl)pyrimidine-5-carboxamide |

NMR Data of Example Compounds

Figure 17:
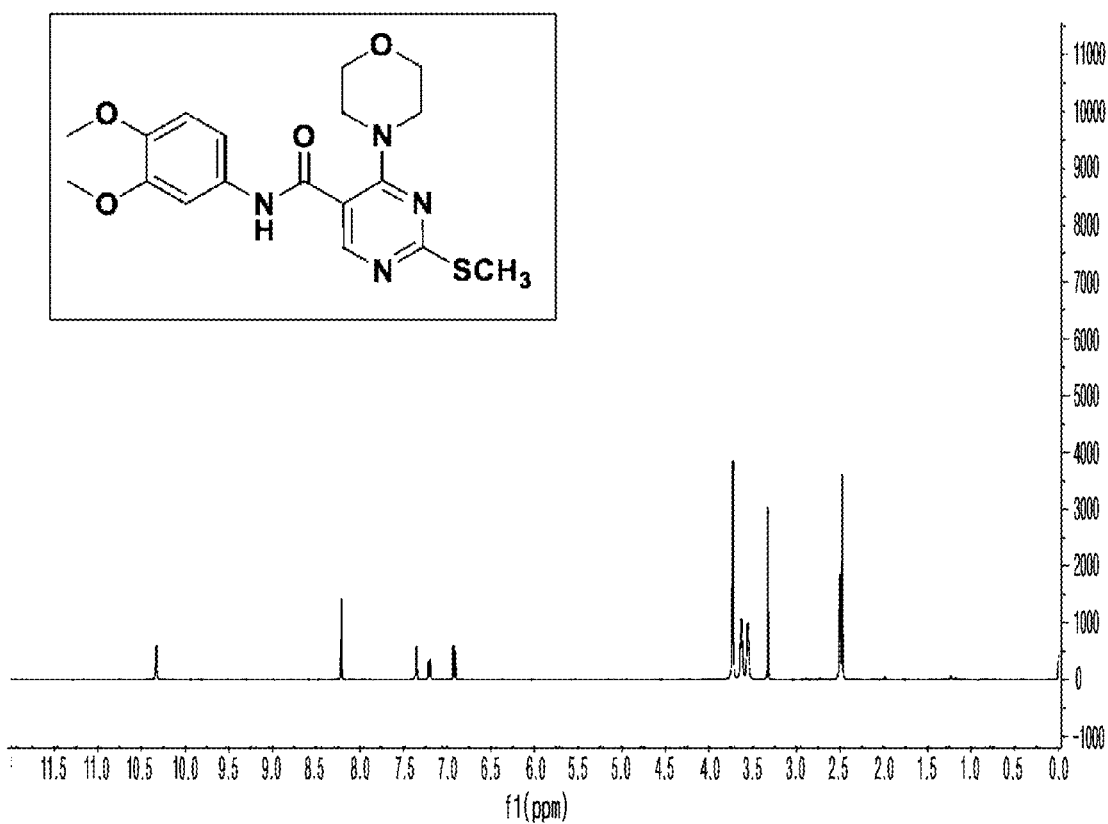
FIG. 17 is a 1H-NMR of the compound of Example 1.
Figure 73:
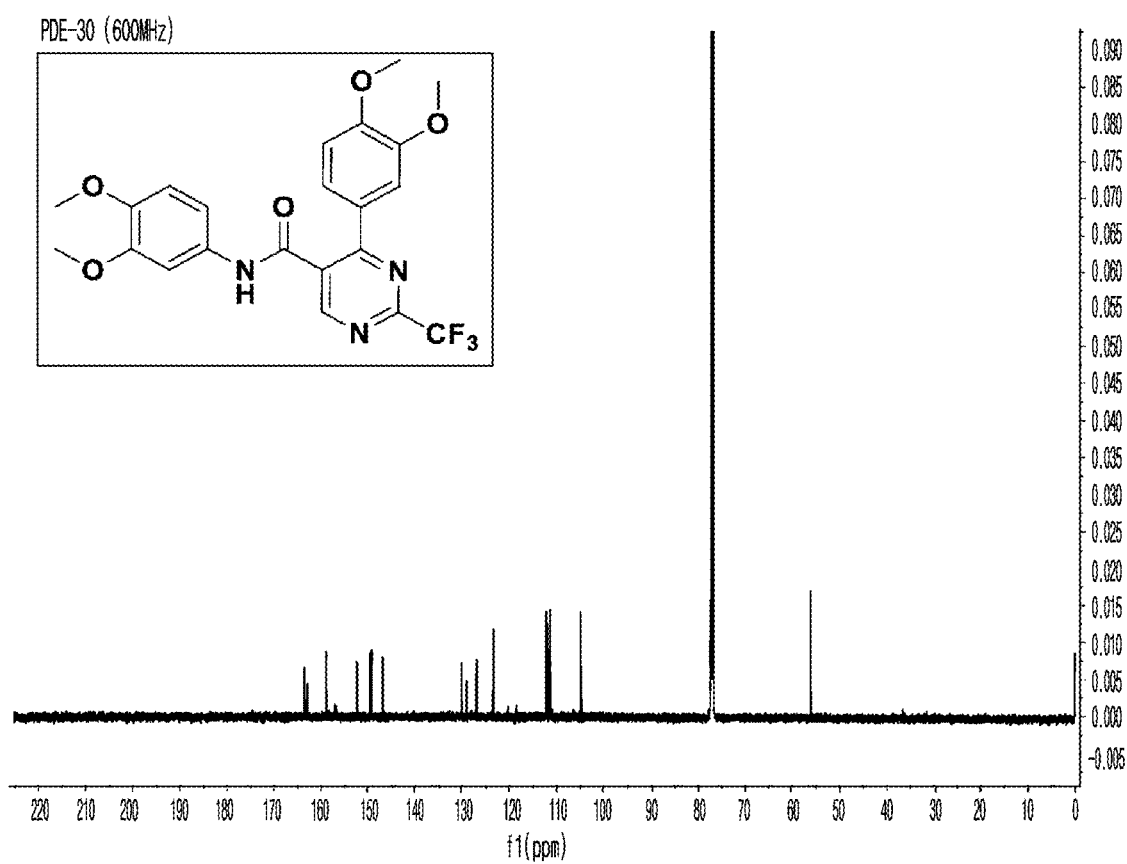
FIG. 73 is a 13C-NMR of the compound of Example 30.

NMR data of the compounds of Examples 1-30 are shown in FIGS. 17-73.

Figure 18:
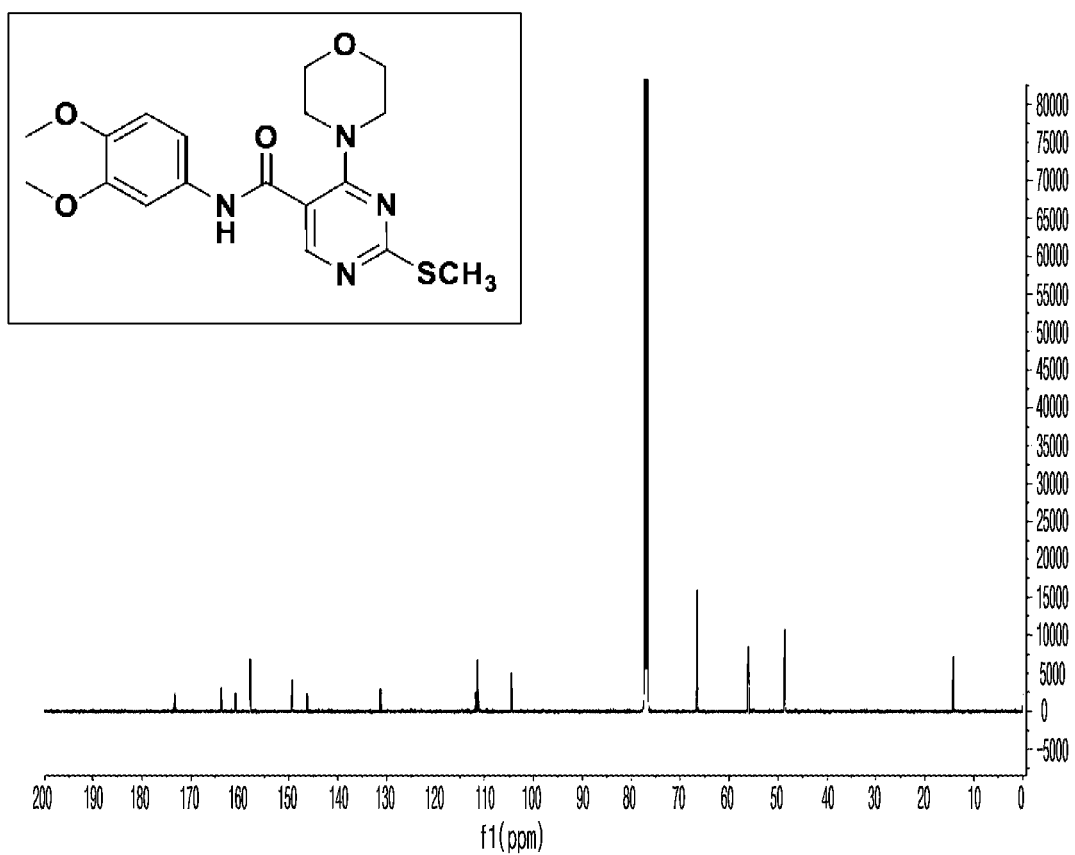
FIG. 18 is a 13C-NMR of the compound of Example 1.
Figure 19:
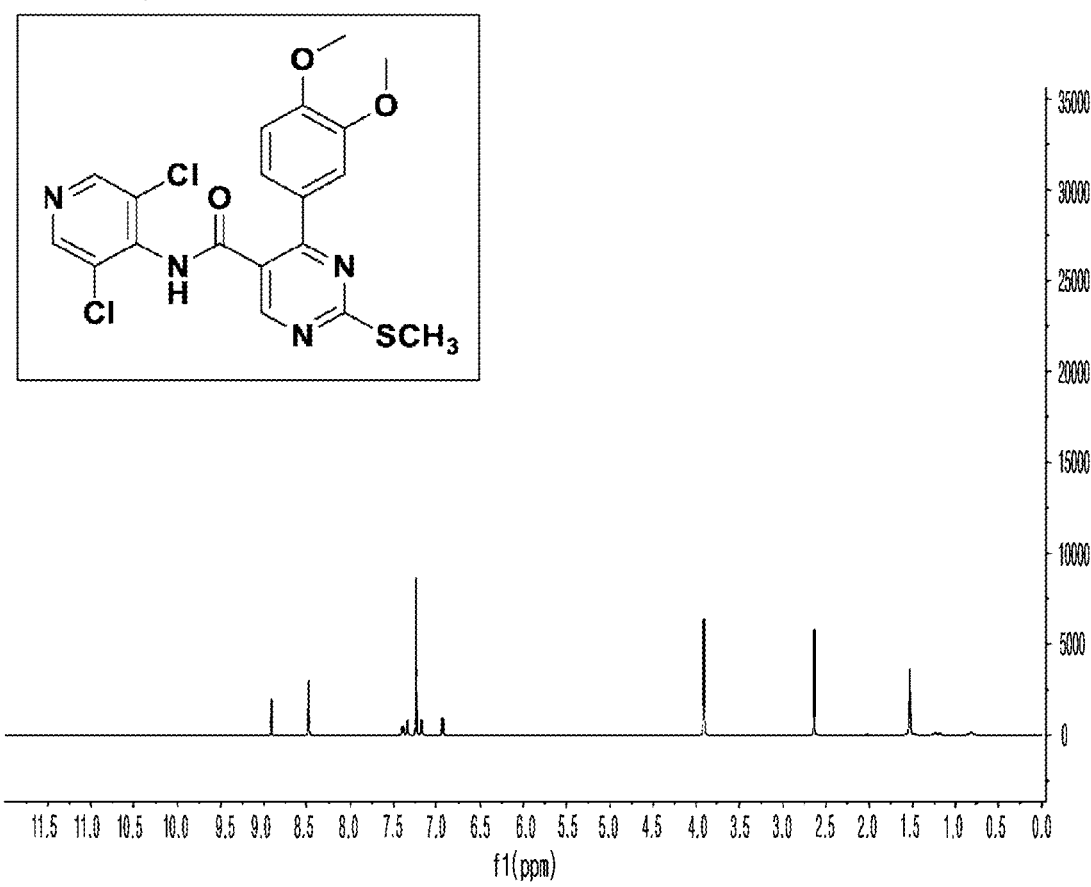
FIG. 19 is a 1H-NMR of the compound of Example 2.
Figure 20:
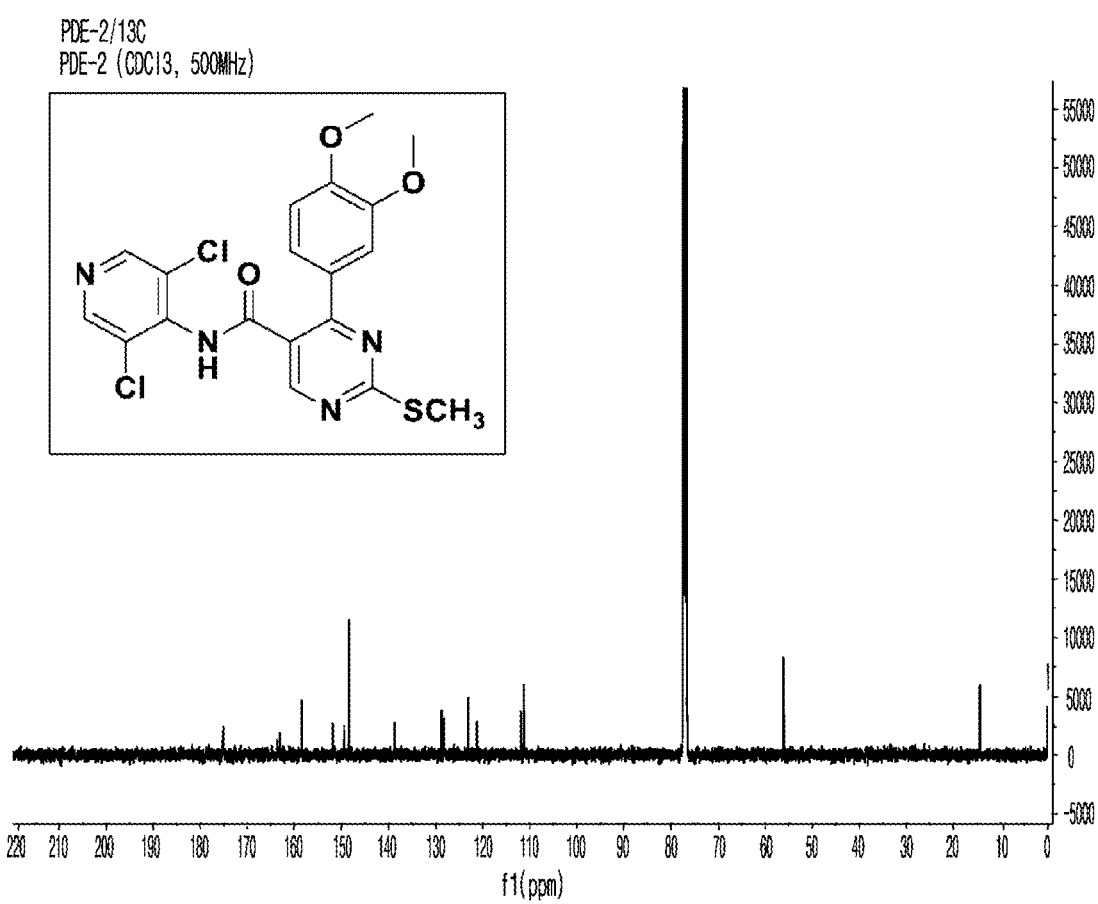
FIG. 20 is a 13C-NMR of the compound of Example 2.
Figure 21:
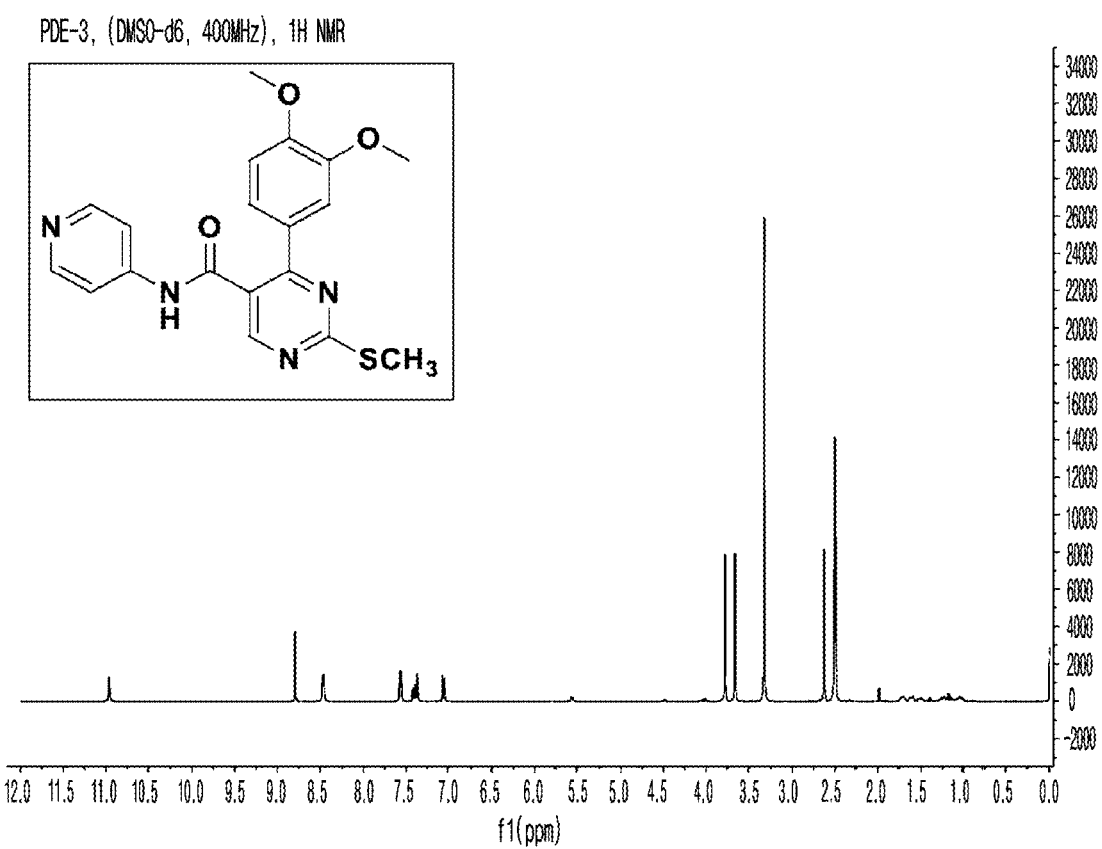
FIG. 21 is a 1H-NMR of the compound of Example 3.
Figure 22:
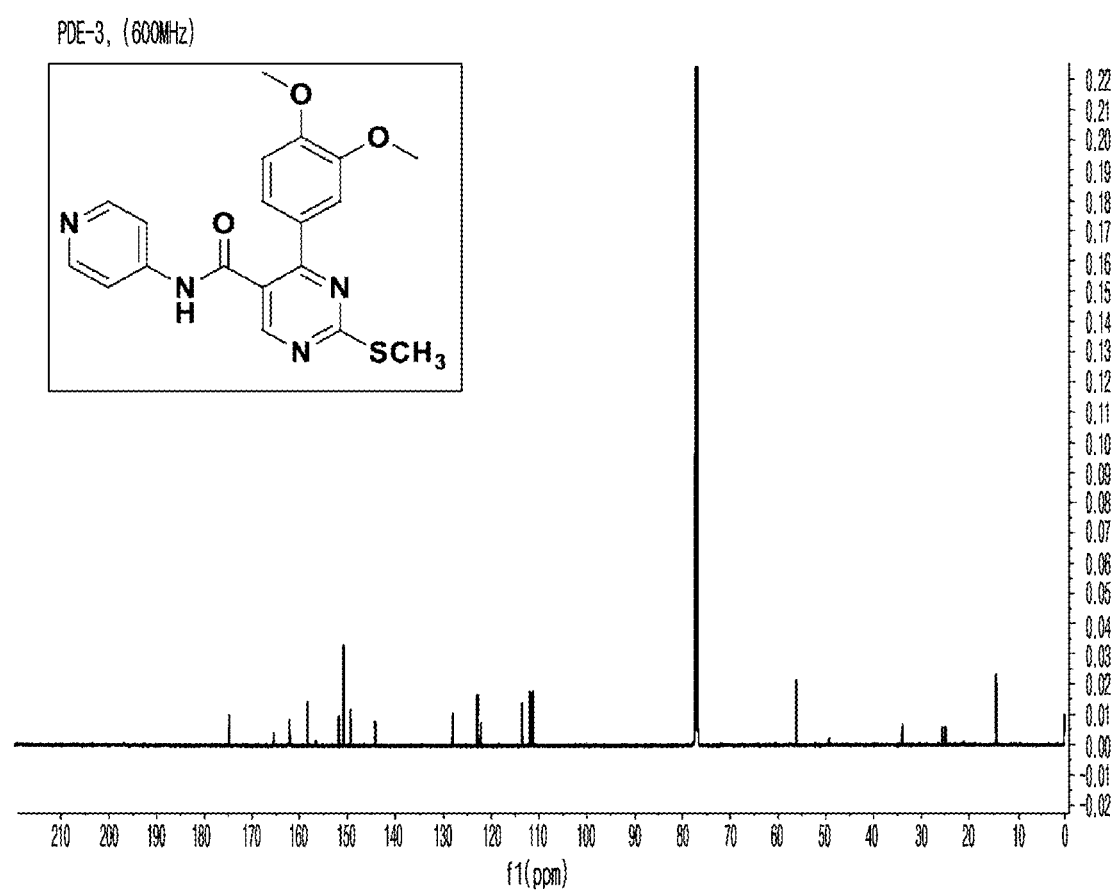
FIG. 22 is a 13C-NMR of the compound of Example 3.
Figure 23:
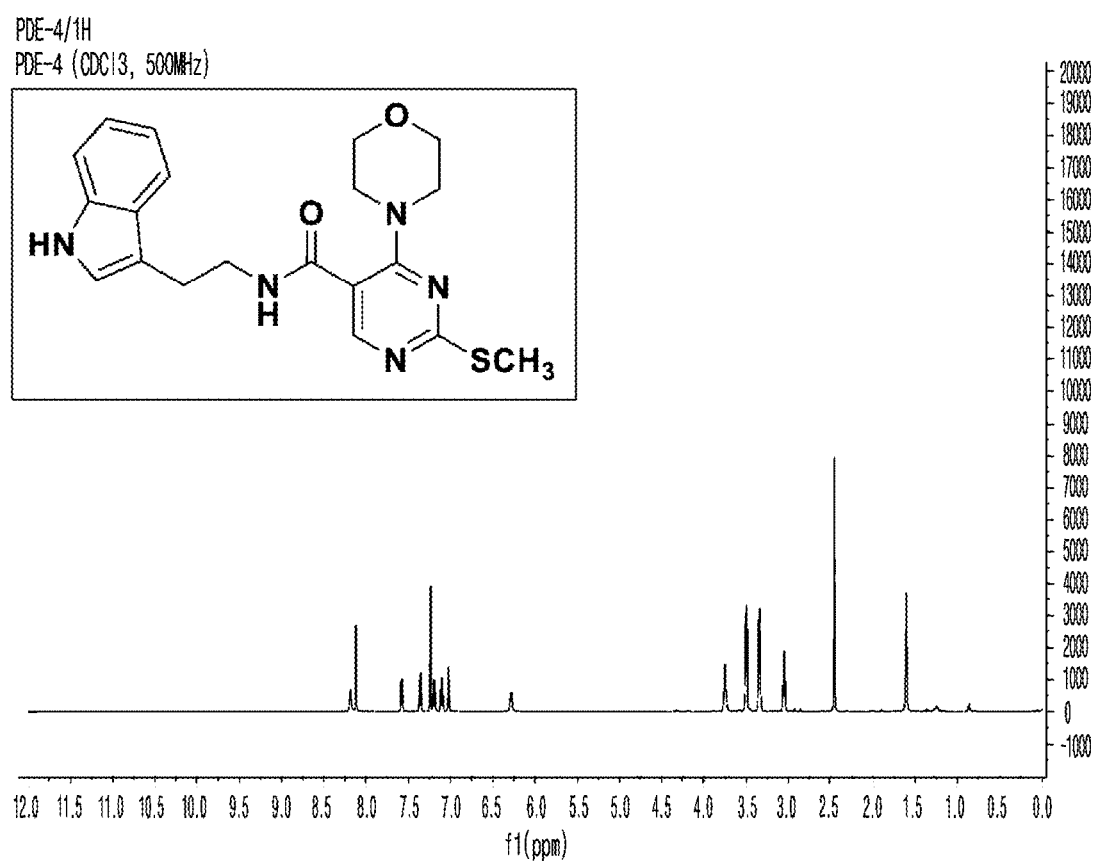
FIG. 23 is a 1H-NMR of the compound of Example 4.
Figure 24:
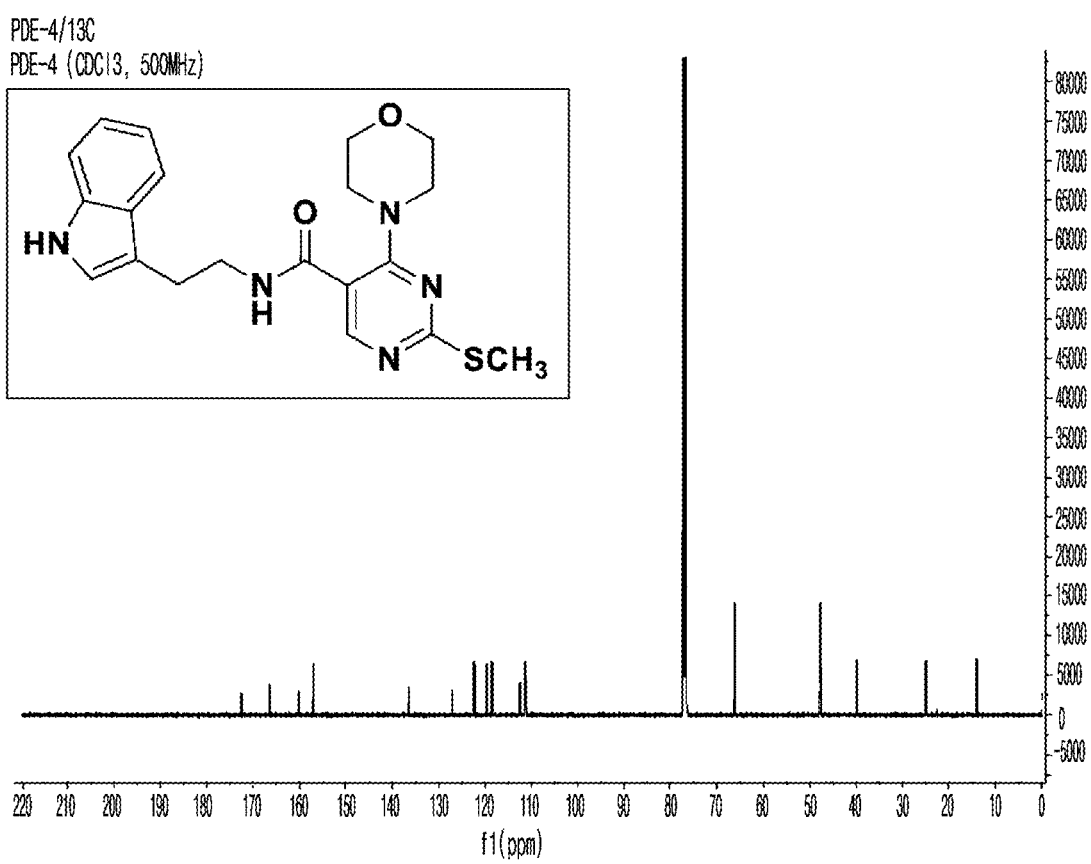
FIG. 24 is a 13C-NMR of the compound of Example 4.
Figure 25:
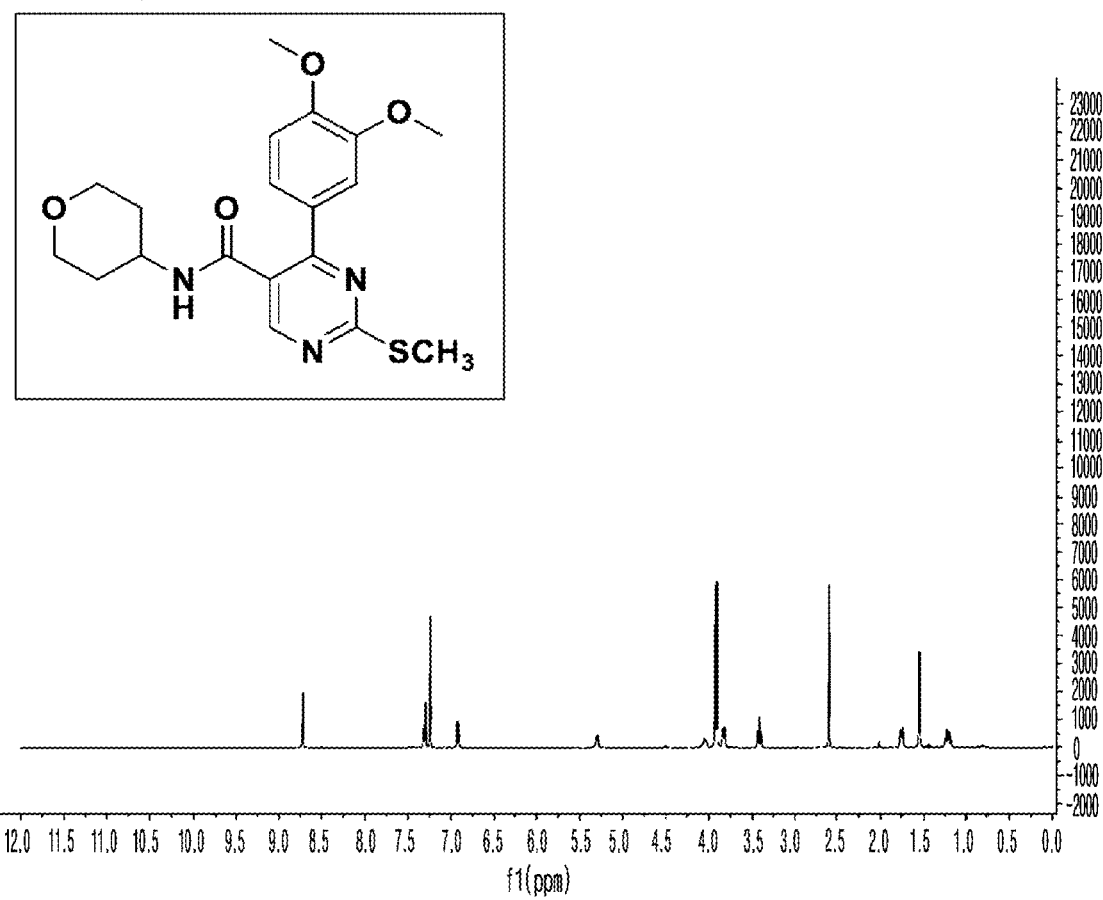
FIG. 25 is a 1H-NMR of the compound of Example 5.
Figure 26:
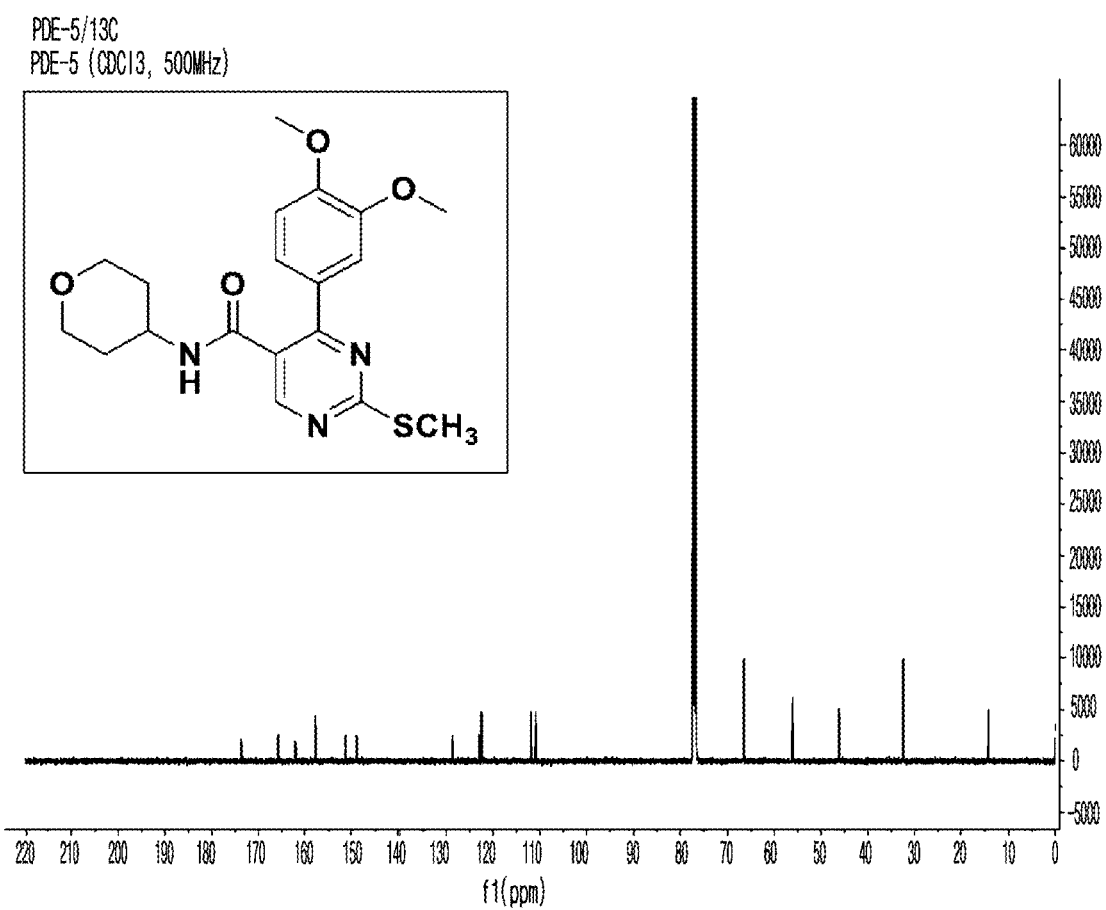
FIG. 26 is a 1C-NMR of the compound of Example 5.
Figure 27:
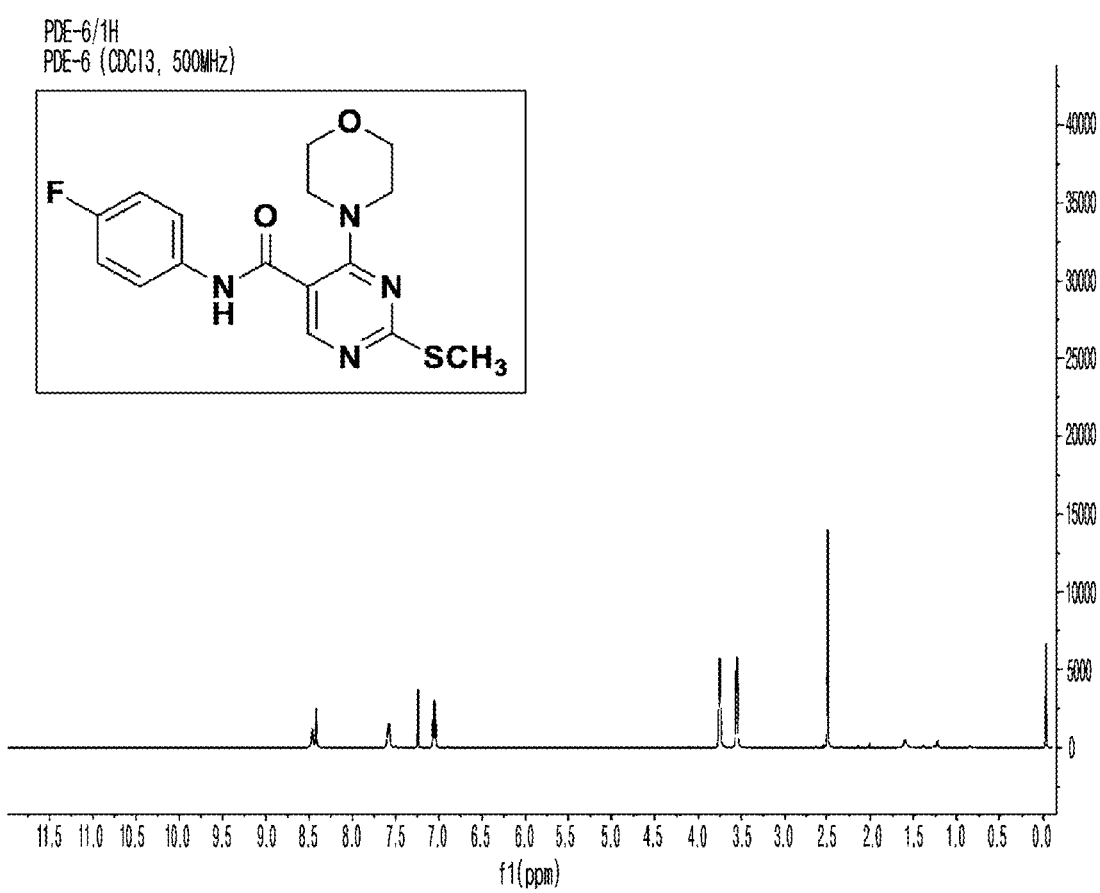
FIG. 27 is a 1H-NMR of the compound of Example 6.
Figure 28:
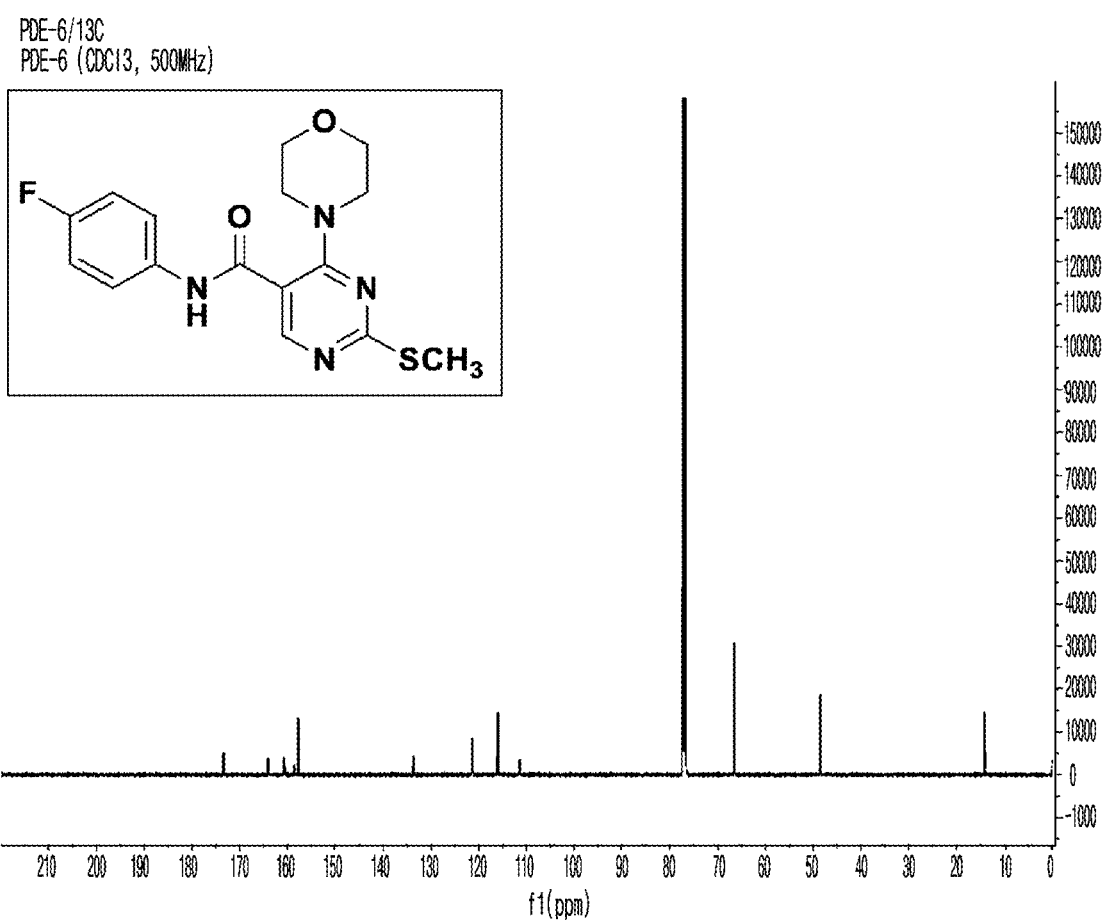
FIG. 28 is a 13C-NMR of the compound of Example 6.
Figure 29:
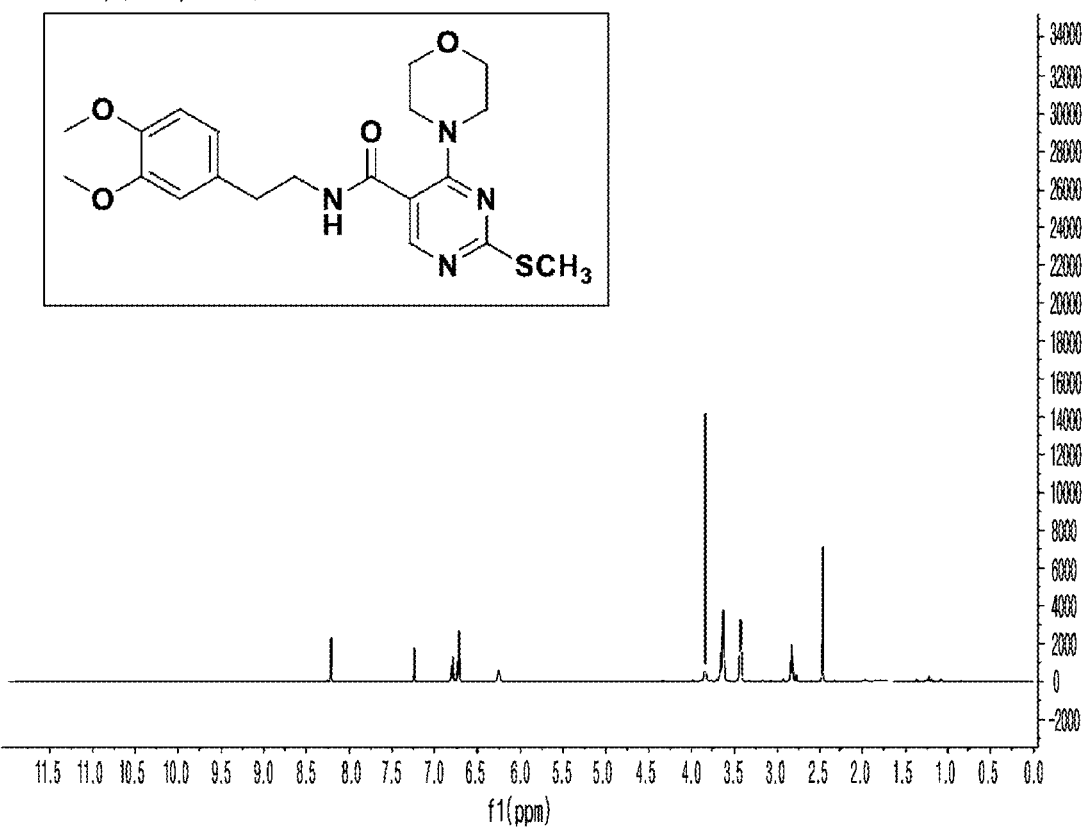
FIG. 29 is a 1H-NMR of the compound of Example 7.
Figure 30:
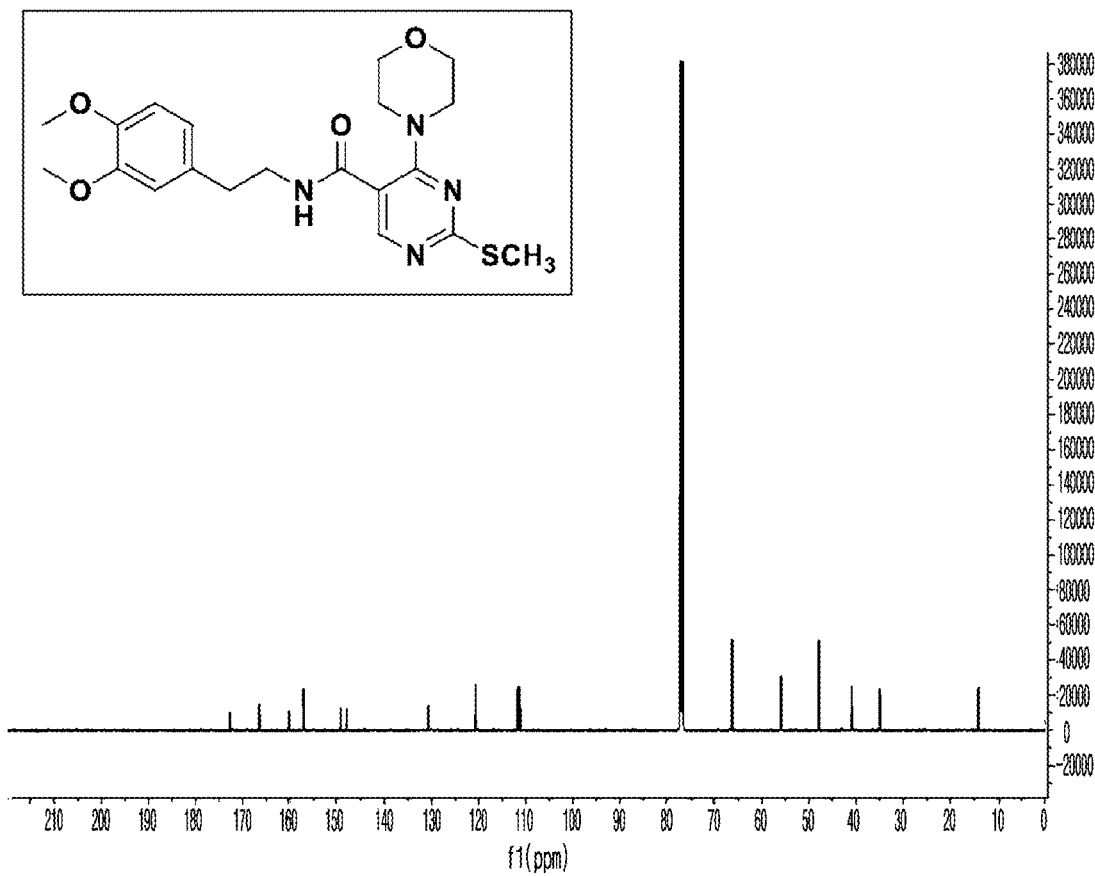
FIG. 30 is a 13C-NMR of the compound of Example 7.
Figure 31:
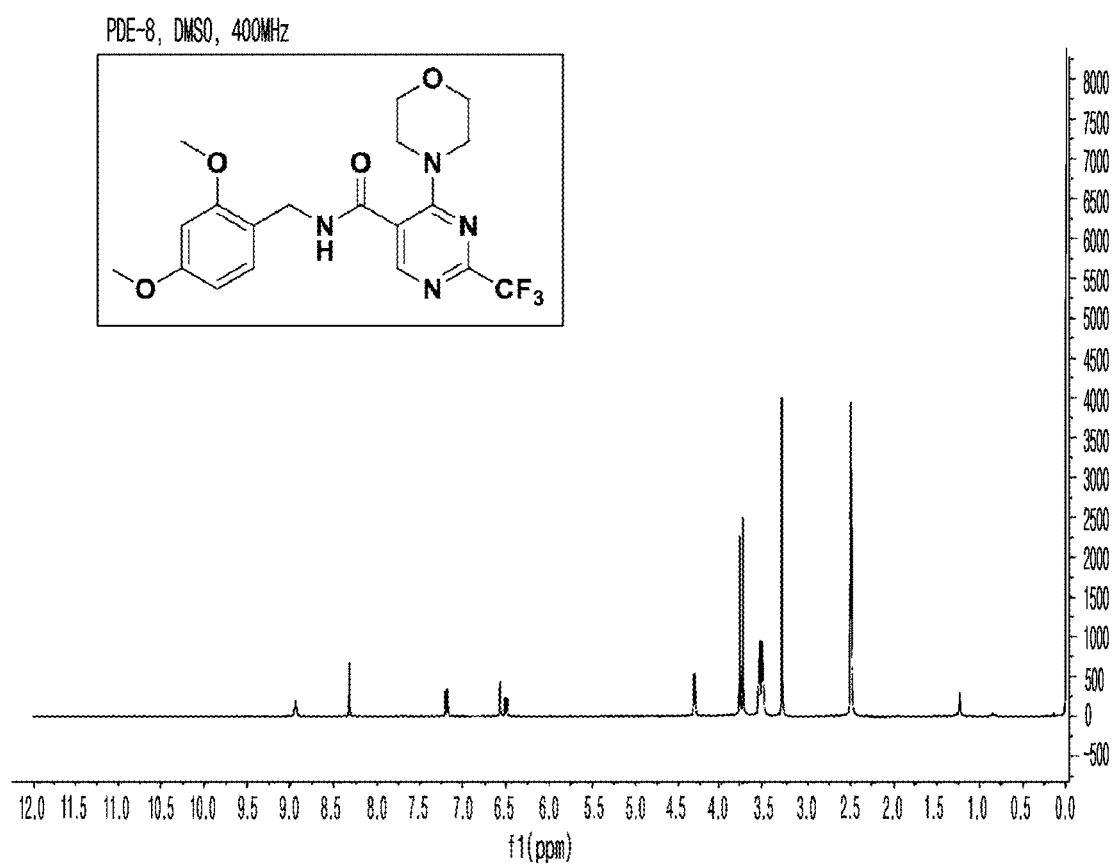
FIG. 31 is a 1H-NMR of the compound of Example 8.
Figure 32:
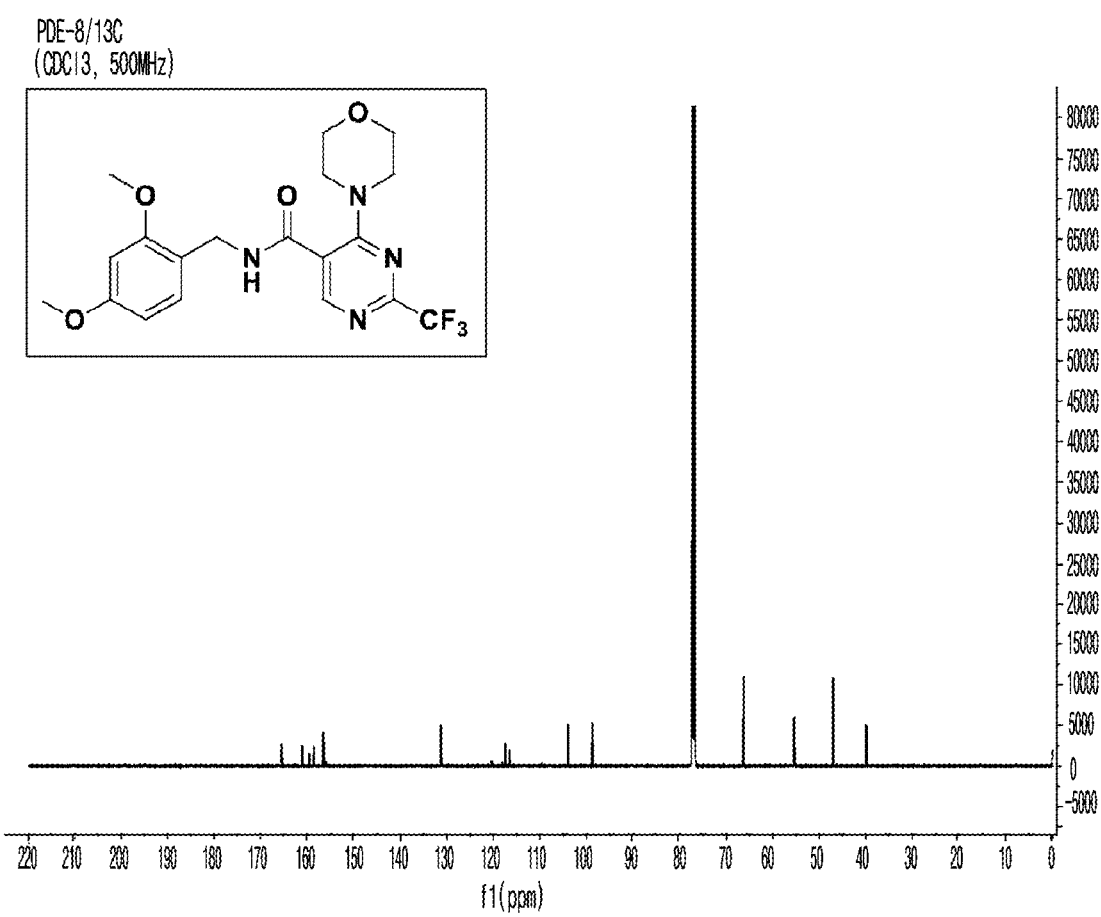
FIG. 32 is a 13C-NMR of the compound of Example 8.
Figure 33:
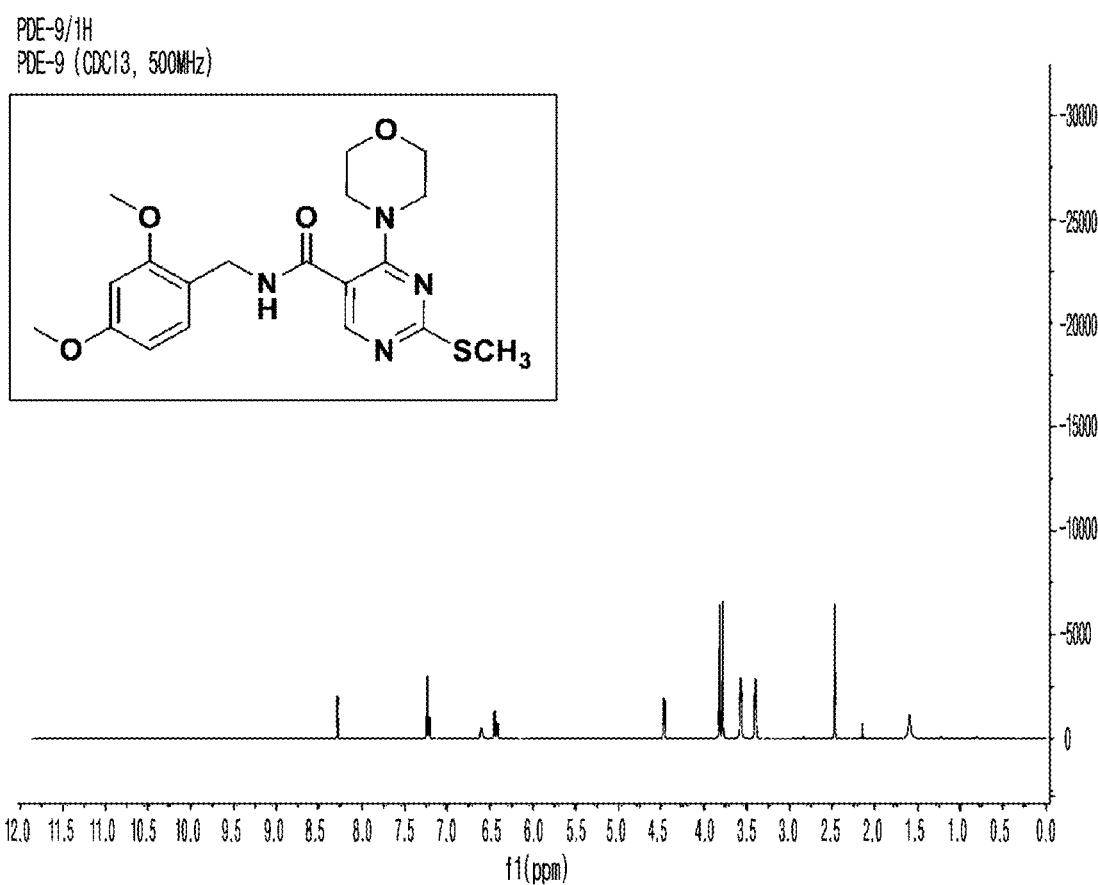
FIG. 33 is a 1H-NMR of the compound of Example 9.
Figure 34:
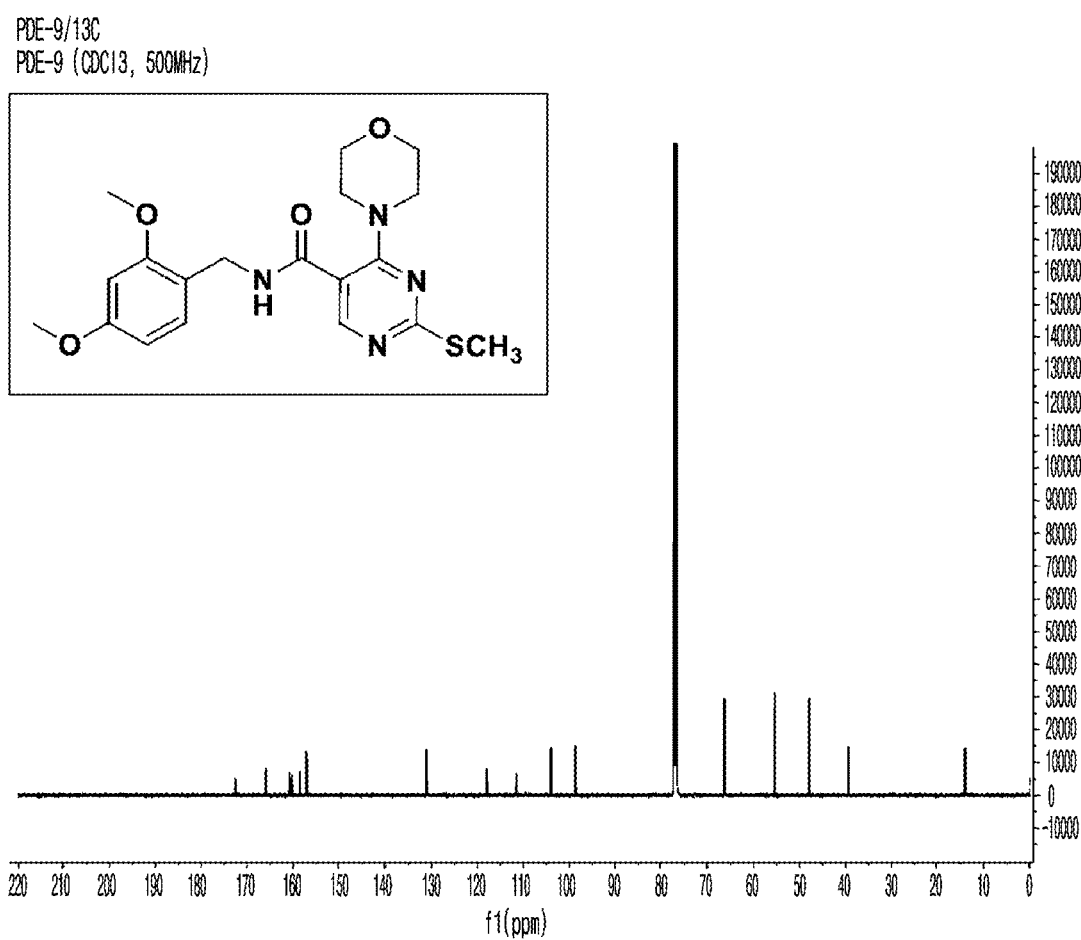
FIG. 34 is a 13C-NMR of the compound of Example 9.
Figure 35:
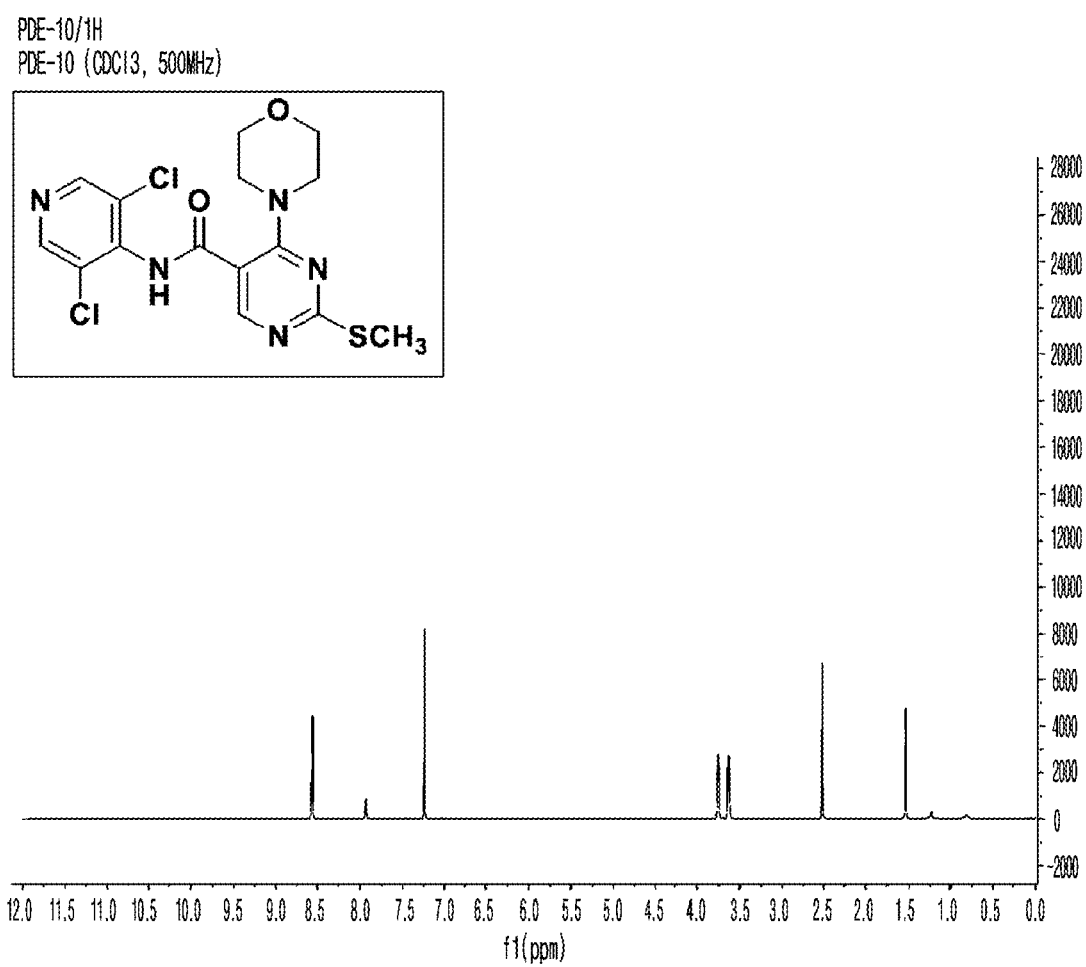
FIG. 35 is a 13H-NMR of the compound of Example 10.
Figure 36:
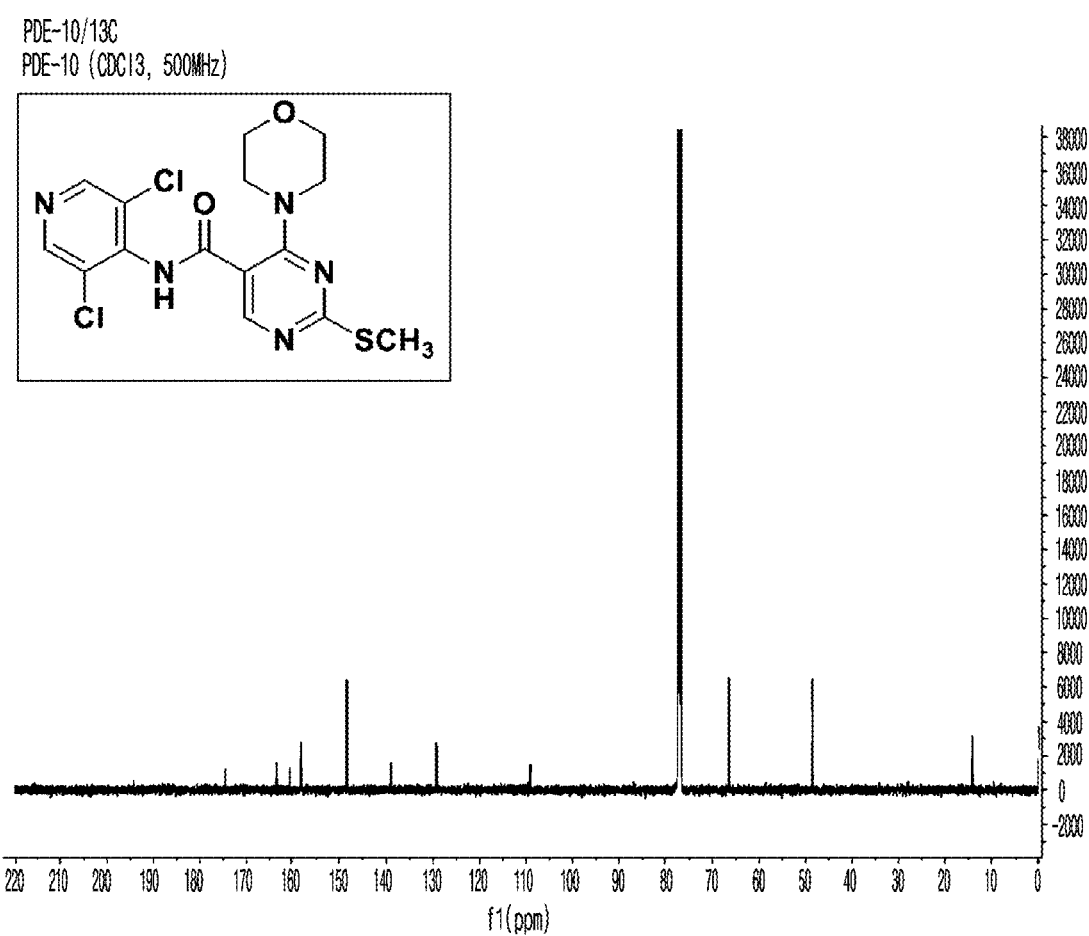
FIG. 36 is a 13C-NMR of the compound of Example 10.
Figure 37:
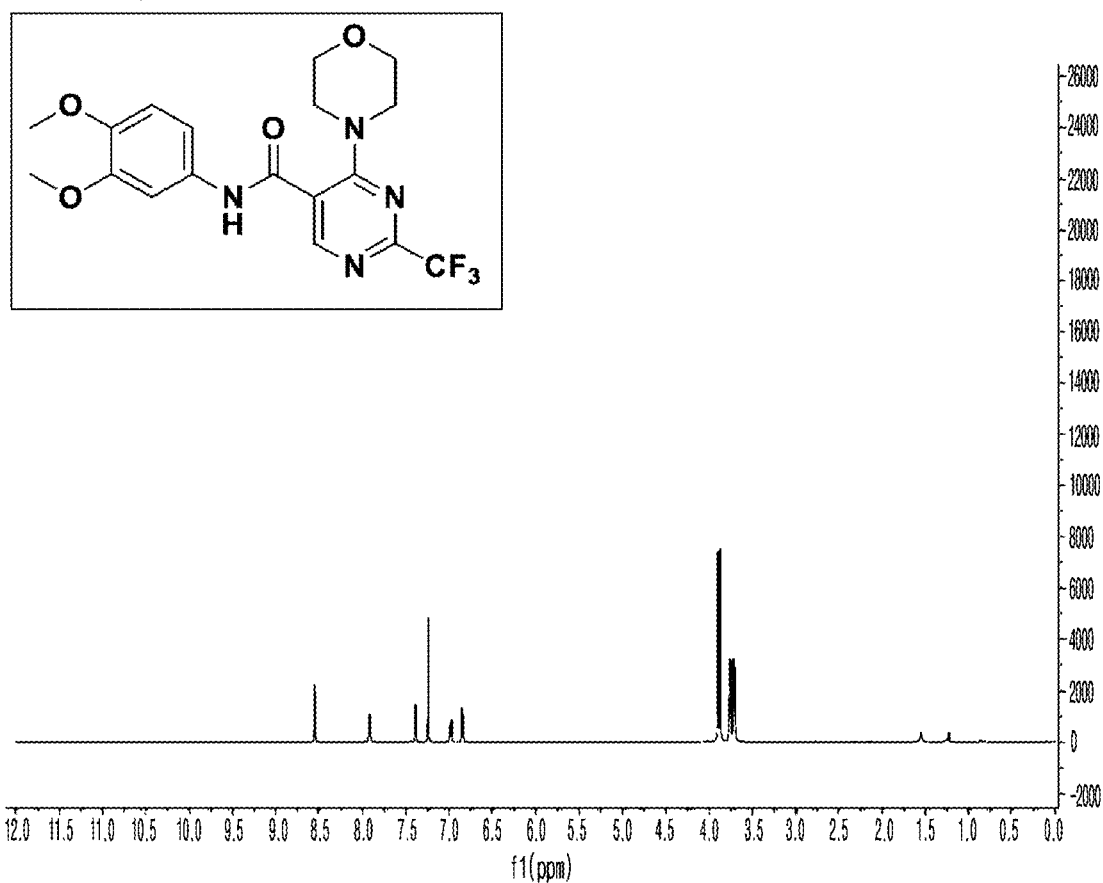
FIG. 37 is a 13H-NMR of the compound of Example 11.
Figure 38:
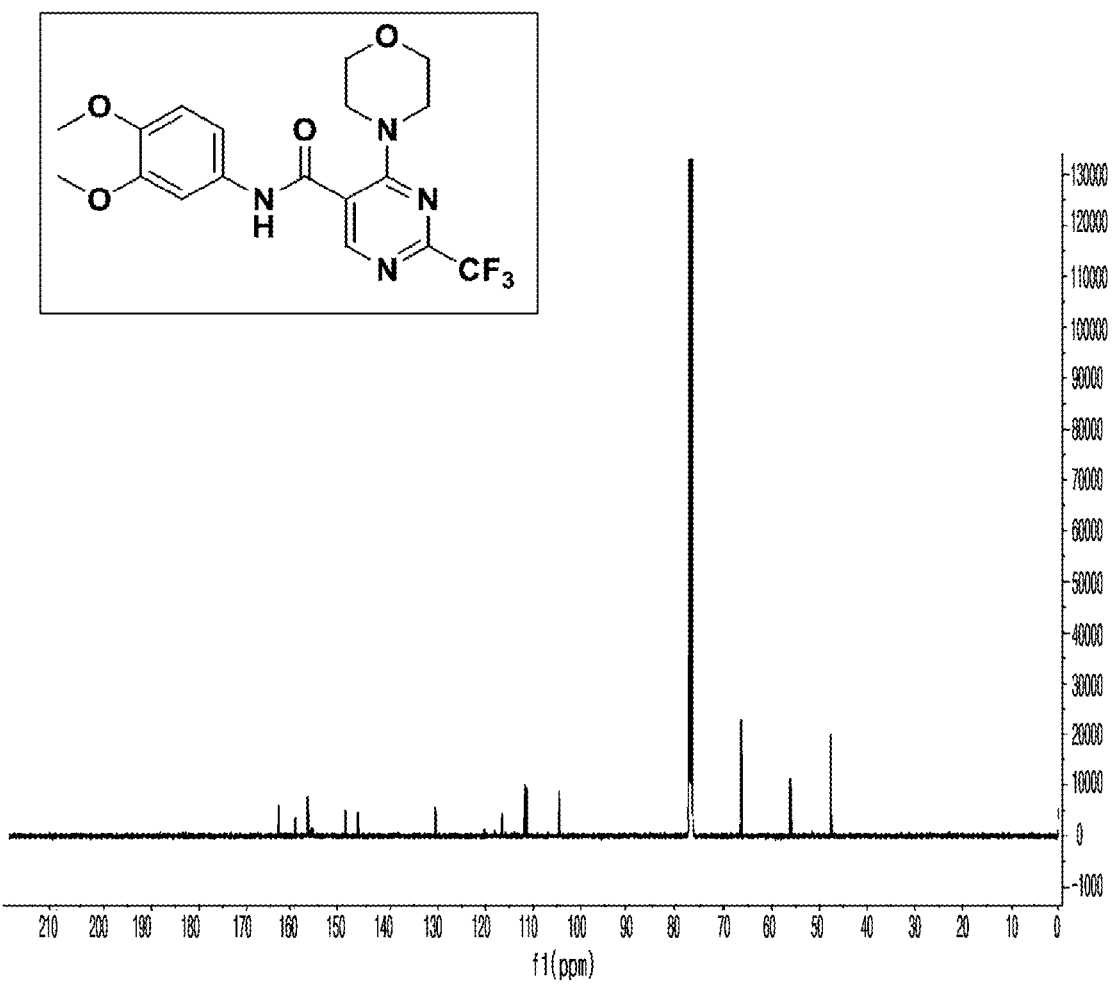
FIG. 38 is a 13C-NMR of the compound of Example 11.
Figure 39:
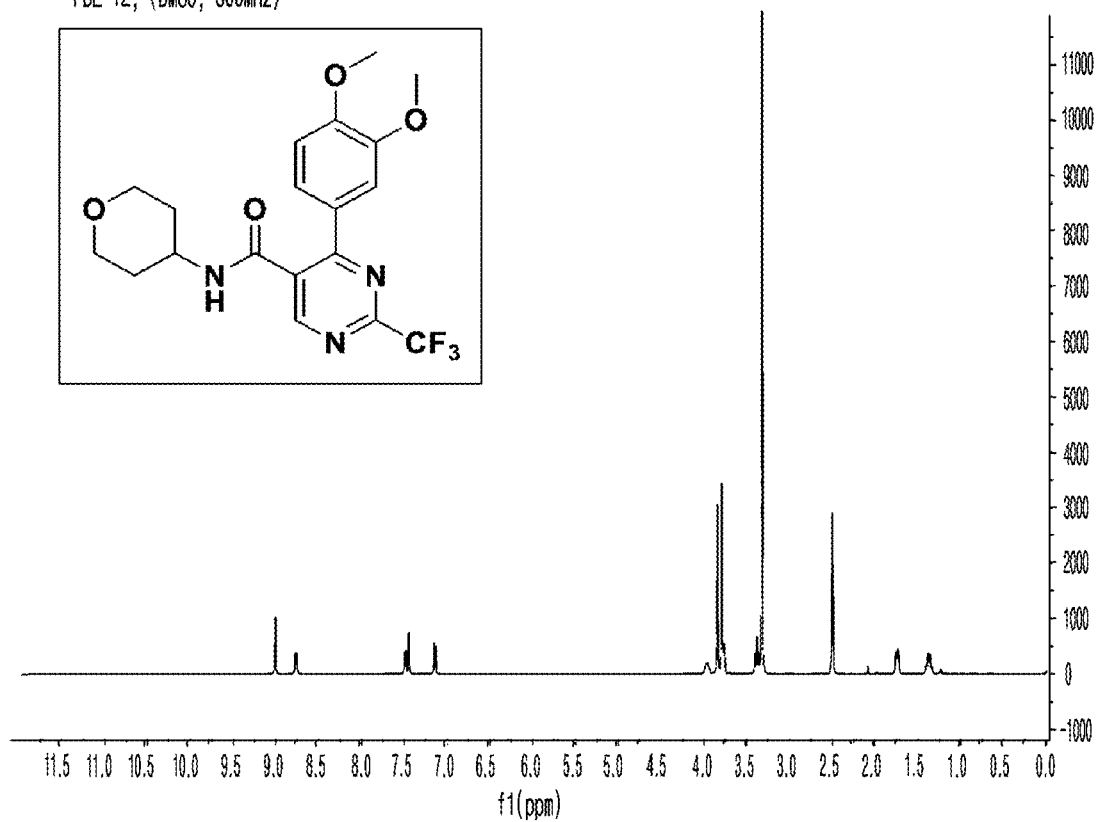
FIG. 39 is a 13H-NMR of the compound of Example 12.
Figure 40:
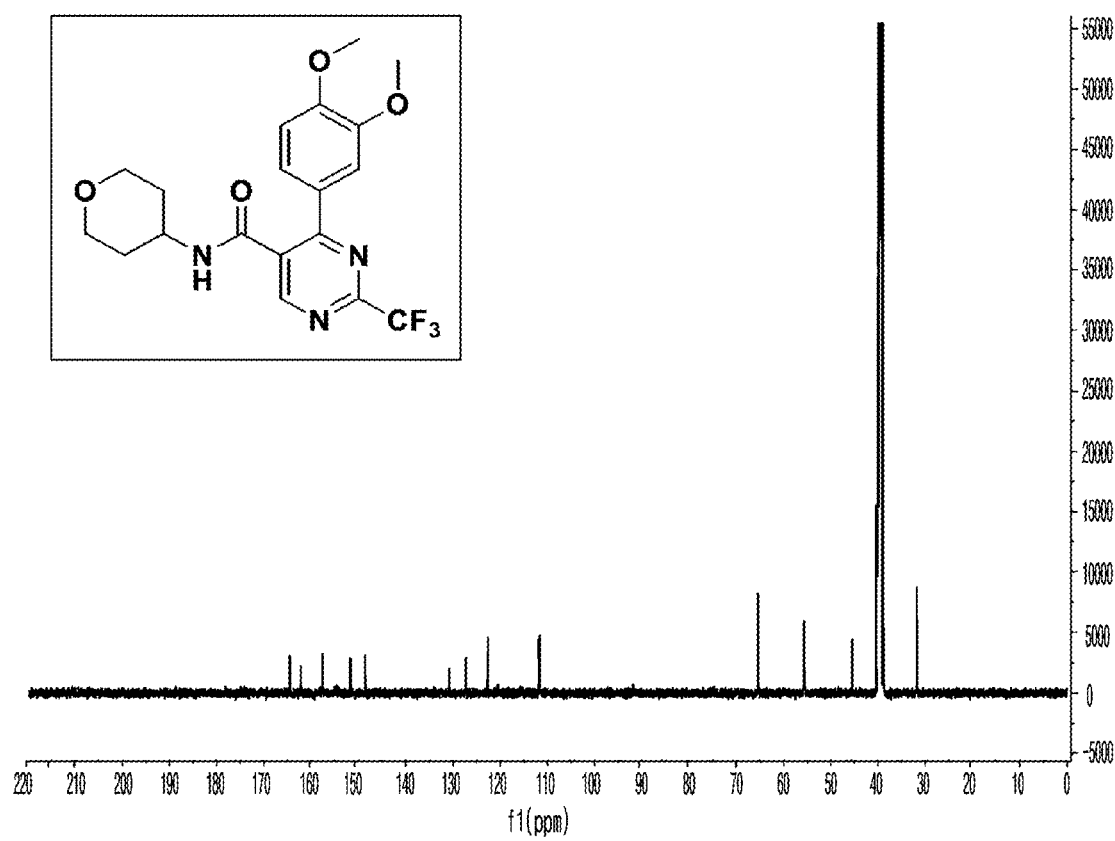
FIG. 40 is a 13C-NMR of the compound of Example 12.
Figure 41:
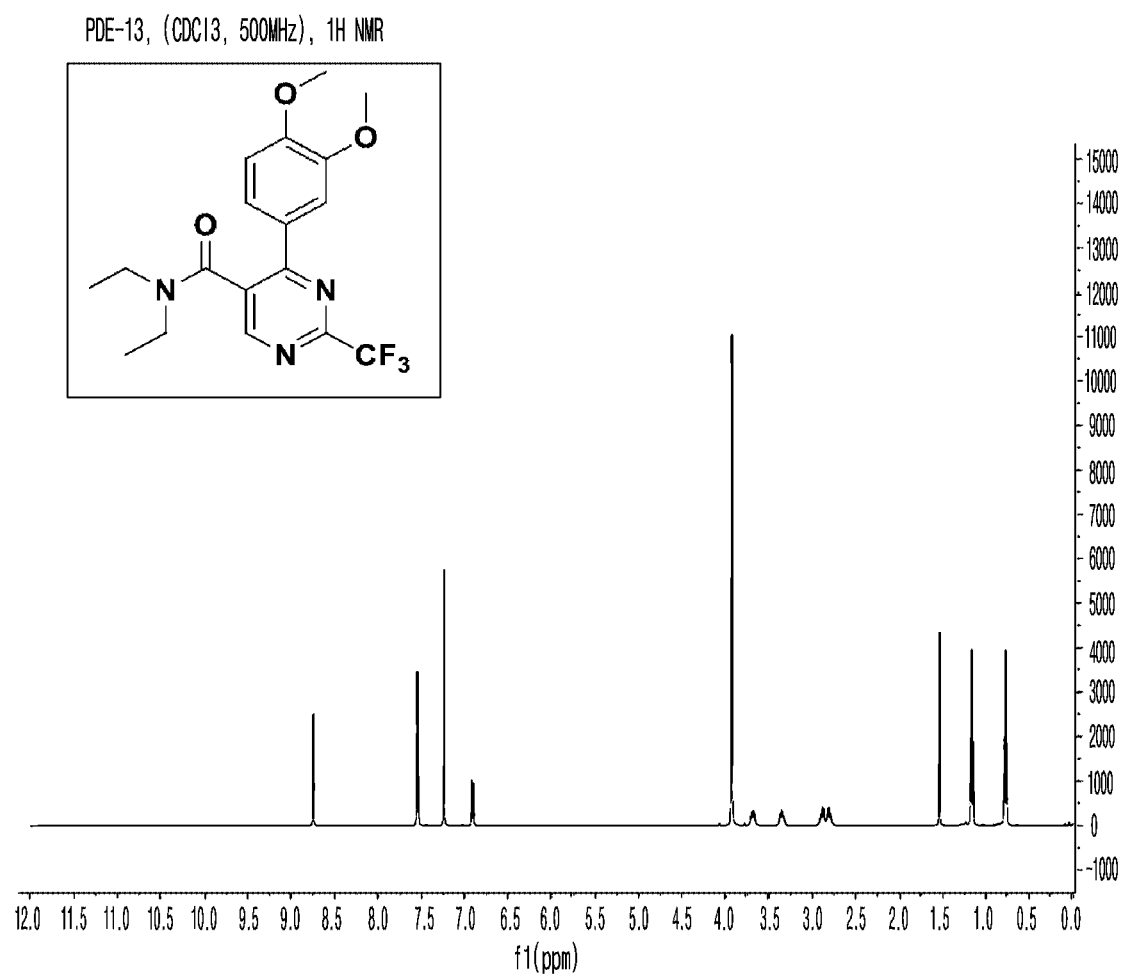
FIG. 41 is a 13H-NMR of the compound of Example 13.
Figure 42:
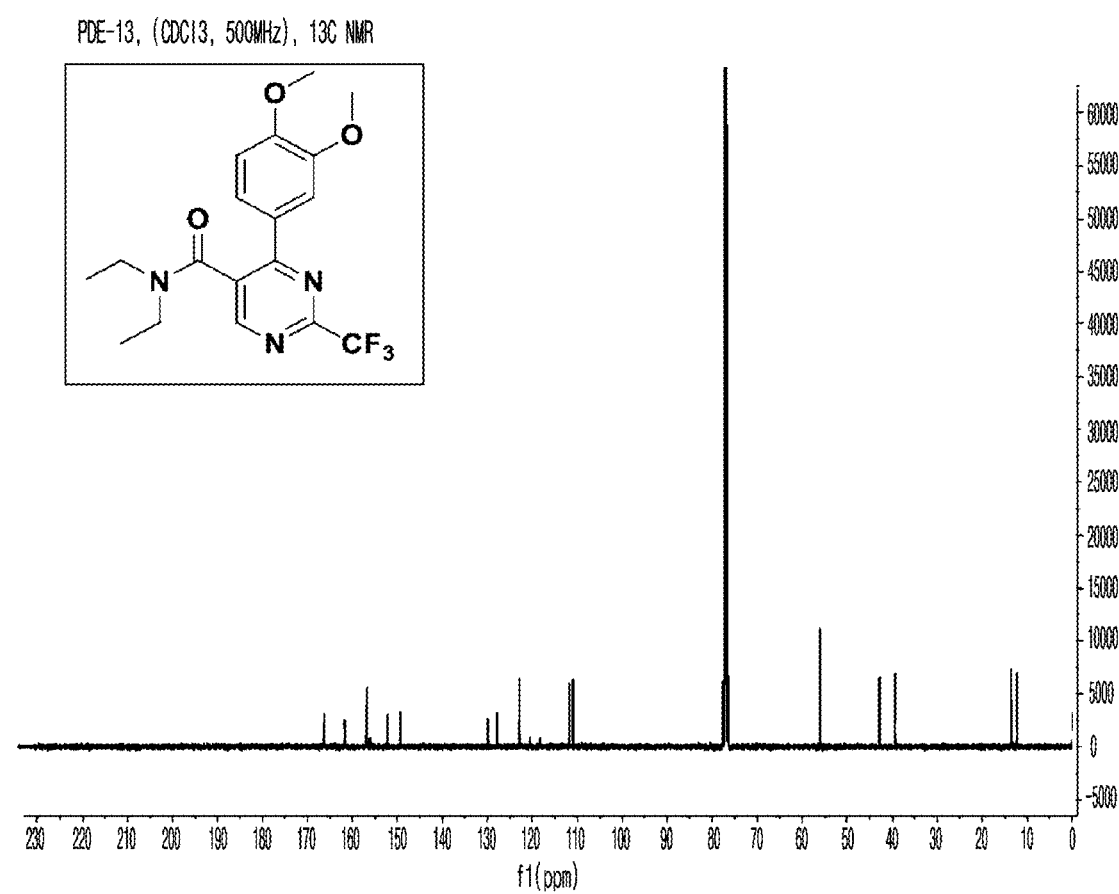
FIG. 42 is a 13C-NMR of the compound of Example 13.
Figure 43:
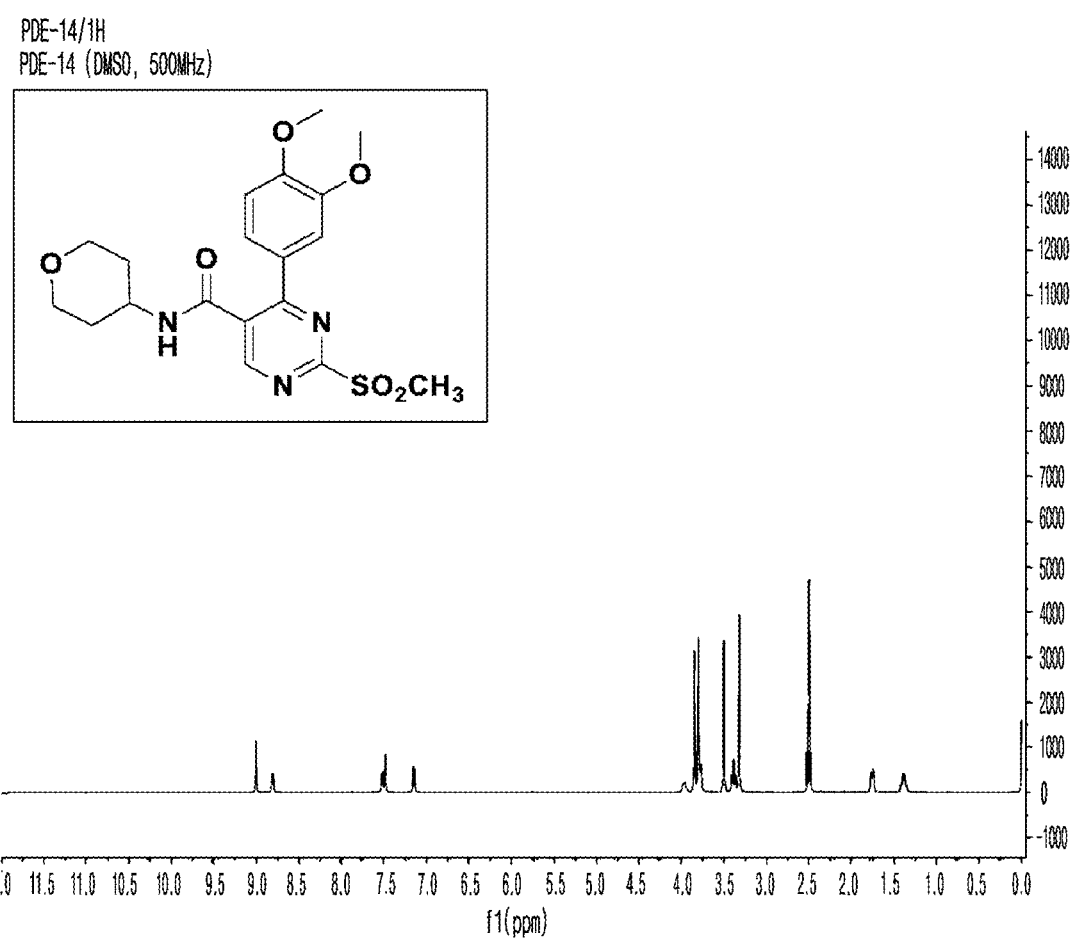
FIG. 43 is a 13H-NMR of the compound of Example 14.
Figure 44:
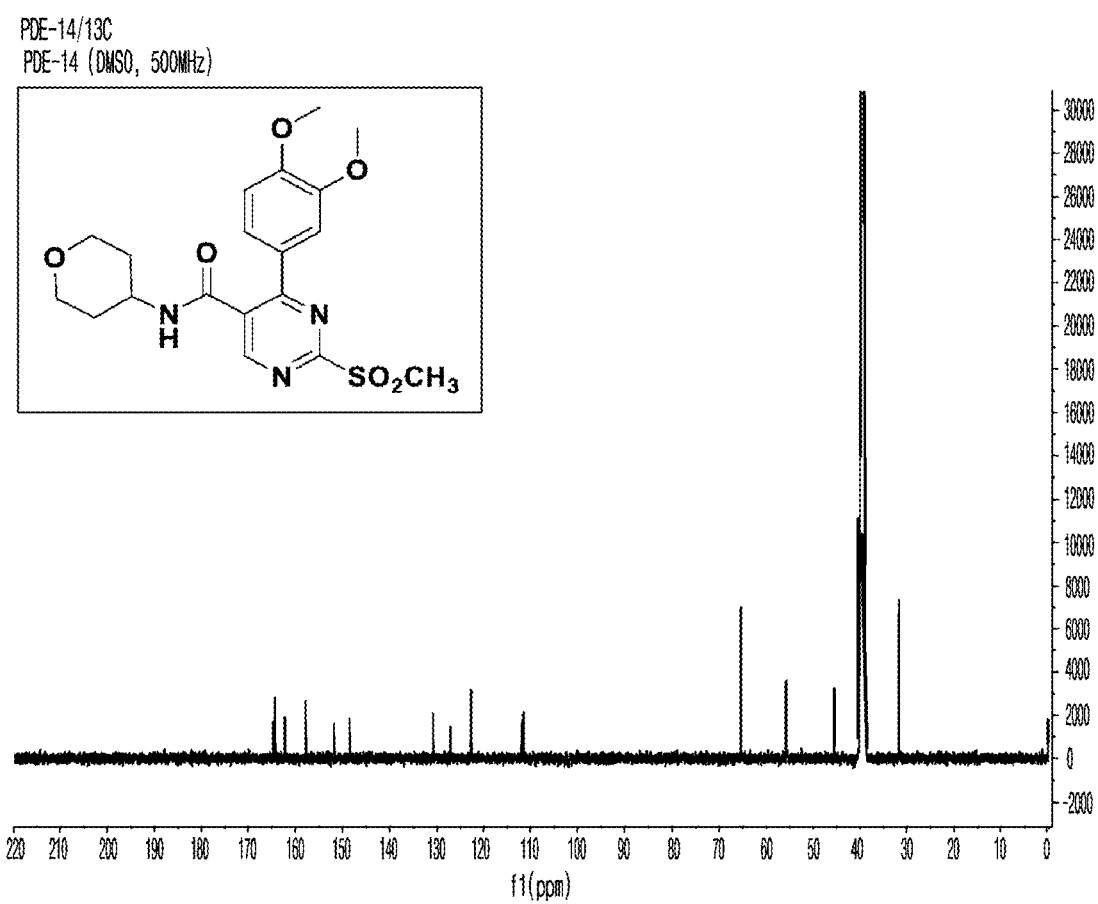
FIG. 44 is a 13C-NMR of the compound of Example 14.
Figure 45:
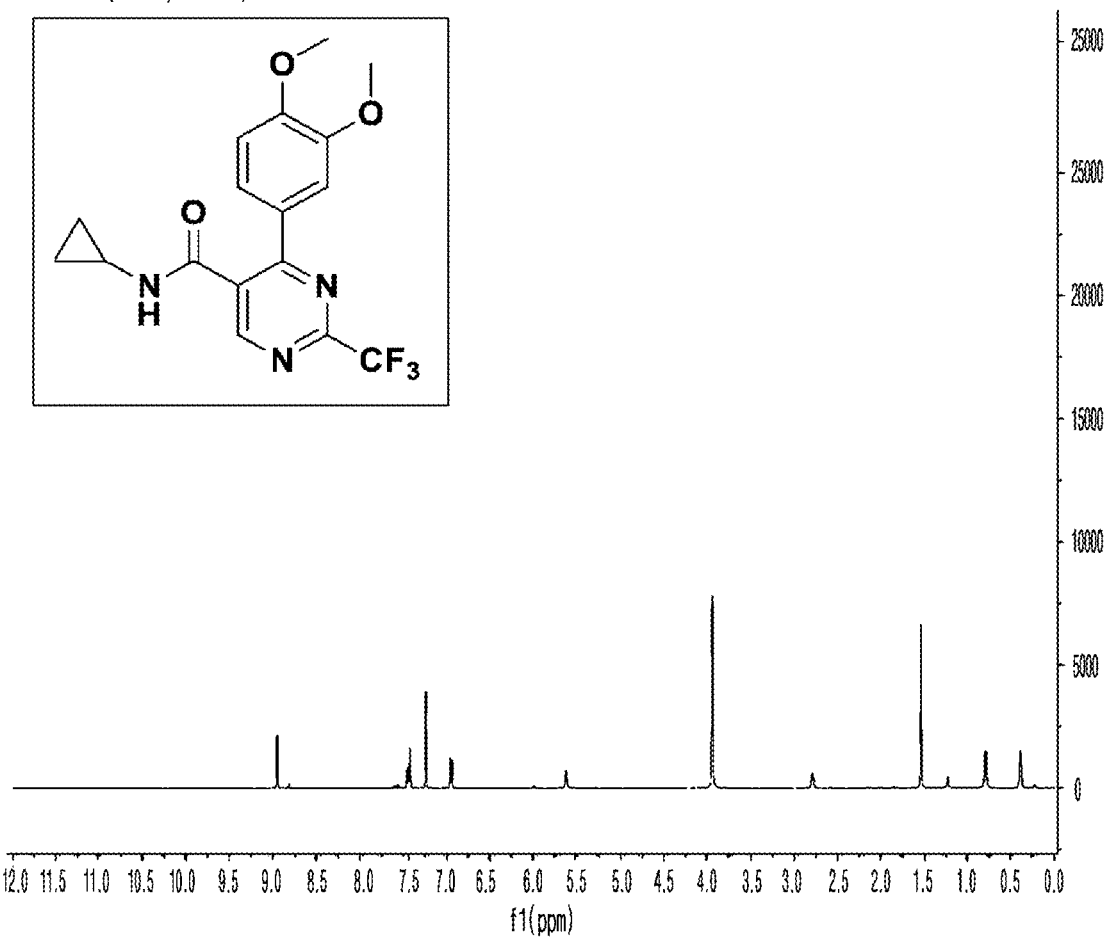
FIG. 45 is a 13H-NMR of the compound of Example 15.
Figure 46:
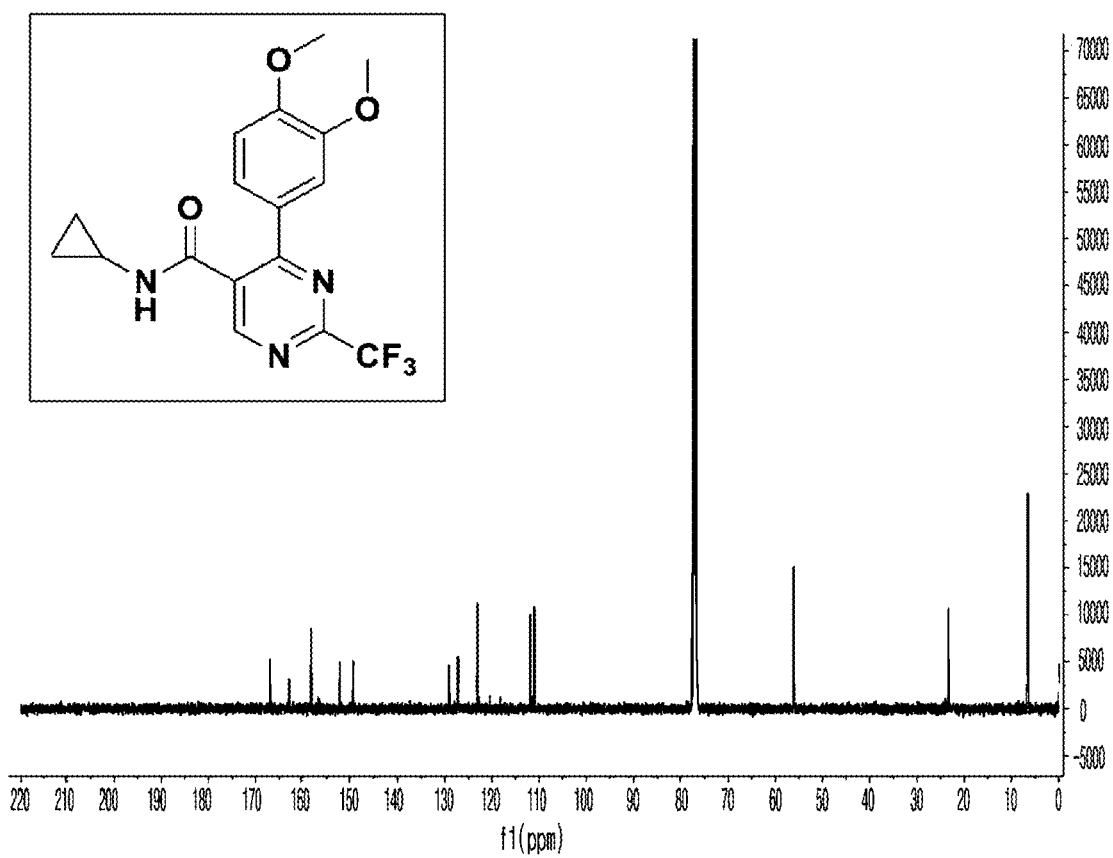
FIG. 46 is a 13C-NMR of the compound of Example 15.
Figure 47:
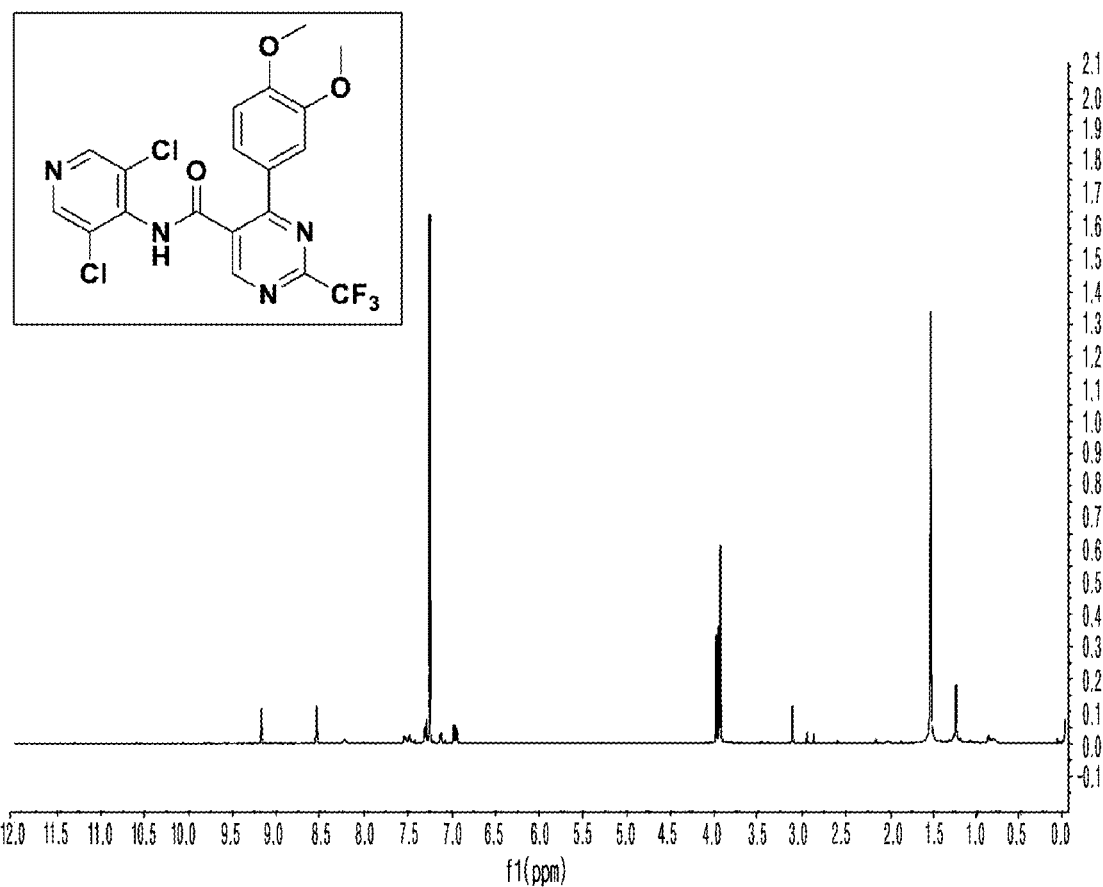
FIG. 47 is a 13H-NMR of the compound of Example 16.
Figure 48:
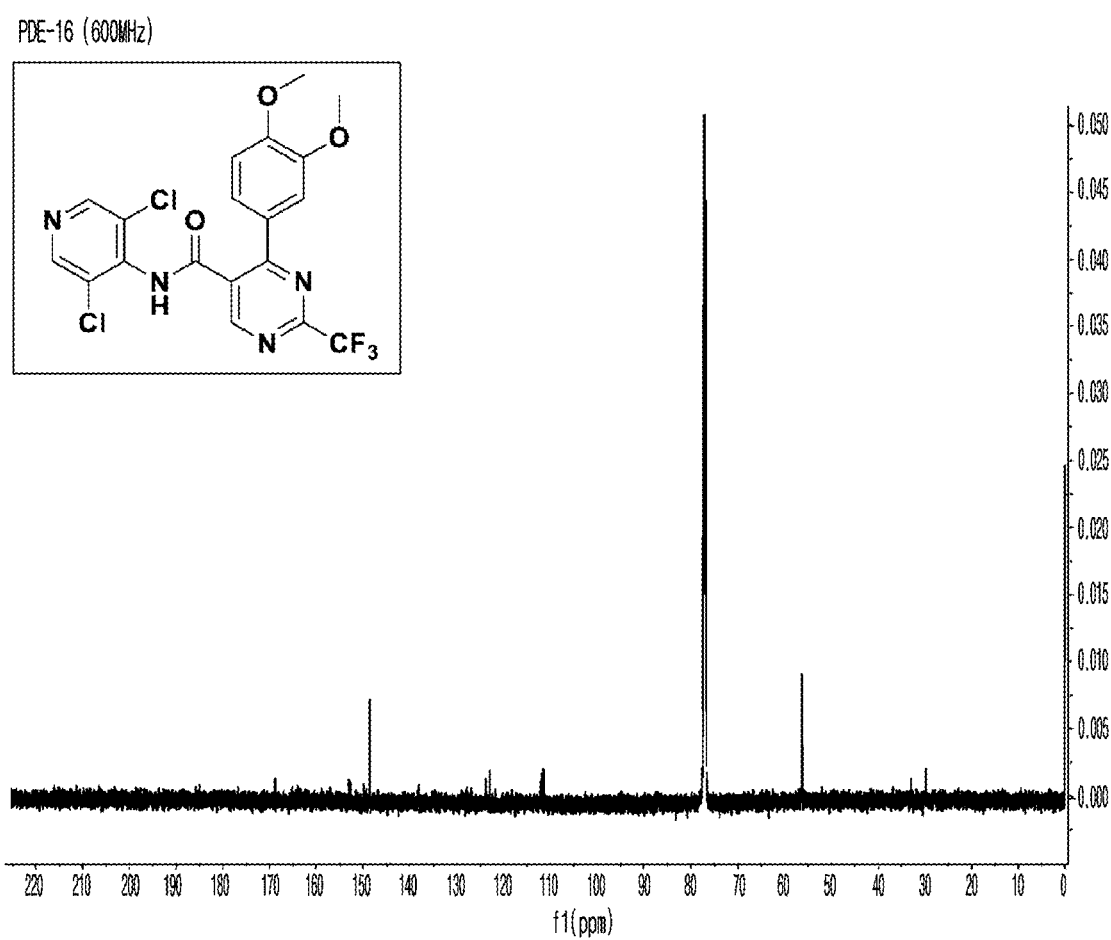
FIG. 48 is a 13C-NMR of the compound of Example 16.
Figure 49:
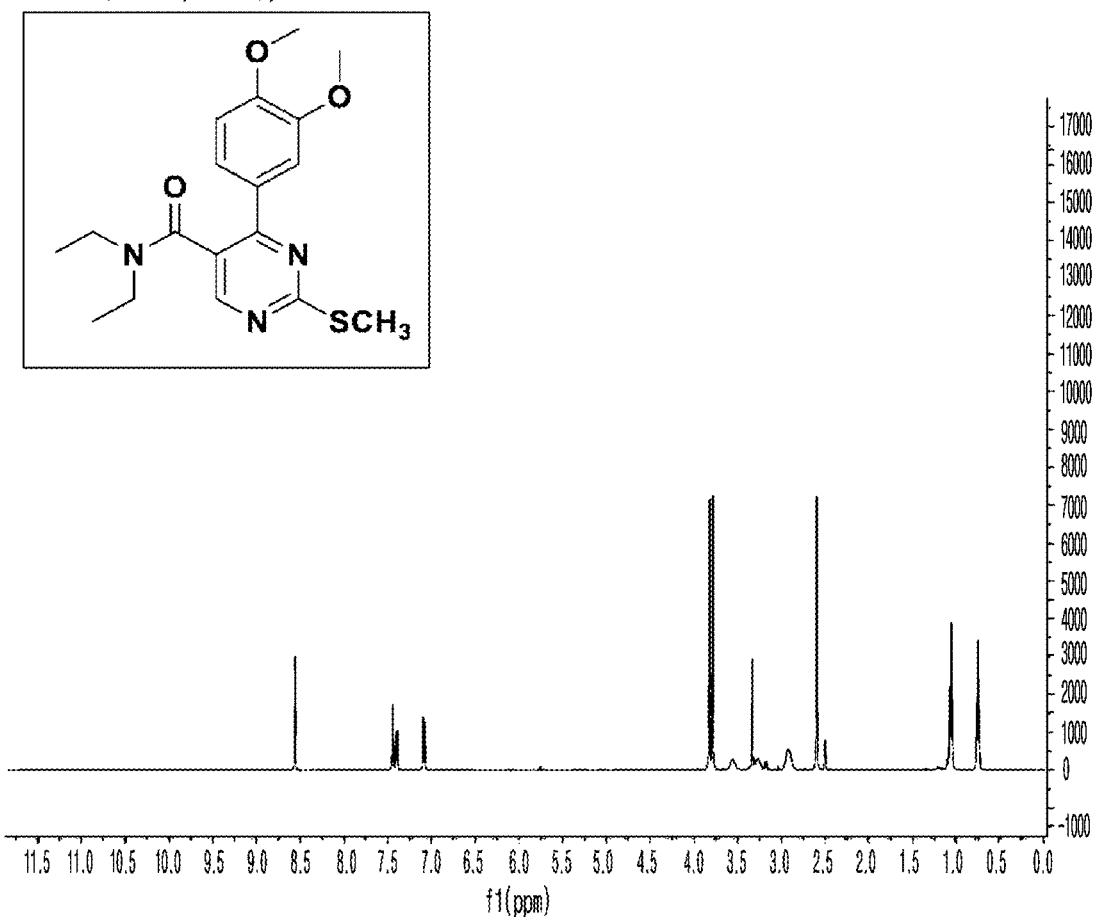
FIG. 49 is a 13H-NMR of the compound of Example 17.
Figure 50:
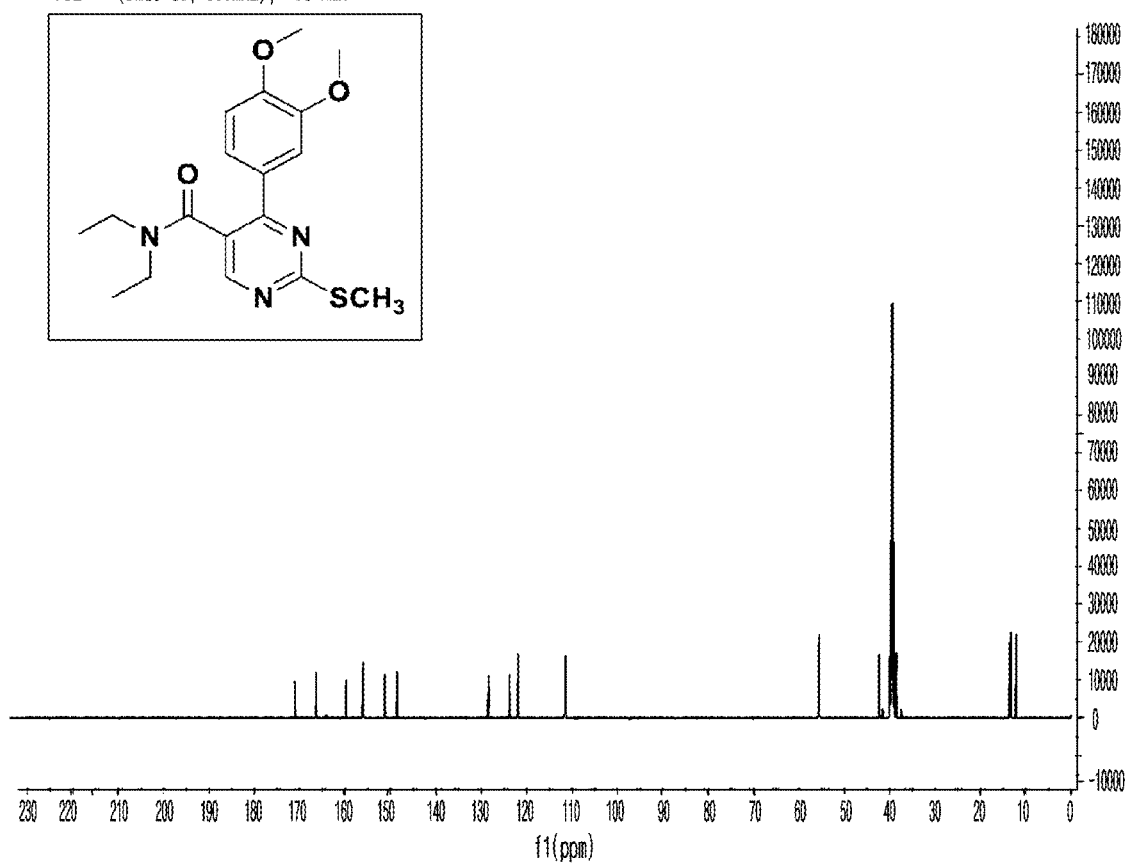
FIG. 50 is a 13C-NMR of the compound of Example 17.
Figure 51:
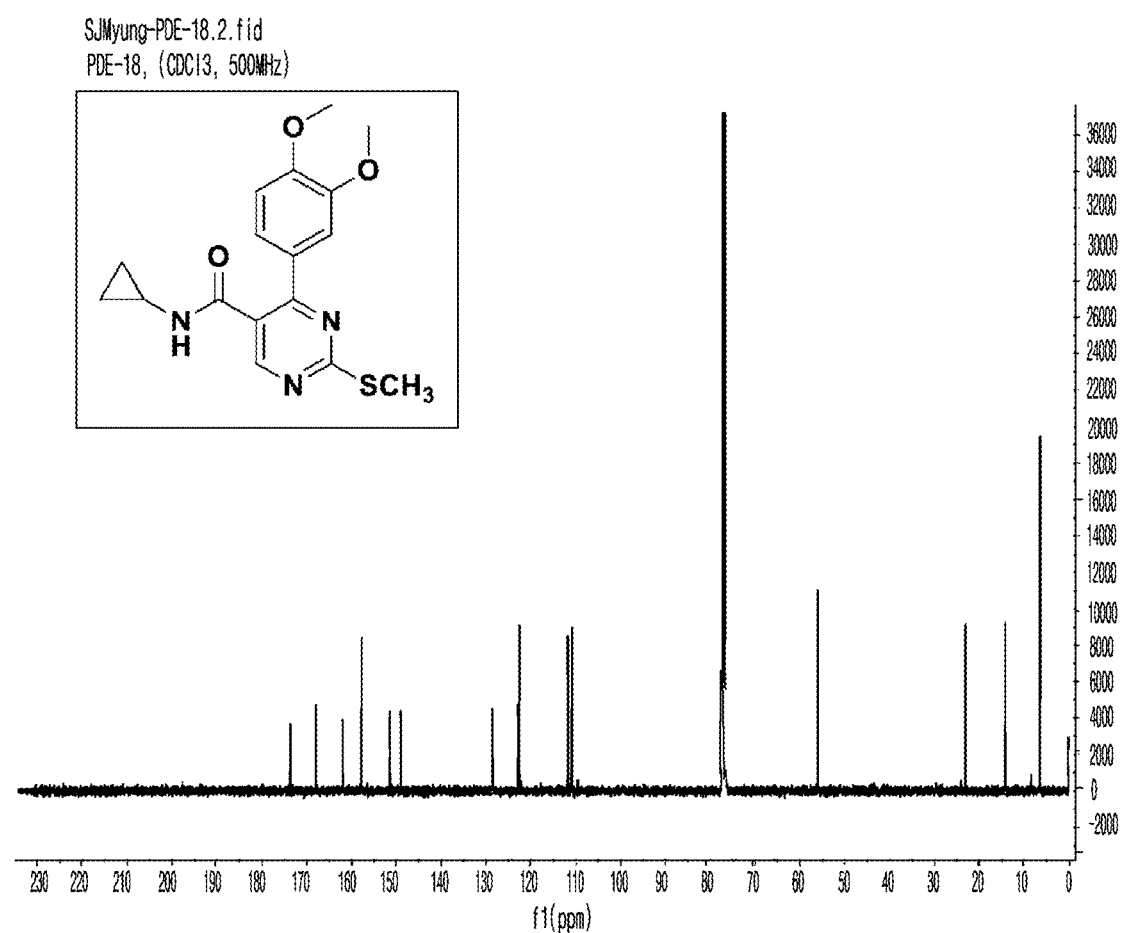
FIG. 51 is a 13C-NMR of the compound of Example 18.
Figure 52:
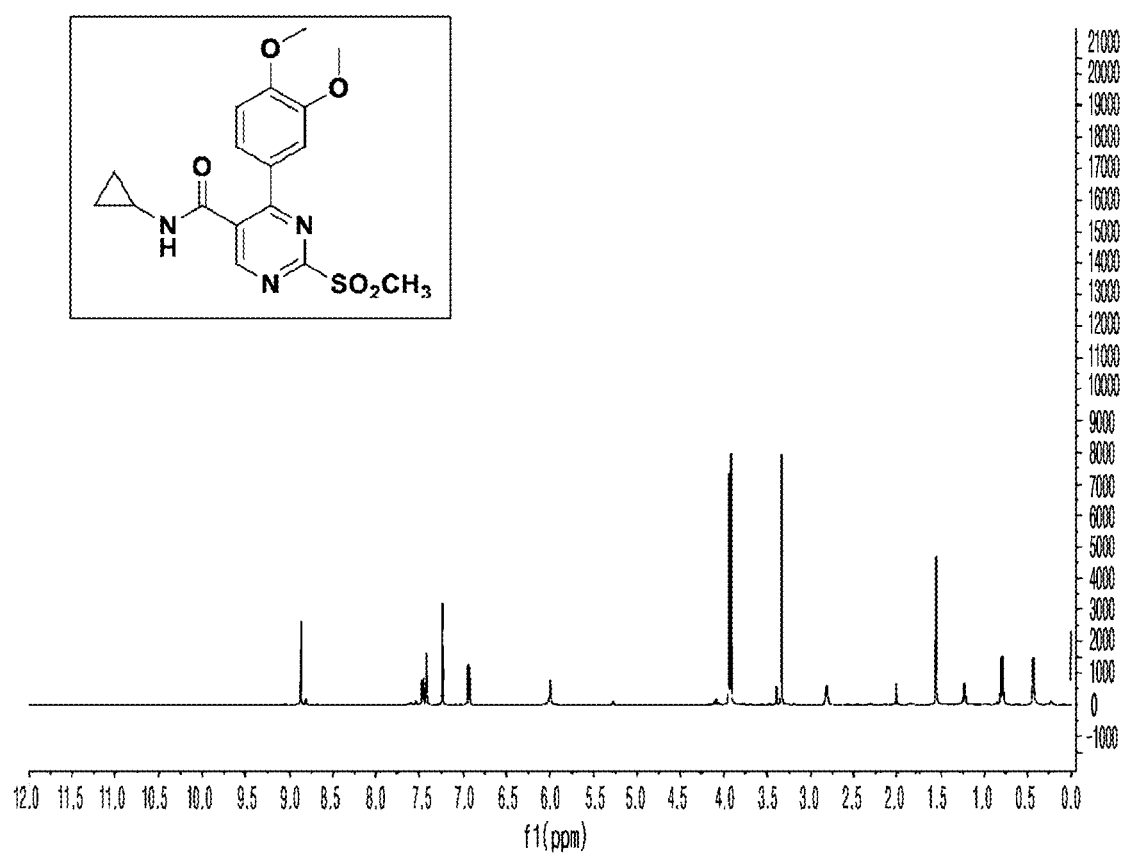
FIG. 52 is a 13H-NMR of the compound of Example 19.

<​1H-NMR of the compound of Example 1> is shown in FIG. 17.
<​13C-NMR of the compound of Example 1> is shown in FIG. 18.
<​1H-NMR of the compound of Example 2> is shown in FIG. 19.
<​13C-NMR of the compound of Example 2> is shown in FIG. 20.
<​1H-NMR of the compound of Example 3> is shown in FIG. 21.
<​13C-NMR of the compound of Example 3> is shown in FIG. 22.
<​1H-NMR of the compound of Example 4> is shown in FIG. 23.
<​13C-NMR of the compound of Example 4> is shown in FIG. 24.
<​1H-NMR of the compound of Example 5> is shown in FIG. 25.
<​13C-NMR of the compound of Example 5> is shown in FIG. 26.
<​1H-NMR of the compound of Example 6> is shown in FIG. 27.
<​13C-NMR of the compound of Example 6> is shown in FIG. 28.
<​1H-NMR of the compound of Example 7> is shown in FIG. 29.
<​13C-NMR of the compound of Example 7> is shown in FIG. 30.
<​1H-NMR of the compound of Example 8> is shown in FIG. 31.
<​13C-NMR of the compound of Example 8> is shown in FIG. 32.
<​1H-NMR of the compound of Example 9> is shown in FIG. 33.
<​13C-NMR of the compound of Example 9> is shown in FIG. 34.
<​1H-NMR of the compound of Example 10> is shown in FIG. 35.
<​13C-NMR of the compound of Example 10> is shown in FIG. 36.
<​1H-NMR of the compound of Example 11> is shown in FIG. 37.
<​13C-NMR of the compound of Example 11> is shown in FIG. 38.
<​1H-NMR of the compound of Example 12> is shown in FIG. 39.
<​13C-NMR of the compound of Example 12> is shown in FIG. 40.
<​1H-NMR of the compound of Example 13> is shown in FIG. 41.
<​13C-NMR of the compound of Example 13> is shown in FIG. 42.
<​1H-NMR of the compound of Example 14> is shown in FIG. 43.
<​13C-NMR of the compound of Example 14> is shown in FIG. 44.
<​1H-NMR of the compound of Example 15> is shown in FIG. 45.
<​13C-NMR of the compound of Example 15> is shown in FIG. 46.
<​1H-NMR of the compound of Example 16> is shown in FIG. 47.
<​13C-NMR of the compound of Example 16> is shown in FIG. 48.
<​1H-NMR of the compound of Example 17> is shown in FIG. 49.
<​13C-NMR of the compound of Example 17> is shown in FIG. 50.
<​13C-NMR of the compound of Example 18> is shown in FIG. 51.
<​1H-NMR of the compound of Example 19> is shown in FIG. 52.

Figure 53:
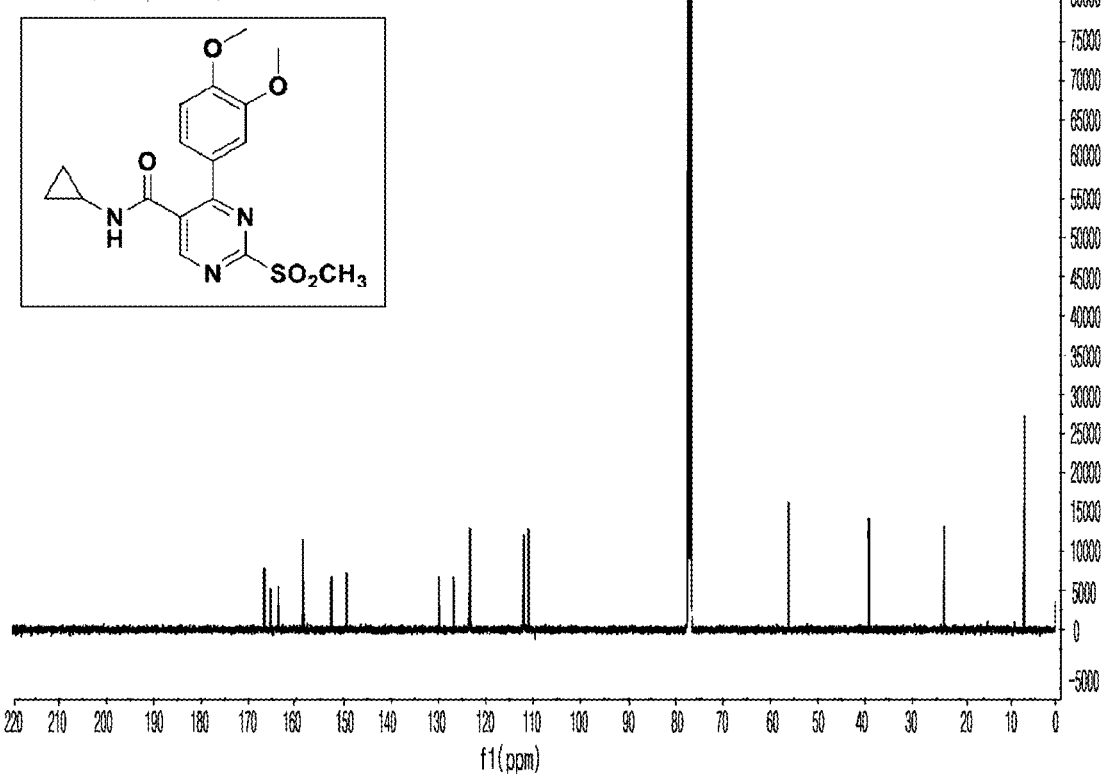
FIG. 53 is a 13C-NMR of the compound of Example 19.

<¹³C-NMR of the compound of Example 19> is shown in FIG. 53.

Figure 54:
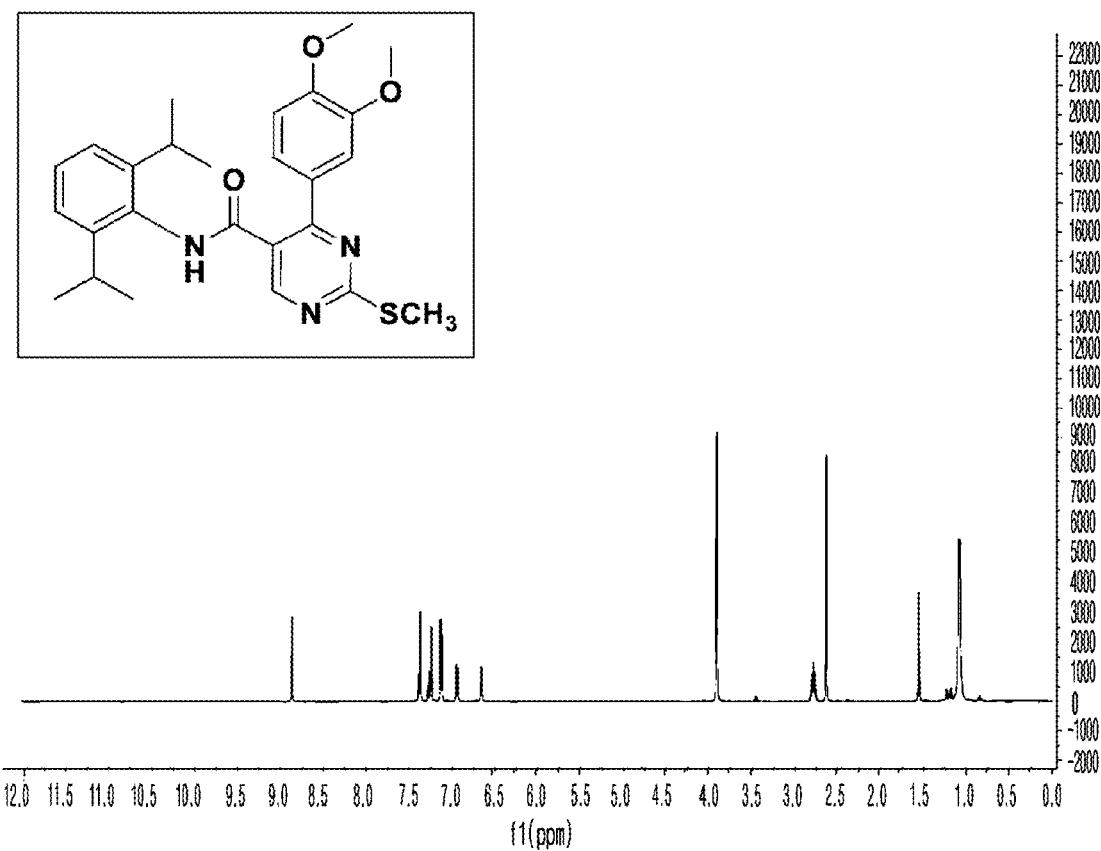
FIG. 54 is a 13H-NMR of the compound of Example 20.

<¹H-NMR of the compound of Example 20> is shown in FIG. 54.

Figure 55:
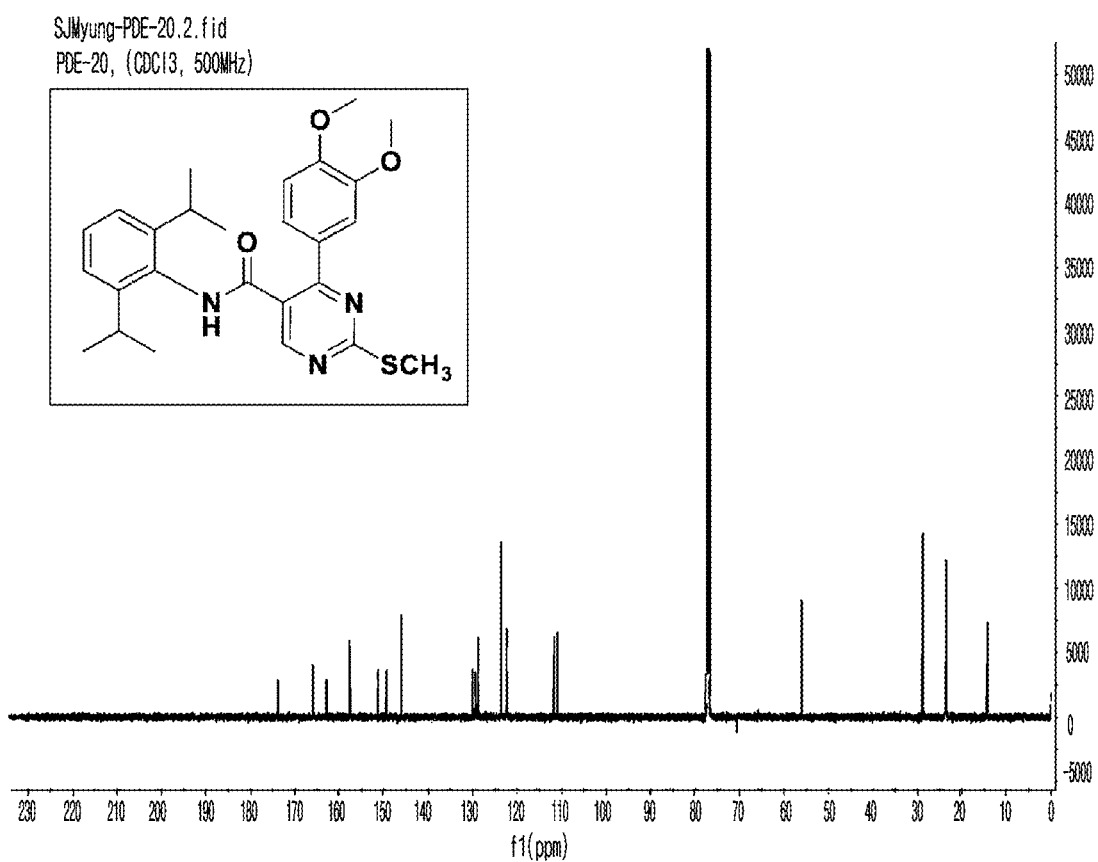
FIG. 55 is a 13C-NMR of the compound of Example 20.

<¹³C-NMR of the compound of Example 20> is shown in FIG. 55.

Figure 56:
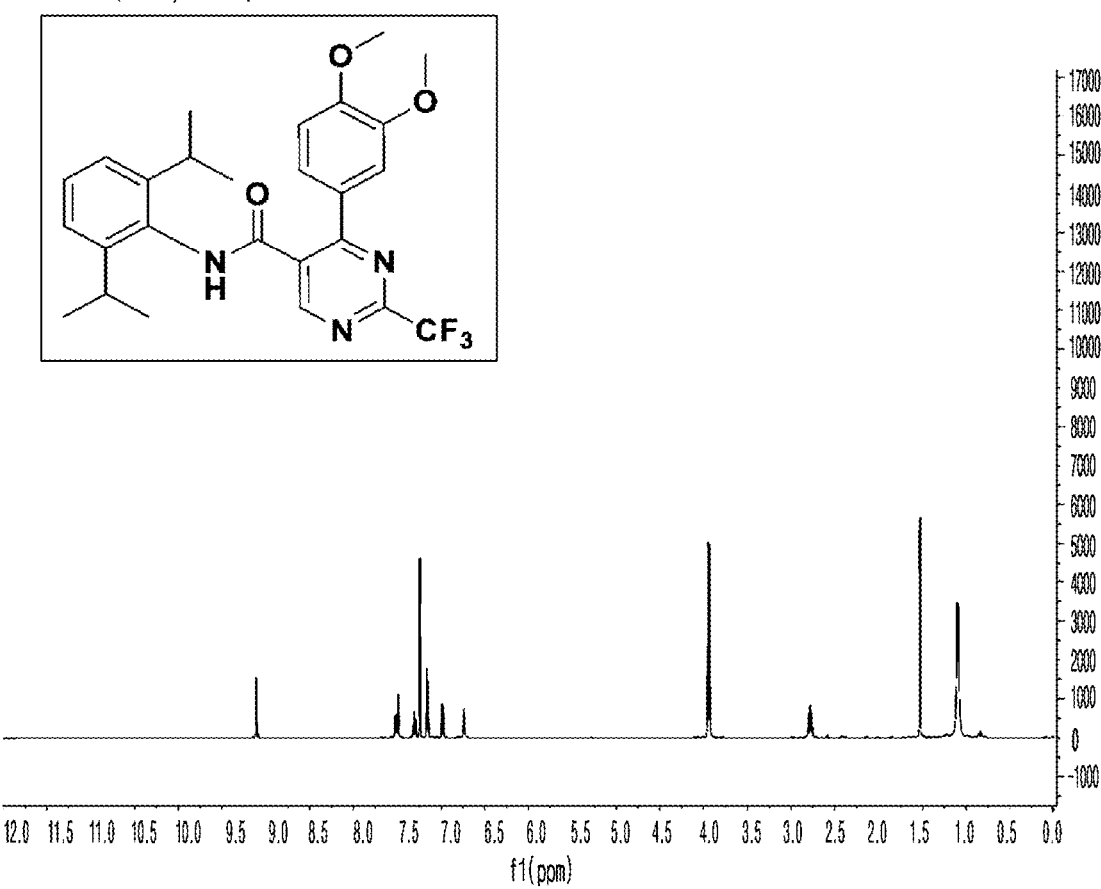
FIG. 56 is a 13H-NMR of the compound of Example 21.

<¹H-NMR of the compound of Example 21> is shown in FIG. 56.

Figure 57:
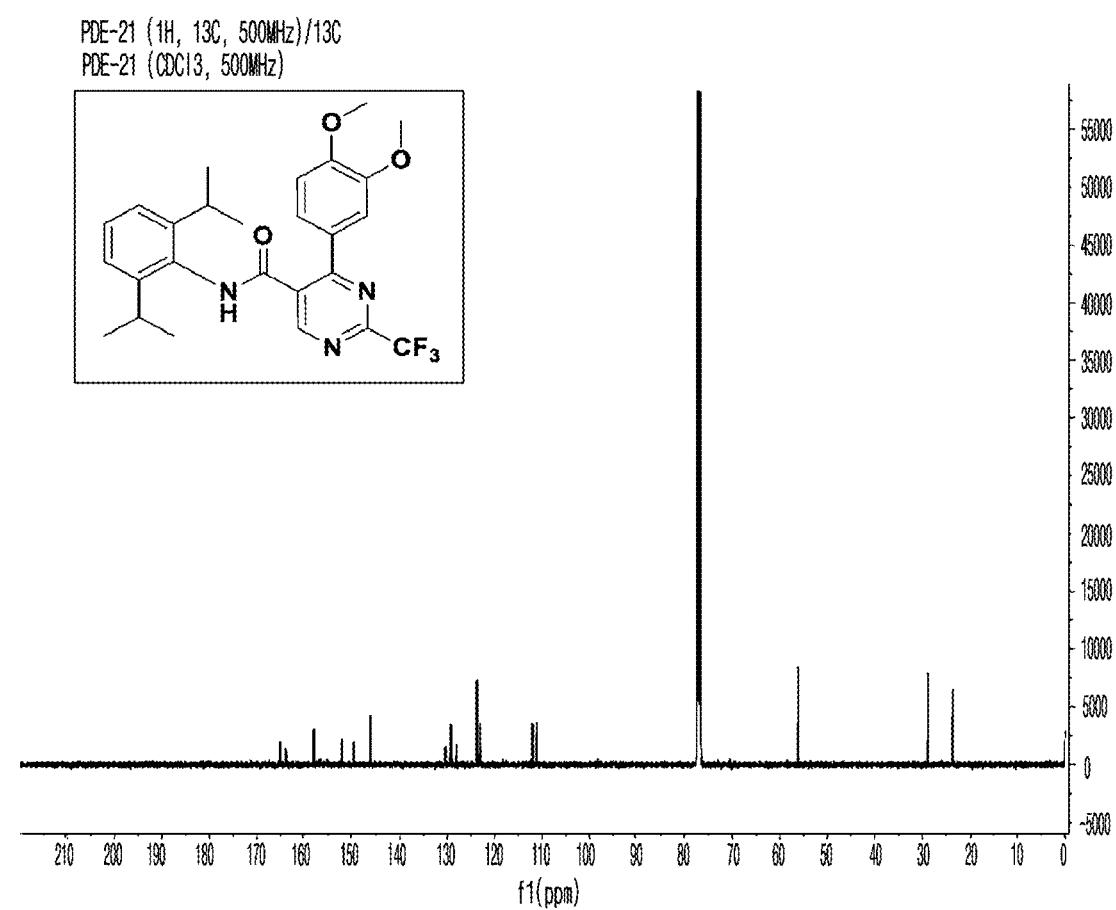
FIG. 57 is a 13C-NMR of the compound of Example 21.

<¹³C-NMR of the compound of Example 21> is shown in FIG. 57.

Figure 58:
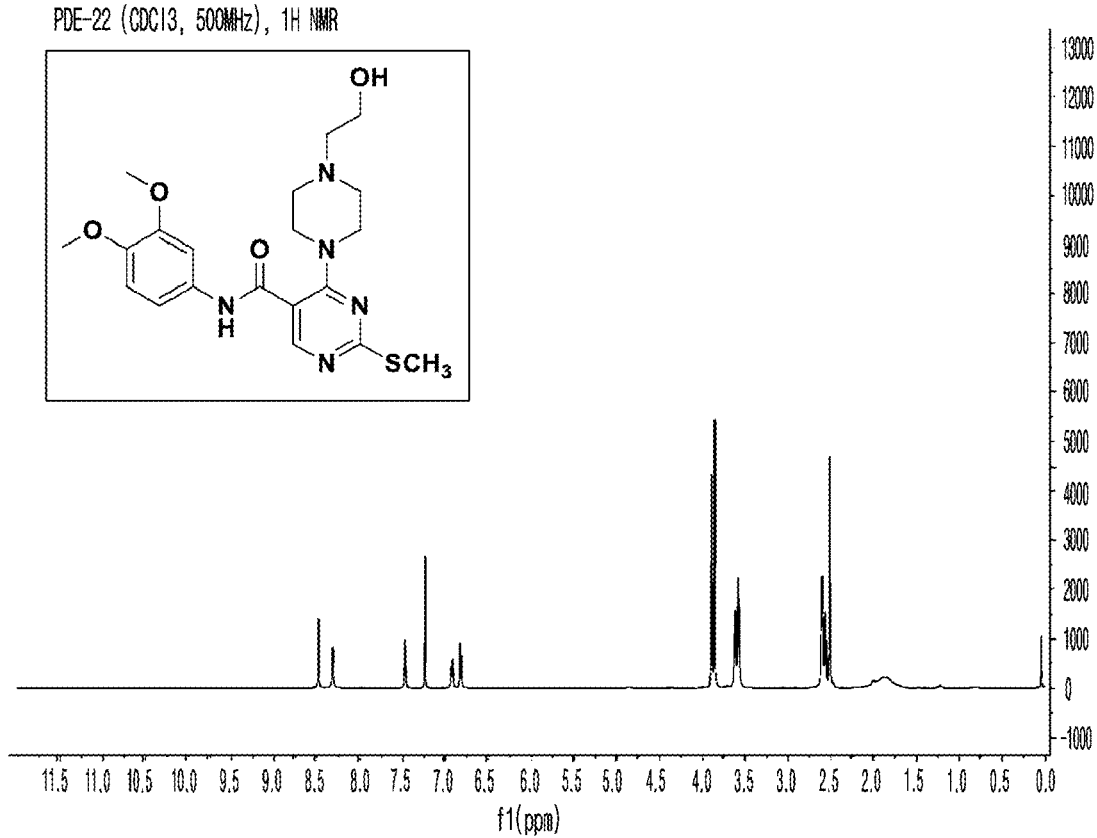
FIG. 58 is a 13H-NMR of the compound of Example 22.

<¹H-NMR of the compound of Example 22> is shown in FIG. 58.

Figure 59:
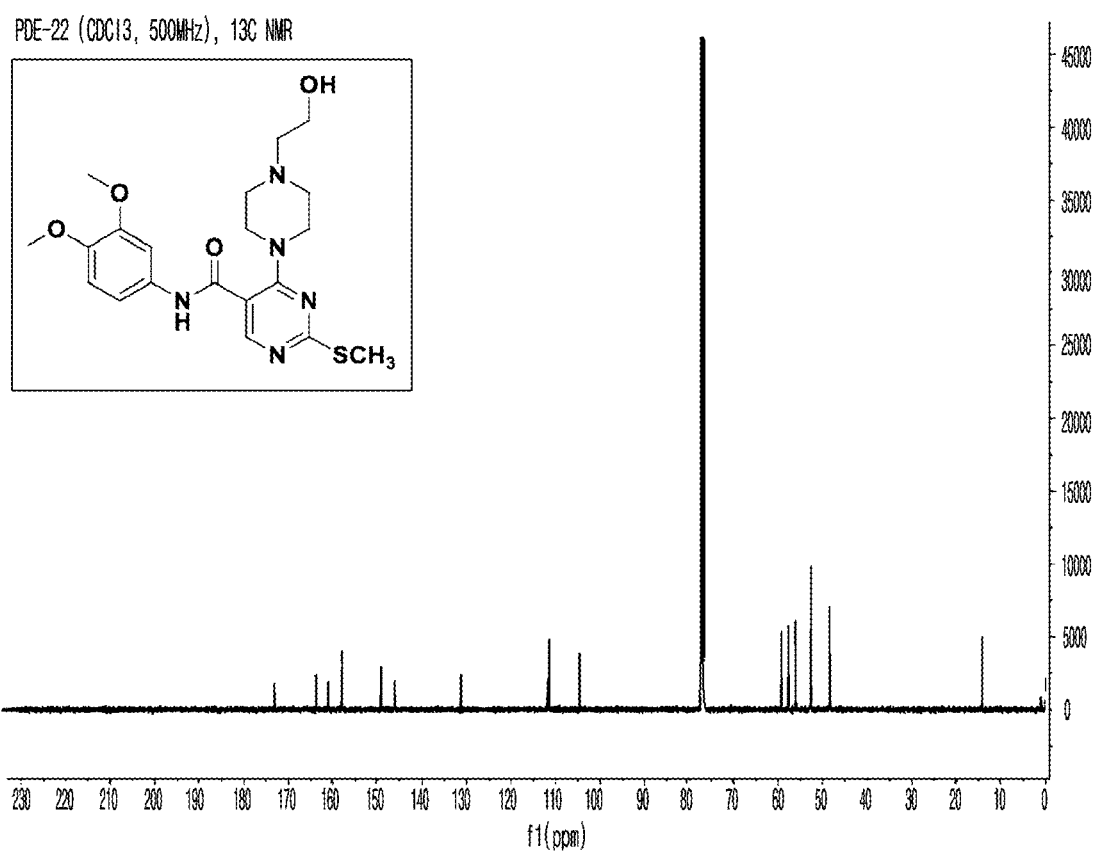
FIG. 59 is a 13C-NMR of the compound of Example 22.

<¹³C-NMR of the compound of Example 22> is shown in FIG. 59.

Figure 60:
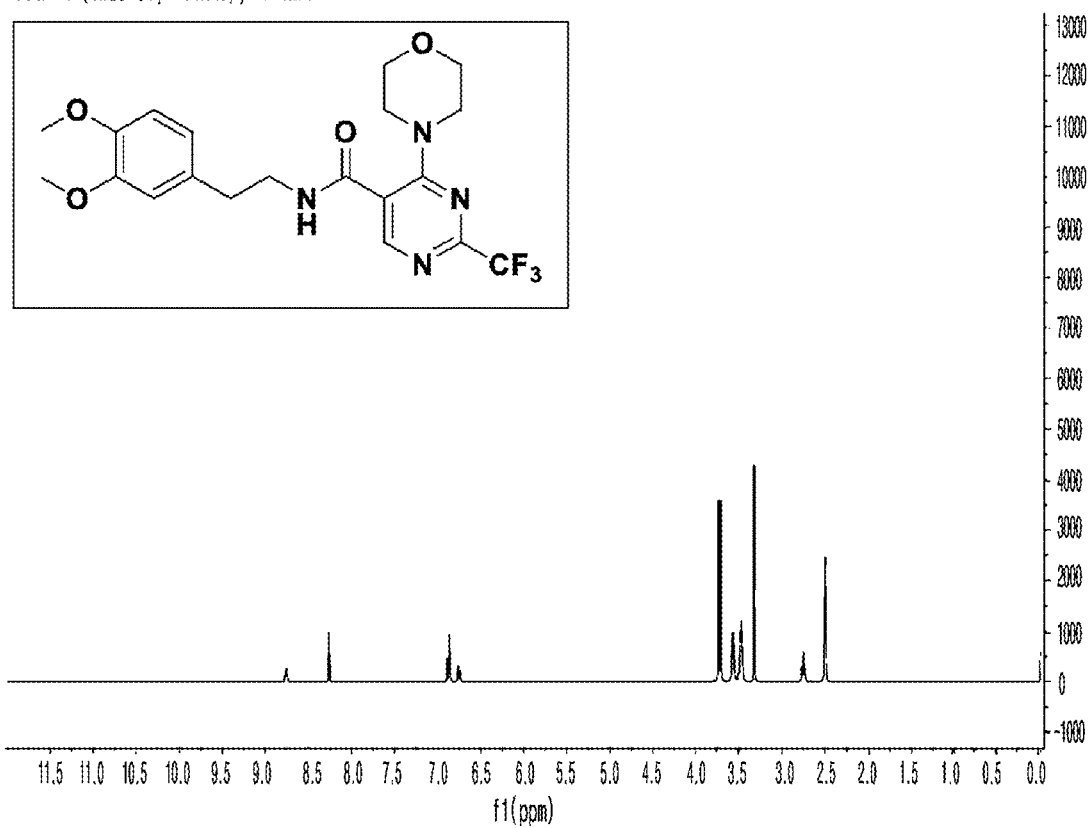
FIG. 60 is a 13H-NMR of the compound of Example 23.

<¹H-NMR of the compound of Example 23> is shown in FIG. 60.

Figure 61:
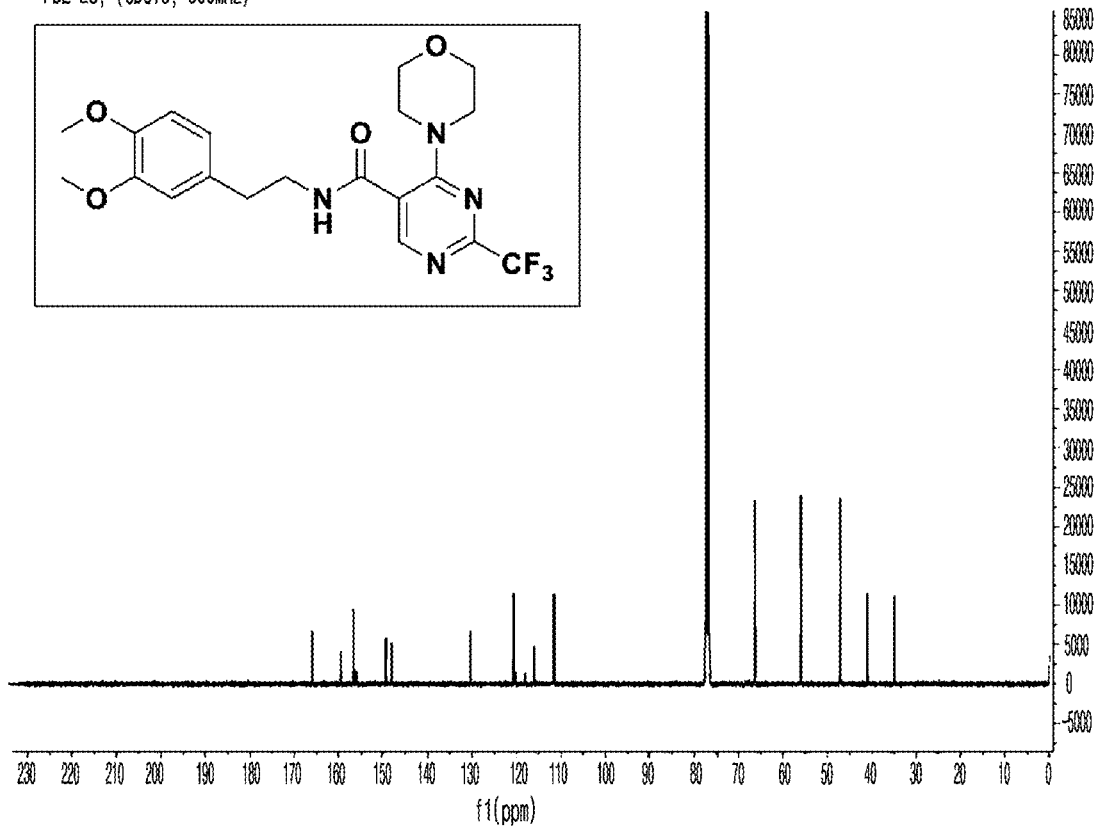
FIG. 61 is a 13C-NMR of the compound of Example 23.

<¹³C-NMR of the compound of Example 23> is shown in FIG. 61.

Figure 62:
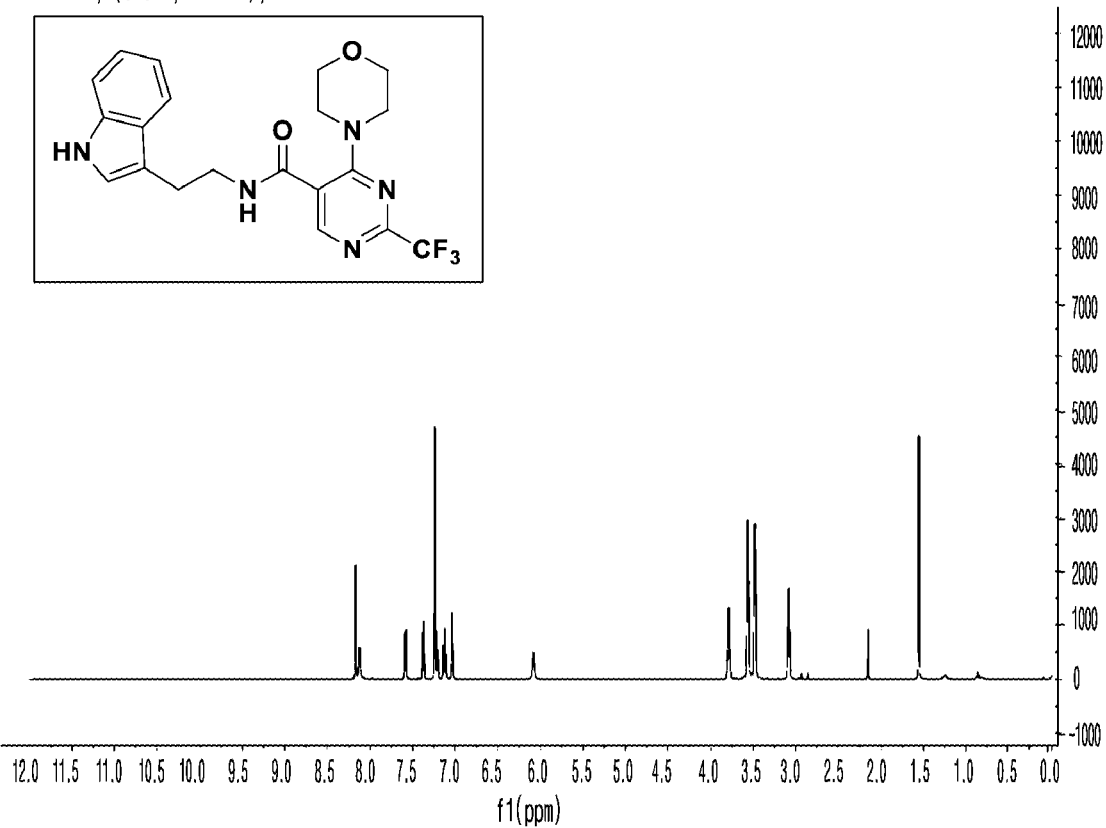
FIG. 62 is a 13H-NMR of the compound of Example 24.

<¹H-NMR of the compound of Example 24> is shown in FIG. 62.

Figure 63:
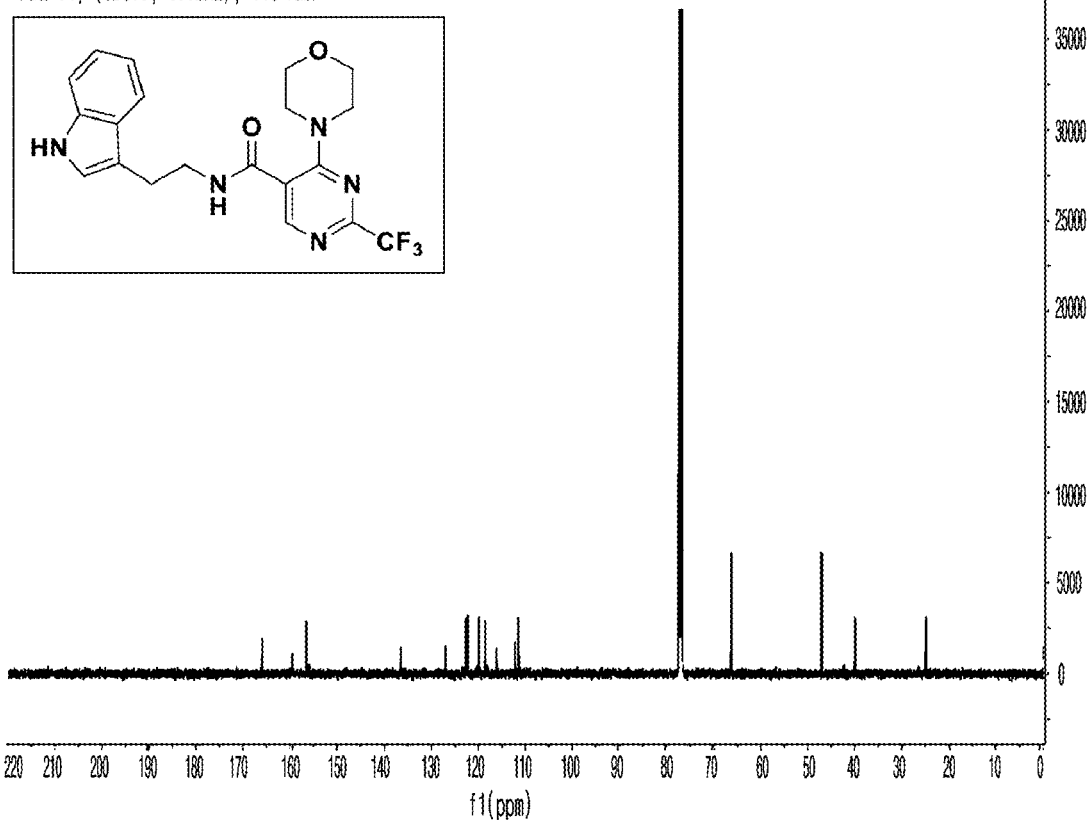
FIG. 63 is a 13C-NMR of the compound of Example 24.

<¹³C-NMR of the compound of Example 24> is shown in FIG. 63.

Figure 64:
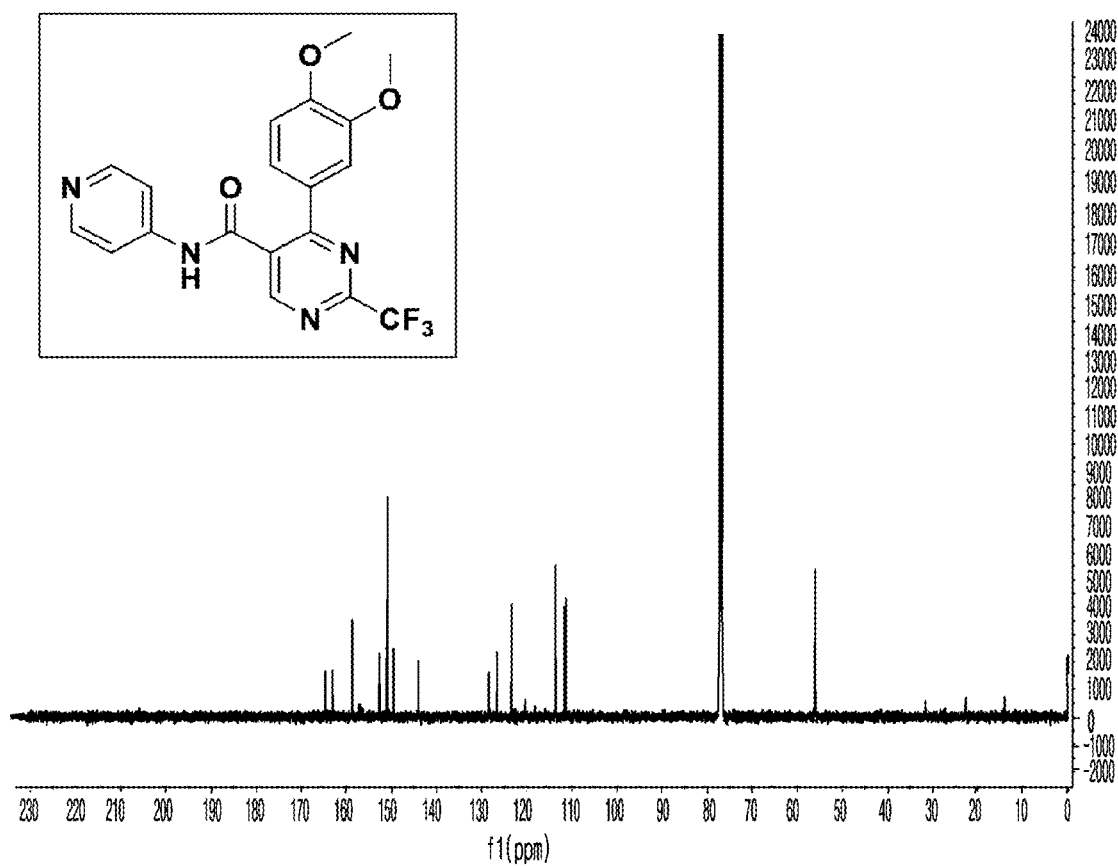
FIG. 64 is a 13C-NMR of the compound of Example 25.

<¹³C-NMR of the compound of Example 25> is shown in FIG. 64.

Figure 65:
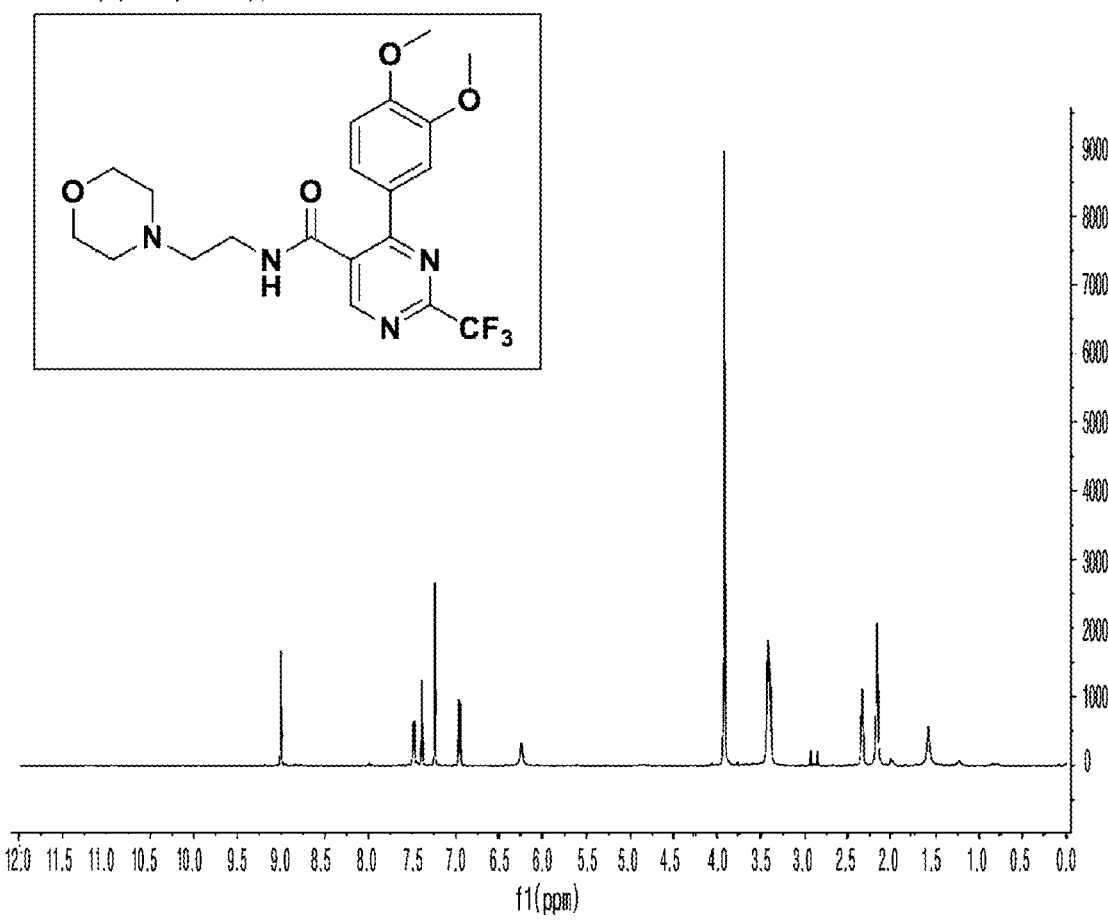
FIG. 65 is a 13H-NMR of the compound of Example 26.

<¹H-NMR of the compound of Example 26> is shown in FIG. 65.

Figure 66:
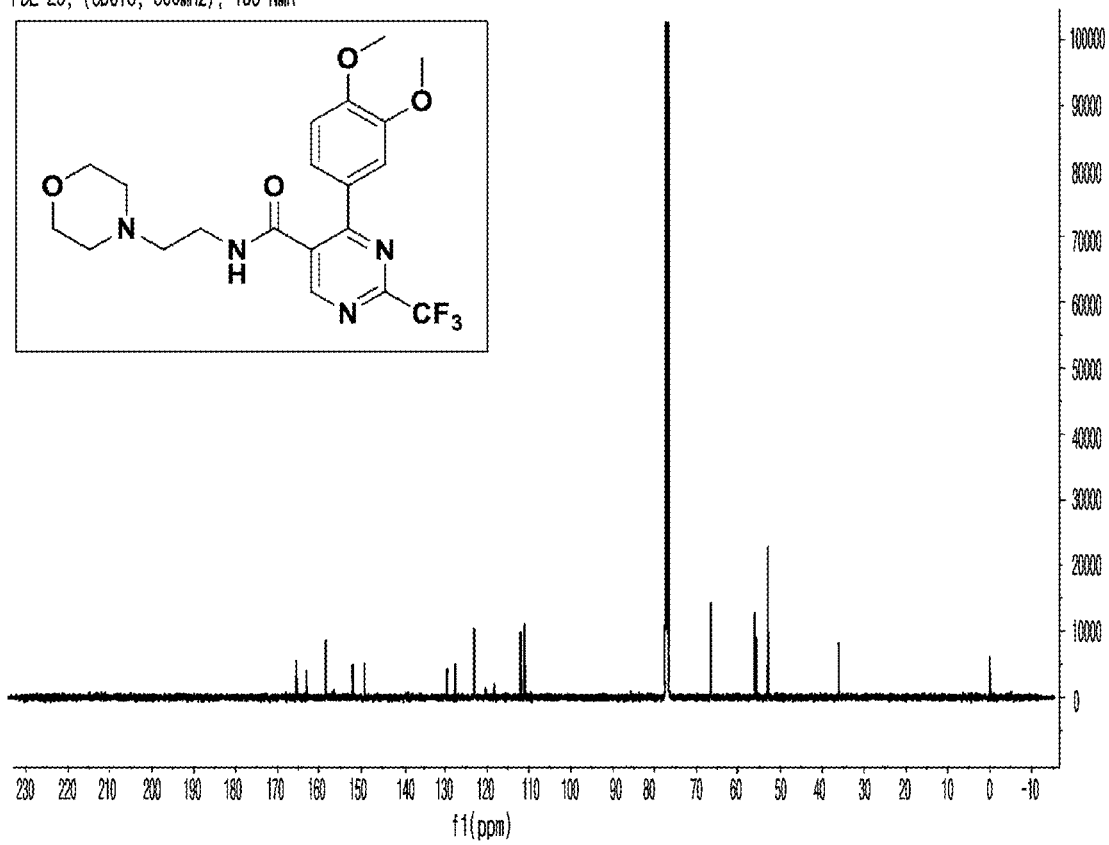
FIG. 66 is a 13C-NMR of the compound of Example 26.

<¹³C-NMR of the compound of Example 26> is shown in FIG. 66.

Figure 67:
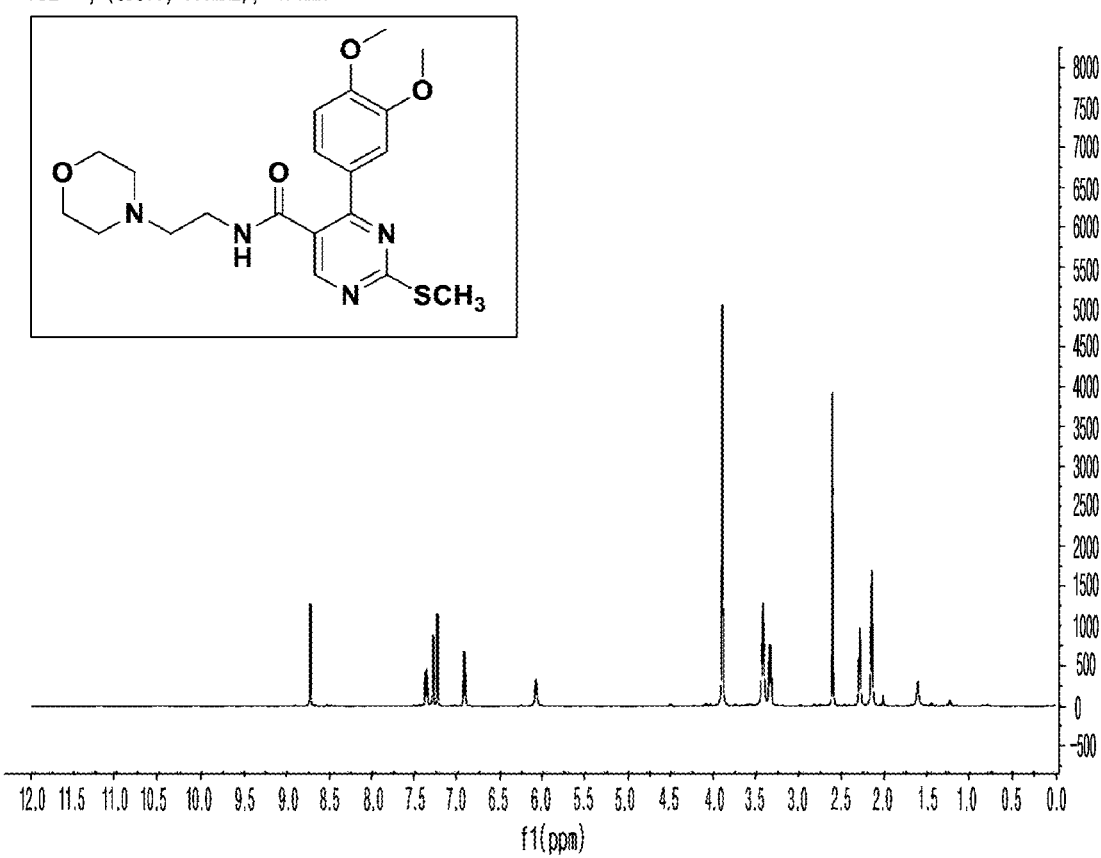
FIG. 67 is a 13H-NMR of the compound of Example 27.

<¹H-NMR of the compound of Example 27> is shown in FIG. 67.

Figure 68:
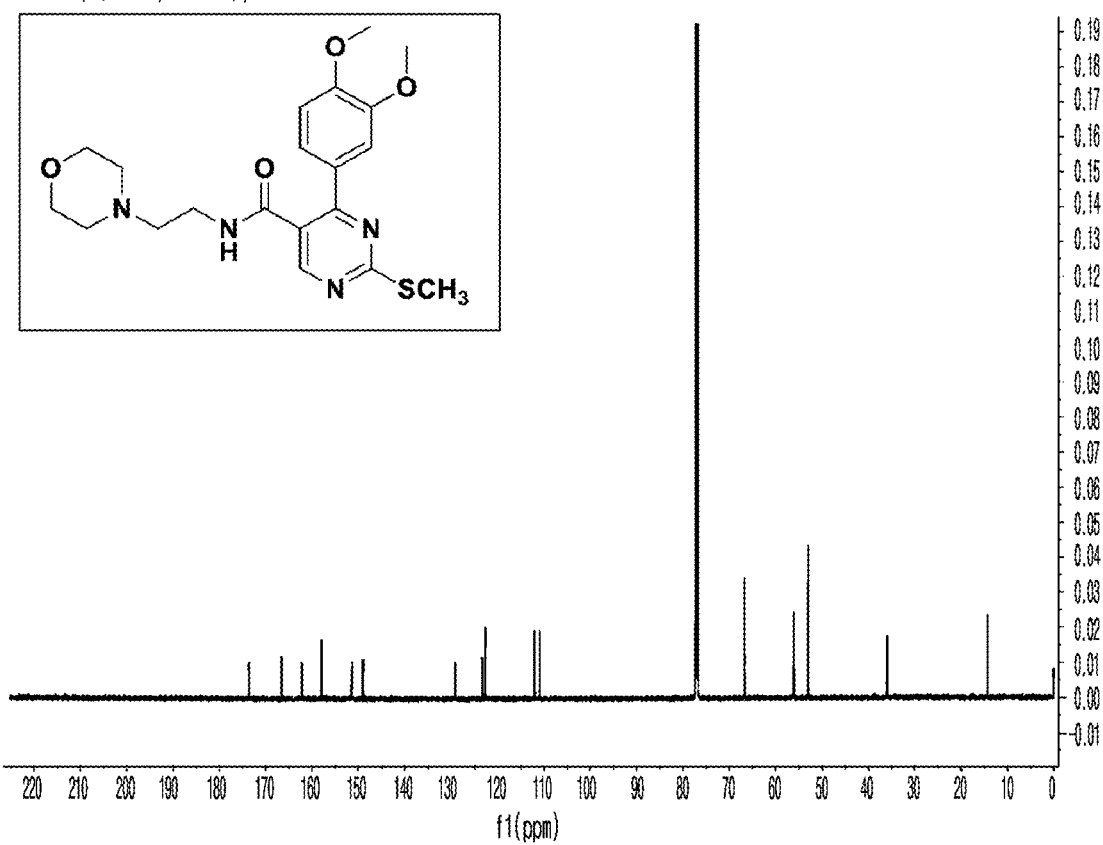
FIG. 68 is a 13C-NMR of the compound of Example 27.

<¹³C-NMR of the compound of Example 27> is shown in FIG. 68.

Figure 69:
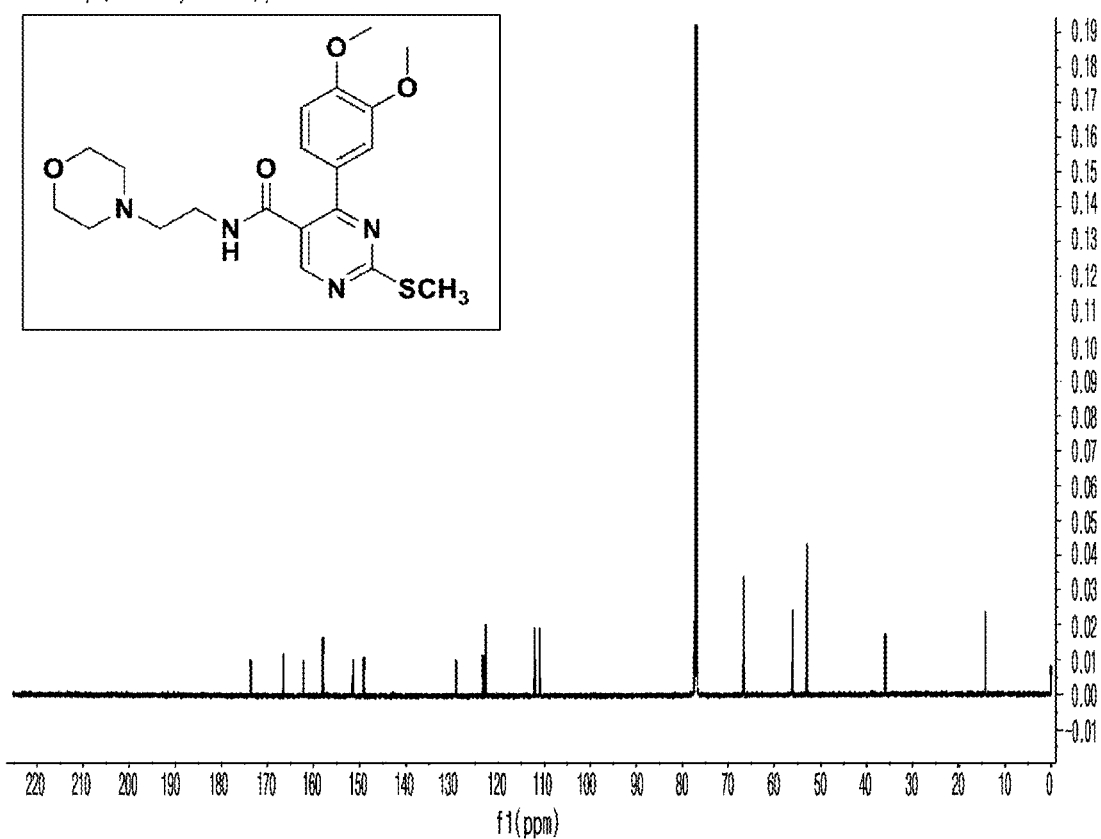
FIG. 69 is a 13H-NMR of the compound of Example 28.

<¹H-NMR of the compound of Example 28> is shown in FIG. 69.

Figure 70:
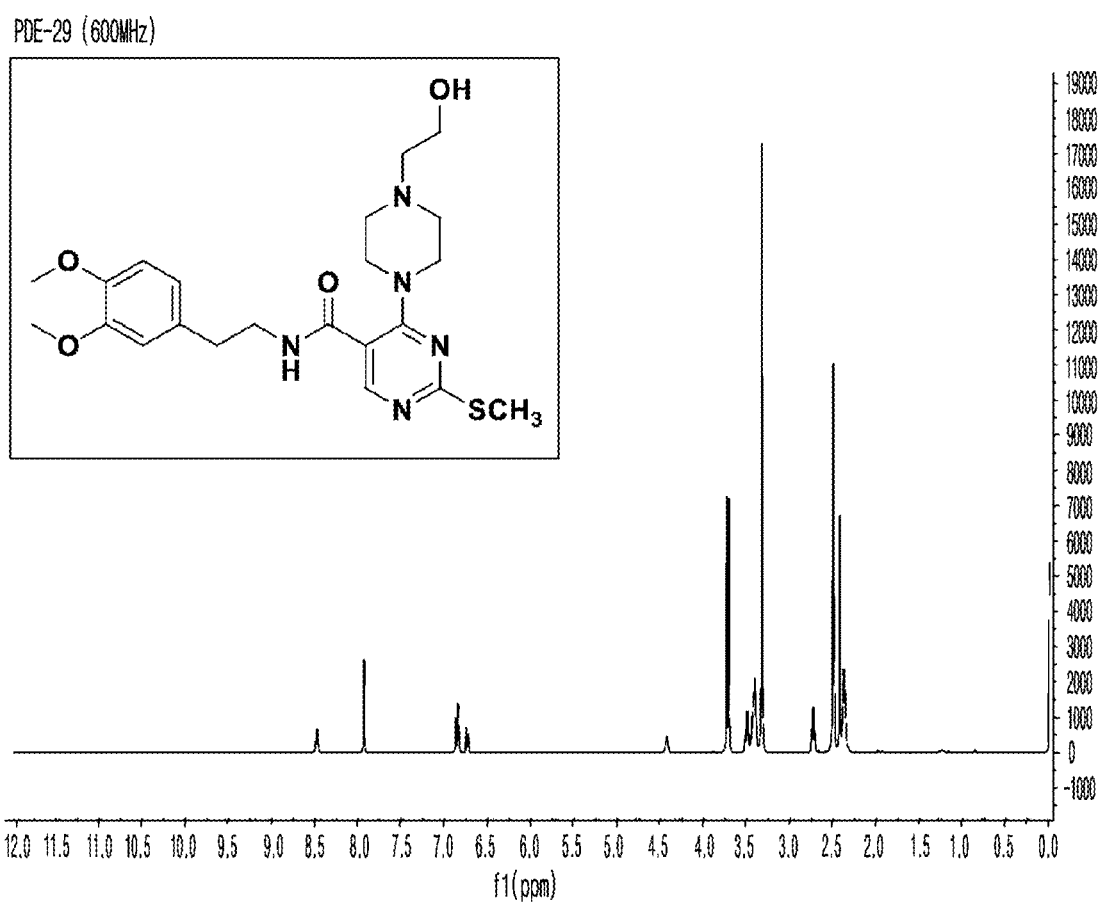
FIG. 70 is a 13H-NMR of the compound of Example 29.

<¹H-NMR of the compound of Example 29> is shown in FIG. 70.

Figure 71:
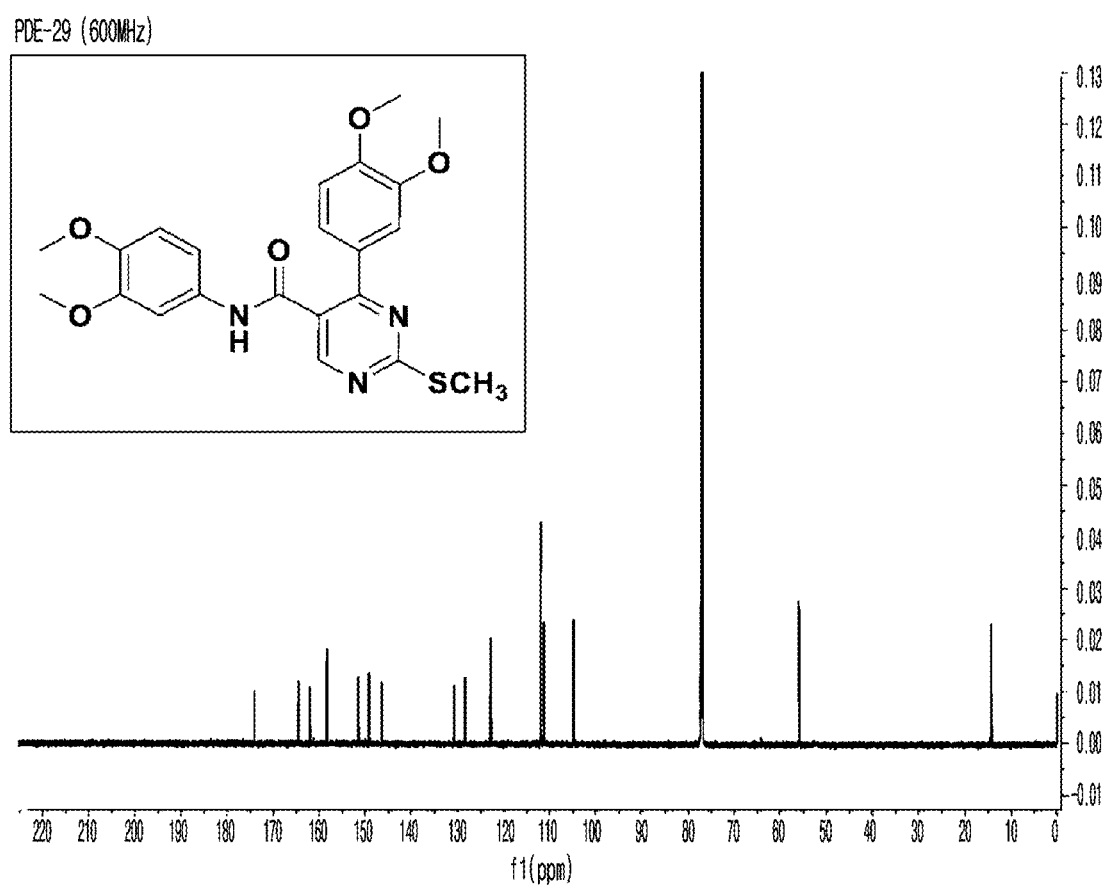
FIG. 71 is a 13C-NMR of the compound of Example 29.

<¹³C-NMR of the compound of Example 29> is shown in FIG. 71.

Figure 72:
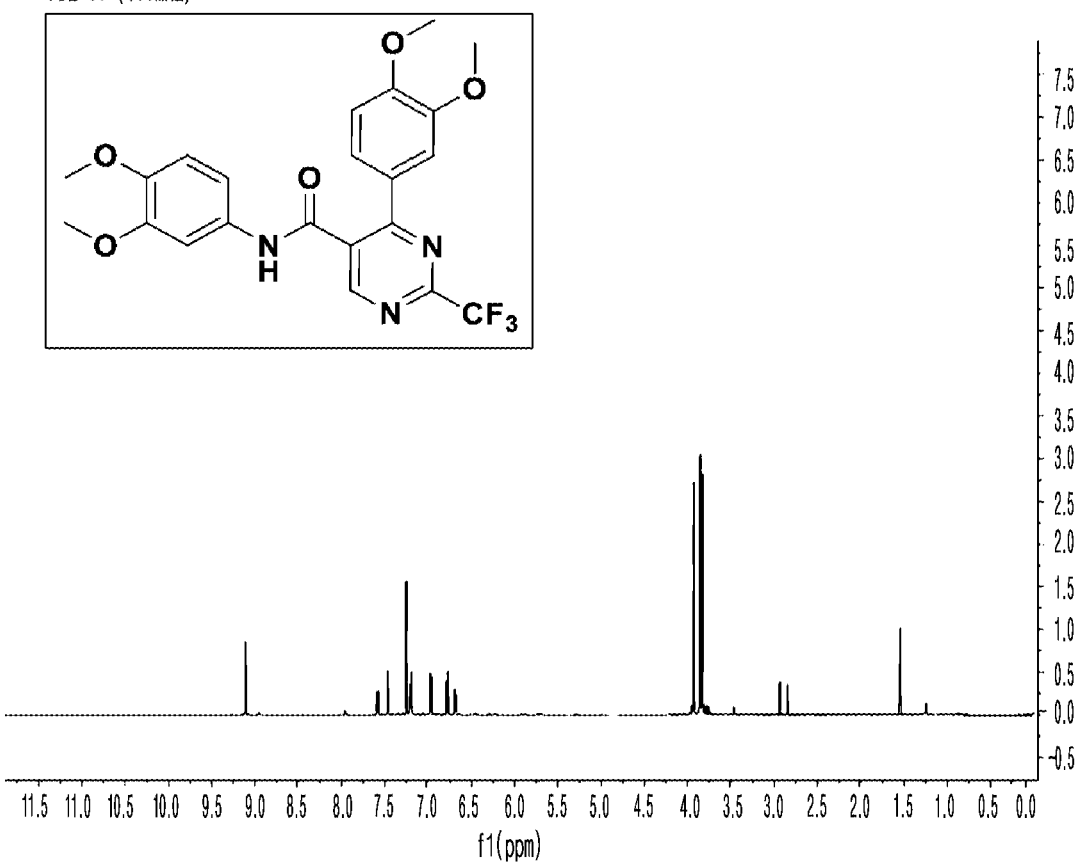
FIG. 72 is a 13H-NMR of the compound of Example 30.

<¹H-NMR of the compound of Example 30> is shown in FIG. 72.

<¹³C-NMR of the compound of Example 30> is shown in FIG. 73.

<Comparative Example 1> Preparation of Atopy Medicine

Rolipram (4-(3-(cyclopentyloxy)-4-methoxyphenyl)pyrrolidine-2-one), a compound conventionally used as an atopy medicine, was prepared.

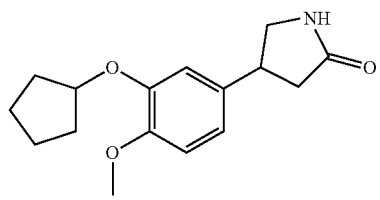

<Experimental Example 1> Analysis of PDE4B Inhibitory Activity of Compounds According to the Present Invention In order to evaluate the PDE4B inhibitory activity of the compounds according to the present invention, the following experiment was performed using LANCE Ultra cAMP assay kit (Perkin Elmer, U.S.A).

Particularly, 5 µl of the 3 nM cAMP dissolved reaction buffer was added to each reaction well (LANCE Ultra cAMP assay kit). Then, each example compound dilution solution (2.5 µl) and PDE4B enzyme (0.1 ng/well, BPS Biosciences, San Diego, U.S.A) were added to the well, followed by incubation for 1 hour at 37° C. Next, 5 µl of ULight-anti-cAMP detection reactant supplemented with 5 µl of Eu-cAMP tracer and 1 mM IBMX (LANCE Ultra cAMP assay kit) was added thereto, followed by incubation for 1 hour at 37° C. Upon completion of the incubation, the signals excitated at 340 nm and emitted at 665 nm from the 384 micro well-plate were recorded using EnVision Multilabel Reader (Perkin Elmer, U.S.A.).

$IC_{50}$ values for the inhibitory activity of cAMP to 5'AMP of the compounds of Examples 1 to 30 are summarized and shown in Table 2 below. The $IC_{50}$ values were calculated based on the molar concentration of the PDE4B inhibitor compound required for 50% inhibition from cAMP to 5'AMP.

TABLE 2

| Example | Chemical Structure | Formula Name | PDE4B $IC_{50}$(nM) |
|---|---|---|---|
| 1 | 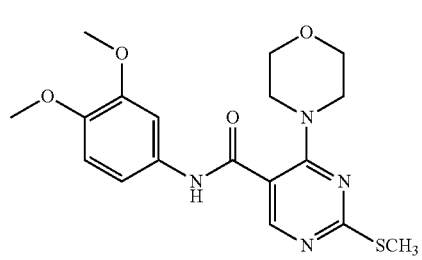 [SMILES: COc1ccc(NC(=O)c2cnc(SC)nc2N2CCOCC2)cc1OC] | N-(3,4-dimethoxyphenyl)-2-(methylthio)-4-morpholinopyrimidine-5-carboxamide | 31 |

TABLE 2-continued

| Example | Chemical Structure | Formula Name | PDE4B IC$_{50}$(nM) |
|---|---|---|---|
| 2 | | N-(3,5-dichloropyridine-4-yl)-4-(3,4-dimethoxyphenyl)-2-(methylthio)pyrimidine-5-carboxamide | 178 |
| 3 | | 4-(3,4-dimethoxyphenyl)-2-(methylthio)-N-(pyridine-4-yl)pyrimidine-5-carboxamide | 95 |
| 4 | | N-(2-(1H-indole-3-yl)ethyl)-2-(methylthio)-4-morpholinopyrimidine-5-carboxamide | 166 |
| 5 | | 4-(3,4-dimethoxyphenyl)-2-(methylthio)-N-(tetrahydro-2H-pyran-4-yl)pyrimidine-5-carboxamide | 239 |
| 6 | | N-(4-fluorophenyl)-2-(methylthio)-4-morpholinopyrimidine-5-carboxamide | 367 |

TABLE 2-continued

| Example | Chemical Structure | Formula Name | PDE4B IC$_{50}$(nM) |
|---|---|---|---|
| 7 | | N-(3,4-dimethoxyphenetyl)-2-(methylthio)-4-morpholinopyrimidine-5-carboxamide | 61 |
| 8 | | N-(2,4-dimethoxybenzyl)-4-morpholino-2-(trifluoromethyl)pyridine-5-carboxamide | 74 |
| 9 | | N-(2,4-dimethoxybenzyl)-2-(methylthio)-4-morpholinopyrimidine-5-carboxamide | 377 |
| 10 | | N-(3,5-dichloropyridine-4-yl)-2-(methylthio)-4-morpholinopyrimidine-5-carboxamide | 73 |
| 11 | | N-(3,4-dimethoxyphenyl)-4-morpholino-2-(trifluoromethyl)pyrimidine-5-carboxamide | 67 |
| 12 | | 4-(3,4-dimethoxyphenyl)-N-(tetrahydro-2H-pyran-4-yl)-2-(trifluoromethyl)pyrimidine-5-carboxamide | 266 |

TABLE 2-continued

| Example | Chemical Structure | Formula Name | PDE4B IC$_{50}$(nM) |
|---|---|---|---|
| 13 | 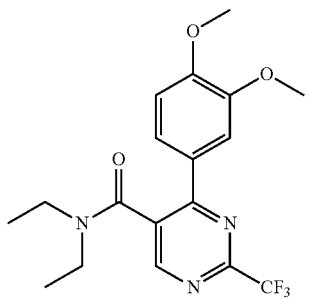 | 4-(3,4-dimethoxyphenyl)-N,N-diethyl-2-(trifluoromethyl)pyrimidine-5-carboxamide | 833 |
| 14 | 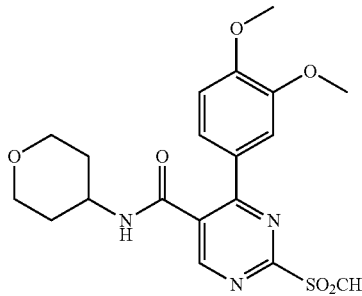 | 4-(3,4-dimethoxyphenyl)-2-(methylsulfonyl)-N-(tetrahydro-2H-pyran-4-yl)pyrimidine-5-carboxamide | 506 |
| 15 | 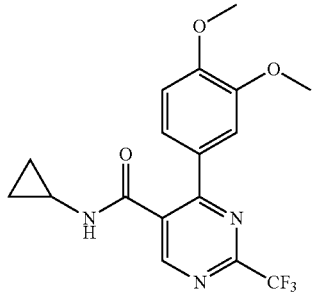 | N-cyclopropyl-4-(3,4-dimethoxyphenyl)-2-(trifluoromethyl)pyrimidine-5-carboxamide | 252 |
| 16 | 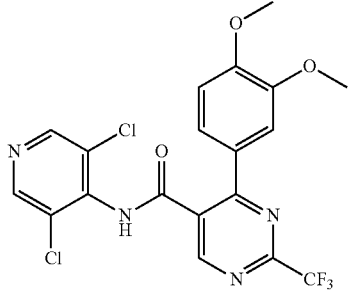 [SMILES: COc1ccc(-c2nc(C(F)(F)F)ncc2C(=O)Nc2c(Cl)cncc2Cl)cc1OC] | N-(3,5-dichloropyridine-4-yl)-4-(3,4-dimethoxyphenyl)-2-(trifluoromethyl)pyrimidine-5-carboxamide | 44 |
| 17 | 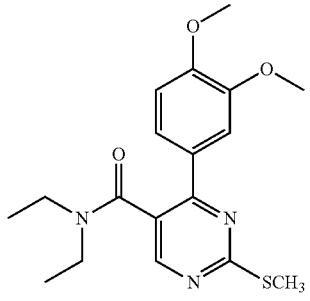 [SMILES: CCN(CC)C(=O)c1cnc(SC)nc1-c1ccc(OC)c(OC)c1] | 4-(3,4-dimethoxyphenyl)-N,N-diethyl-2-(methylthio)pyrimidine-5-carboxamide | NA |

TABLE 2-continued

| Example | Chemical Structure | Formula Name | PDE4B IC$_{50}$(nM) |
|---|---|---|---|
| 18 | 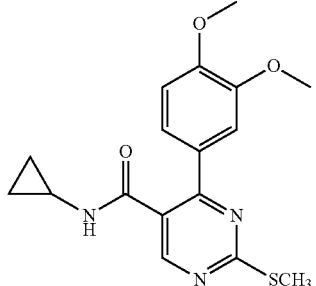 | N-cyclopropyl-4-(3,4-dimethoxyphenyl)-2-(methylthio)pyrimidine-5-carboxamide | 477 |
| 19 | 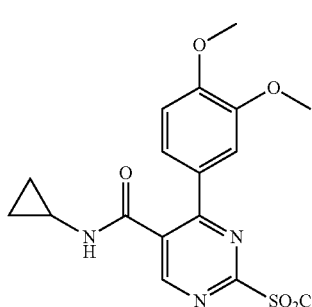 | N-cyclopropyl-4-(3,4-dimethoxyphenyl)-2-(methylsulfonyl)pyrimidine-5-carboxamide | 189 |
| 20 | 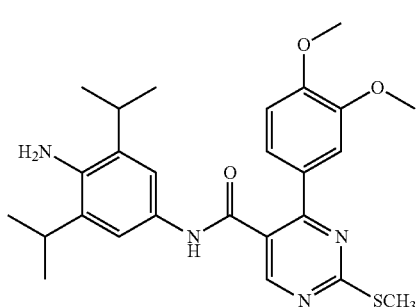 | N-(4-amino-3,5-diisopropylphenyl)-4-(3,4-dimethoxyphenyl)-2-(methylthio)pyrimidine-5-carboxamide | 745 |
| 21 | 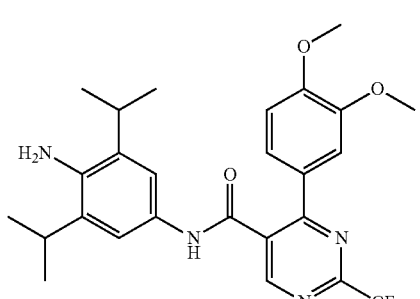 | N-(4-amino-3,5-diisopropylphenyl)-4-(3,4-dimethoxyphenyl)-2-(trifluoromethyl)pyrimidine-5-carboxamide | 222 |
| 22 | 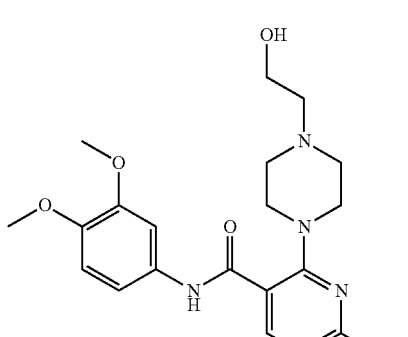 | N-(3,4-dimethoxyphenyl)-4-(4-(2-hydroxyethyl)piperazine-1-yl)-2-(methylthio)pyrimidine-5-carboxamide | 881 |

TABLE 2-continued

| Example | Chemical Structure | Formula Name | PDE4B IC$_{50}$(nM) |
|---|---|---|---|
| 23 | 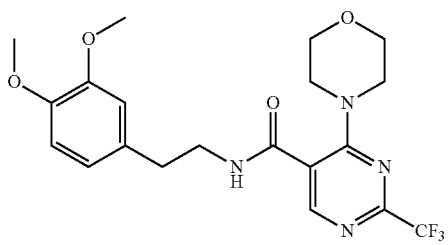 [SMILES: COc1ccc(CCNC(=O)c2cnc(C(F)(F)F)nc2N2CCOCC2)cc1OC] | N-(3,4-dimethoxyphenetyl)-4-morpholino-2-(trifluoromethyl)pyrimidine-5-carboxamide | 150 |
| 24 | 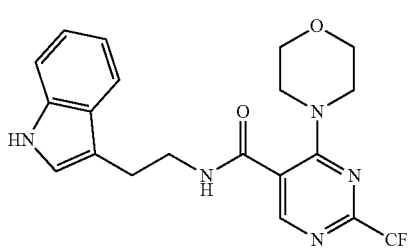 | N-(2-(1H-indole-3-yl)ethyl)-4-morpholino-2-(trifluoromethyl)pyrimidine-5-carboxamide | 469 |
| 25 | 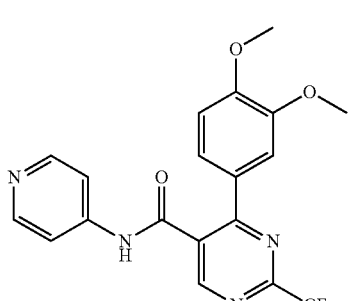 | 4-(3,4-dimethoxyphenyl)-N-(pyridine-4-yl)-2-(trifluoromethyl)pyrimidine-5-carboxamide | 15 |
| 26 | 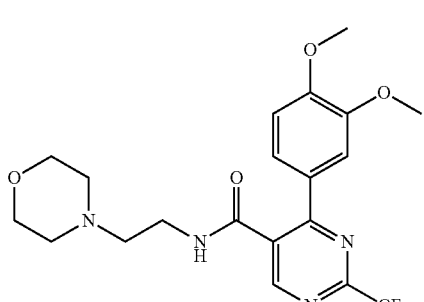 | 4-(3,4-dimethoxyphenyl)-N-(2-morpholinoethyl)-2-(trifluoromethyl)pyrimidine-5-carboxamide | 195 |
| 27 | 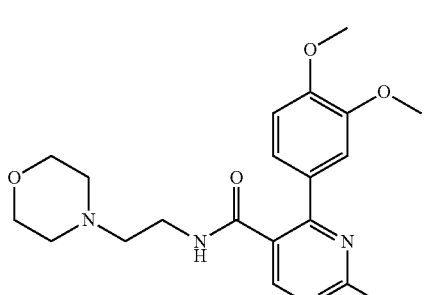 | 4-(3,4-dimethoxyphenyl)-2-(methylthio)-N-(2-morpholinoethyl)pyrimidine-5-carboxamide | 860 |

TABLE 2-continued

| Example | Chemical Structure | Formula Name | PDE4B IC$_{50}$(nM) |
|---|---|---|---|
| 28 | | N-(3,4-dimethoxyphenetyl)-4-(4-(2-hydroxyethyl)piperazine-1-yl)-2-(methylthio)pyrimidine-5-carboxamide | 238 |
| 29 | | N,4-bis(3,4-dimethoxyphenyl)-2-(methylthio)pyrimidine-5-carboxamide | 634 |
| 30 | | N,4-bis(3,4-dimethoxyphenyl)-2-(trifluoromethyl)pyrimidine-5-carboxamide | 61 |
| Comparative Example 1(Rolipram) | | 4-(3-(cyclopentyloxy)-4-methoxyphenyl)pyrrolidine-2-one | 2.2 µM |

As shown in Table 2, the compounds of Examples 1~30 according to the present invention exhibited PDE4B IC$_{50}$ values at the nanomolar level. This means that the compounds of the present invention exhibited remarkably high PED4B inhibitory activity, compared to the IC$_{50}$ value of the compound of Comparative Example 1 (Rolipram, about 2.2 µM), the conventional atopic therapeutic agent. In particular, it was confirmed that the compounds of Examples 1, 3, 7, 8, 10, 11, 16, 25 and 30 all showed significantly lower IC$_{50}$ values less than 10 nM.

Therefore, the compound according to the present invention, the optical isomer thereof or the pharmaceutically acceptable salt thereof can be effectively used as a pharmaceutical composition for the treatment or prevention of inflammatory disease since it has a remarkably excellent inhibitory activity of PDE4B, an enzyme associated with inflammatory diseases.

<Experimental Example 2> Evaluation of Intracellular Enzyme Inhibitory Activity of Compounds According to the Present Invention To evaluate the intracellular enzyme inhibitory activity of the compounds of Examples 1 and 25, PDE4B GFP fusion protein-inhibitor assay was performed using GFP (green fluorescent protein).

The DNA complementary to human PDE4B2A was amplified by PCR using the DNA genome extracted from the human blood sample (QIAamp DNA Blood Mini Kit, Qiagen, Valencia, CA, U.S.A.).

For DNA amplification, 5'-CCGGAATTCGTTC-TATGGCCCAGACCTCACA-3' was used as a forward primer, and 5'-CGCGGATCCTACCAGGGTTT-GAGCTCAGC-3' was used as a reverse primer.

The amplified PDE4B2A cDNA was cloned into pAcGFP1-N1, the mammalian expression mediator, between the EcoR1 and BamH1 restriction enzyme sites, which was transfected into E. coli DH5α cells using chemical transformation reagents (Invitrogen, Carlsbad, CA, U.S.A.).

Plasmids were isolated from the colonies with kanamycin using Plasmid Midi Kit (Qiagen, Valencia, CA, U.S.A.). Then, the plasmid cloned with PDE4B2A gene was transfected into HEK-293 cells (Korean Cell Line Bank, Seoul, Korea) using lipofectamine 3000 (Invitrogen).

The transfected cells were cultured in DMEM at 37° C. for 48 hours in a $CO_2$ incubator. The cells were then cultured with the compounds of Example 1, Example 25 and Comparative Example 1 at the concentrations of 10 nM, 100 nM and 500 nM at 37° C. for 24 hours in a 5% $CO_2$ incubator. Upon completion of the culture, the fluorescence emission of HEK-293 cells was measured by confocal microscopy to perform quantitative analysis, and the results are shown in FIGS. 1 and 2.

Figure 2:
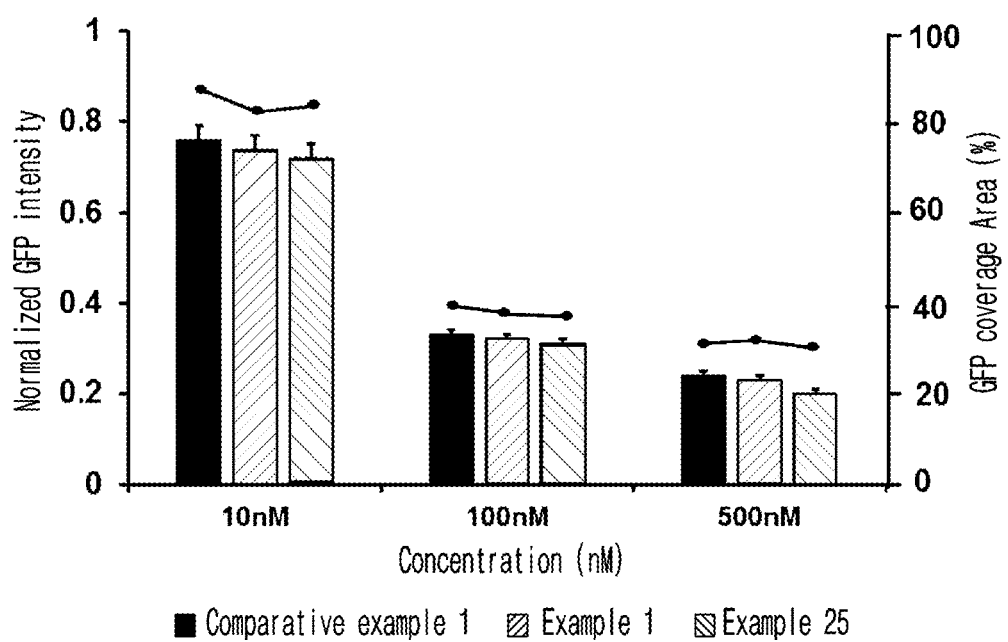
FIG. 2 is a graph showing the fluorescence intensity of the PDE4B GFP fusion protein treated with the compounds of example 1, example 2 and comparative example 1 according to the present invention and the ratio of the total surface cover area of GFP to the total cell surface area.

In addition, the ratio of the surface cover area of GFP to the total cell surface area was measured using MetaMorph software, and the results are shown in FIG. 2.

FIG. 1 is a set of confocal photomicrographs of the fluorescence emission in PDE4B GFP fusion protein-inhibitor assay with the compounds of example 1, example 2 and comparative example 1.

FIG. 2 is a graph showing the fluorescence intensity of the PDE4B GFP fusion protein treated with the compounds of example 1, example 2 and comparative example 1 according to the present invention and the ratio of the total surface cover area of GFP to the total cell surface area. In FIG. 2, the bar graph represents the fluorescence intensity, and the line graph represents the GFP cover area.

As shown in FIGS. 1 and 1, the compounds of Examples 1 and 25 according to the present invention exhibited a relatively weak fluorescence intensity compared to the control group not-treated with any inhibitor. In particular, it was confirmed that the fluorescence intensity was significantly reduced at the concentrations of 100 nM and 500 nM. This indicates that the compounds of Example 1 and Example 25 according to the present invention inhibited the expression of PDE4B2 effectively in cells, indicating that the compounds according to the present invention can be effectively used for atopic diseases associated with PDE4B2.

<Experimental Example 3> Relieving Effect of Compounds According to the Present Invention on Atopic Dermatitis 1. Experiment on the relief of atopic symptoms in Nc/Nga mice treated with DNCB In order to confirm the atopic dermatitis alleviation effect of the compounds of Examples 1 and 25 according to the present invention, atopic symptom relief experiments were performed on the mice with atopic symptoms.

DNCB (dinitrochlorobenzene) was applied on the back of Nc/Nga mouse to induce atopic dermatitis-like symptoms.

As a carrier for treating DNCB, acetone-olive oil in which acetone and olive oil were mixed (3:1) was used. Six groups of mice were prepared as follows: mice treated with the carrier alone; mice treated with Example 1 compound, mice treated with Example 25 compound, mice treated with DNCB alone, mice treated with DNCB and Example 1 compound, and mice treated with DNCB and Example 25 compound.

Particularly, 2 days before the start of the experiment, hair of the dorsal skin of the mouse was removed. After 2 days after removing the hair, 150 μl of 1% DNCB was dissolved in a carrier and applied on the dorsal skin of the mouse. Four days later, the same solution was applied on the dorsal skin of the mouse once again. Then, 150 μl of 0.2% DNCB solution was applied on the dorsal skin of the mouse once a week for 5 weeks. The experimental group mice were applied with the compounds of Example 1 and Example 25 daily from the $6^{th}$ day of the experiment to the end of the experiment.

Through the symptoms such as dryness of the dorsal skin, inflammation, erythema and bleeding, it was confirmed that the dorsal skin became atopic dermatitis-like skin, and it was also confirmed that the symptoms of atopic dermatitis were significantly increased after 2 weeks of the DNCB treatment.

Figure 3:
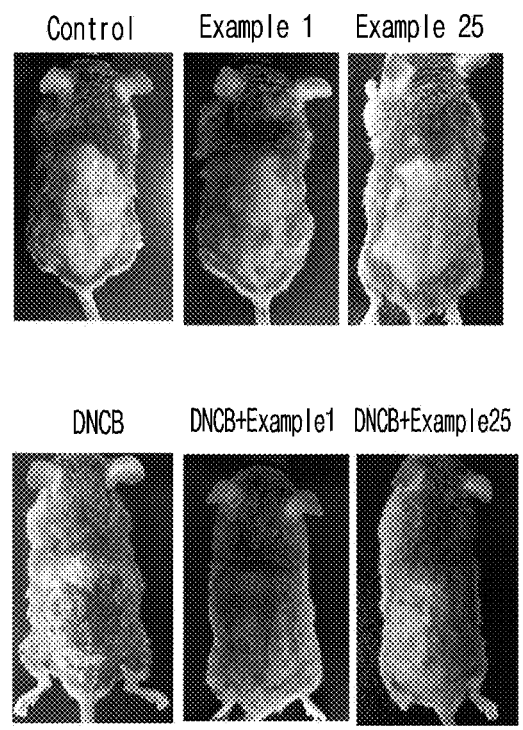
FIG. 3 is a set of photographs showing the dorsal skin of each mouse of the experimental group and control group taken on the last day of the experiment.

FIG. 3 is a set of photographs showing the dorsal skin of each mouse of the experimental group and control group taken on the last day of the experiment.

As shown in FIG. 3, inflammation was induced on the dorsal skin of the mouse treated with DNCB alone. On the other hand, when the compounds of Example 1 and Example 25 were treated together with DNCB, the incidence of inflammation was significantly reduced compared to when only DNCB was treated. In addition, no side effects were observed in the mouse treated with the compound of Example 1 or Example 25 alone. Thus, it was confirmed that the compounds according to the present invention secured the stability in vivo.

2. Atopic Symptom Evaluation Experiment

The degree of atopic symptoms in the experimental group and control group mice was evaluated and quantified once a week for a period of 5 weeks. Scores were given as follows for the four items of erythema/bleeding, edema, threshing/corrosion, scaling/dryness, respectively: 1 (none); 2 (moderate); and 3 (serious). Each experimental group and control group was scored based on a total of 12 points. The score results measured for 5 weeks are shown in FIG. 4.

Figure 4A:
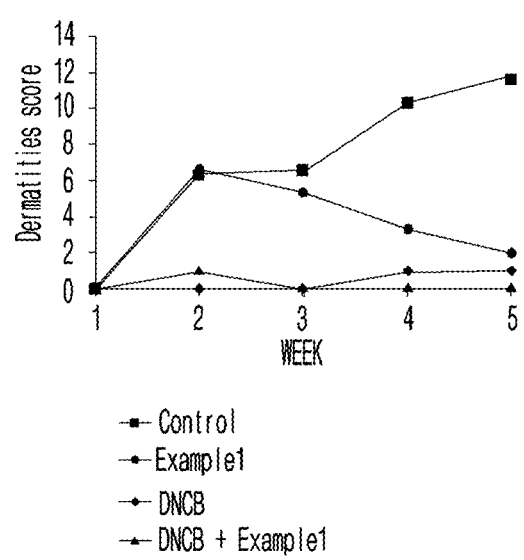
FIG. 4(a), 4(b) are a set of graphs showing the results of scoring atopic symptoms of the mouse measured in the experimental results for 5 weeks.
Figure 4B:
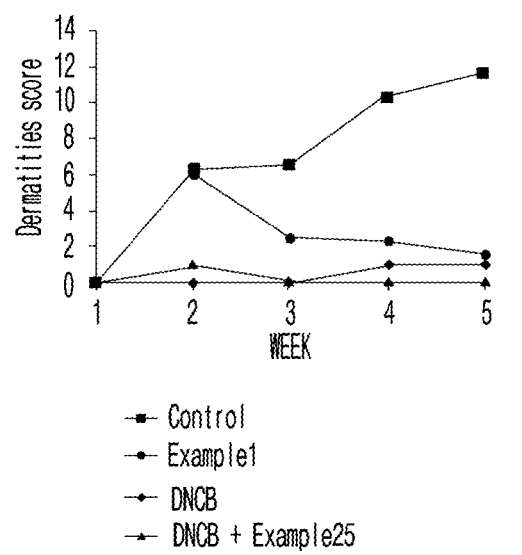

FIG. 4(a), 4(b) are a set of graphs showing the results of scoring atopic symptoms of the mouse measured in the experimental results for 5 weeks.

FIG. 4(a) is a graph showing the dermatitis score for the compound of example 1, and FIG. 4(b) is a graph showing the dermatitis score for the compound of example 25.

As shown in FIG. 4(a), 4(b), when DNCB was treated alone, the dermatitis score at week 5 was 12, whereas when the compounds of Example 1 and Example 25 were treated with DNCB, the dermatitis score at week 5 was significantly different, less than about 3. From the above results, it was confirmed that the dermatitis disease symptoms were significantly alleviated by the compounds according to the present invention.

3. Measurement of Effect on Relieving Itching

Figure 5A:
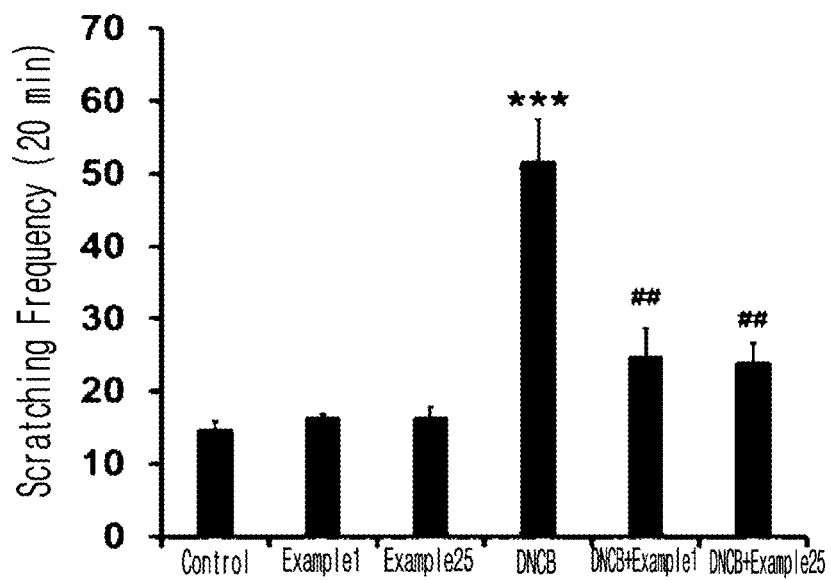
FIG. 5(a) is a graph showing the number of scratches for 20 minutes of each mouse of the experimental group and control group.

In order to confirm the effect of the compounds according to the present invention on relieving itching, the number of scratches for 20 minutes of each mouse of the experimental group and control group was measured, and the results are shown graphically in FIG. 5(a), (b).

FIG. 5(a) is a graph showing the number of scratches for 20 minutes of each mouse of the experimental group and control group.

As shown in FIG. 5(a), the number of scratches of the mouse treated with the compounds of Example 1 and Example 25 was significantly less than that of the mouse treated with DNCB alone.

4. Observation of Skin Change

After completing the experiment, the physical changes were observed by incising the dorsal skin of the experimental group and control group mice. As a result, hypertrophy and edema were clearly observed in the mouse treated with DNCB alone. In contrast, the skin of the mouse treated with the compounds of Example 1 and Example 25 showed no symptoms of hypertrophy and edema than that of the mouse treated with DNCB alone.

Figure 5B:
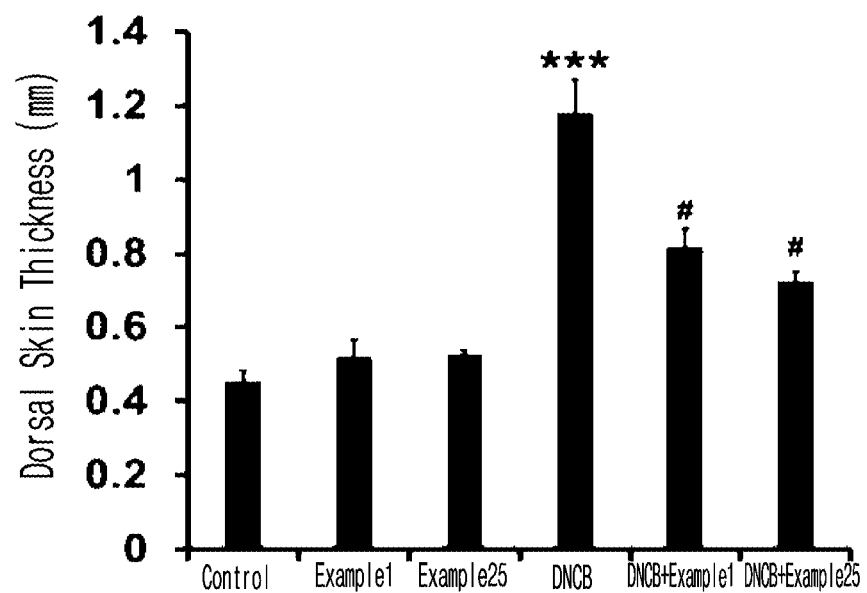
FIG. 5(b) is a graph showing the measured thickness of the dorsal skin of each mouse of the experimental group and control group incised.

In addition, to confirm the alleviating effect of the compounds according to the present invention on skin hypertrophy, the incised skin thickness was measured, and the results are shown graphically in FIG. 5(b).

FIG. 5(b) is a graph showing the measured thickness of the dorsal skin of each mouse of the experimental group and control group incised.

As shown in FIG. 5(b), the skin thickness of the mouse treated with DNCB alone was 1.19 mm, which was significantly increased compared to that of the control group (0.45 mm), and the skin thickness of the mouse treated with the compounds of Example 1 and Example 25 was significantly reduced to 0.83 mm and 0.71 mm, respectively.

5. Observation of Lymph Node and Spleen Changes

In order to confirm the effect of the compounds according to the present invention, the lymph node of each mouse of the experimental group and control group was separated and observed. The lymph node is an interaction site between the antigen and immune cells, and since the size of the lymph node increases during the development of inflammatory symptoms, it is possible to confirm the presence or absence of inflammatory disease depending on the size of the lymph node. The photographs of the separated lymph node of each mouse of the experimental group and control group are shown in FIG. 6(a), and the weight of the lymph node and the spleen of each mouse of the experimental group and control group are shown in FIG. 6(b) and FIG. 6(c).

Figure 6A:
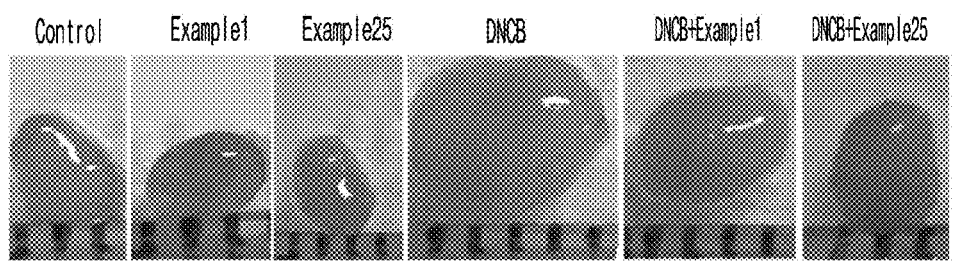
FIG. 6(a) is a set of photographs of the lymph nodes of the experimental and control group mice.

FIG. 6(a) is a set of photographs of the lymph nodes of the experimental and control group mice.

Figure 6B:
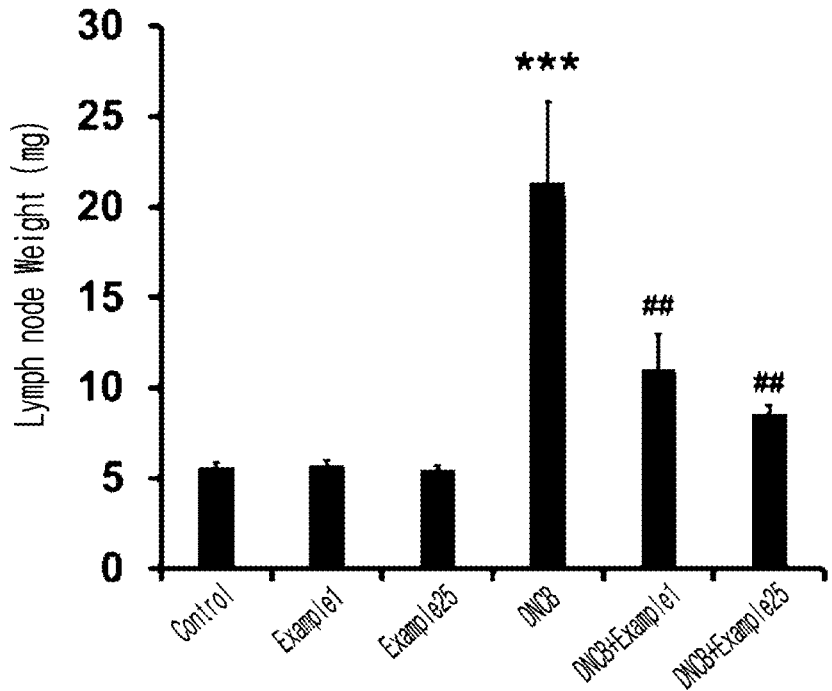
FIG. 6(b) is a graph showing the weight of the lymph nodes of the experimental and control group mice.

FIG. 6(b) is a graph showing the weight of the lymph nodes of the experimental and control group mice.

Figure 6C:
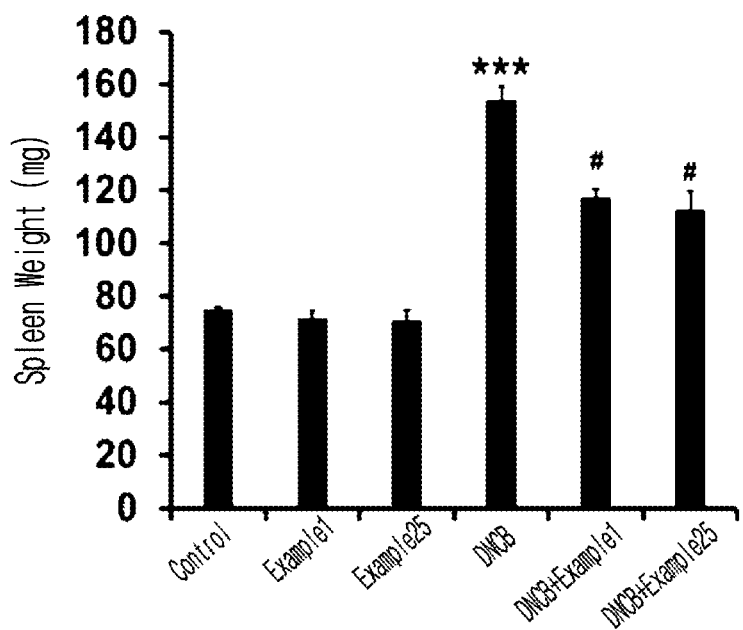
FIG. 6(c) is a graph showing the weight of the spleens of the experimental and control group mice.

FIG. 6(c) is a graph showing the weight of the spleens of the experimental and control group mice.

As shown in FIG. 6(a), the lymph node of the mouse treated with DNCB alone was significantly enlarged compared to that of the control mouse. In addition, it was confirmed that the lymph node of the mouse treated with the compounds of Example 1 and Example 25 was significantly reduced compared to that of the mouse treated with DNCB alone.

As shown in FIG. 6(b), the weight of the lymph node of the mouse treated with DNCB alone was significantly heavier than that of the control mouse. On the other hand, it was confirmed that the weight of the lymph node of the mouse treated with the compounds of Example 1 and Example 25 was significantly reduced compared to that of the mouse treated with DNCB alone.

As shown in FIG. 6(c), the weight of the spleen was also significantly reduced by the treatment of the compounds of Example 1 and Example 25.

Therefore, it was confirmed that the compounds according to the present invention inhibited the lymph node and spleen hypertrophy closely related to the development of inflammatory disease in vivo, and that the compounds according to the present invention were effective in the treatment of inflammatory disease.

<Experimental Example 4> Observation of Mouse Skin Tissue

The dorsal skin tissue of the mouse was observed to confirm the effect of the compounds according to the invention on inflammatory disease.

The dorsal skin samples were obtained from the experimental group and control group mice. The samples were fixed using 10% neutral buffered formalin and then embedded in paraffin. 4 μm thin tissue sections were prepared and stained with H & E (hematoxylin & eosin). Thin tissue sections (4 μm) were prepared and stained with H&E (hematoxylin & eosin). In addition, the sections were stained with toluidine blue to investigate mast cell infiltration. Then, the stained tissue sections were photographed using NikonAX70 optical microscope (Tokyo, Japan).

Figure 7:
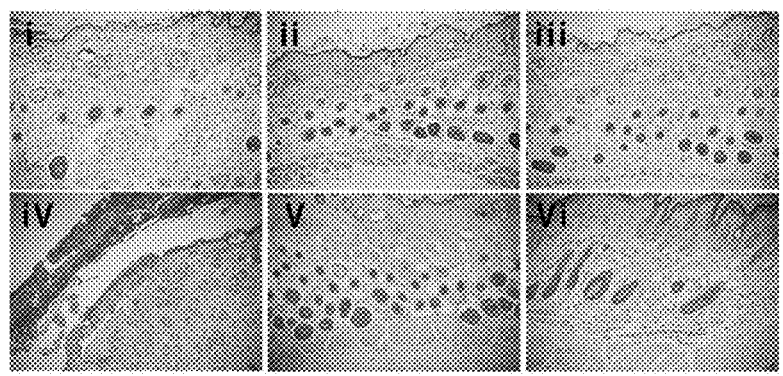
FIG. 7 is a set of optical photomicrographs taken after H&E (hematoxylin & eosin) staining of the dorsal skin tissue sections of the experimental and control group mice. (i=control group, ii=example 1, iii=example 25, iv=DNCB, v=DNCB+example 1, vi=DNCB+example 25)

FIG. 7 is a set of optical photomicrographs taken after H&E (hematoxylin & eosin) staining of the dorsal skin tissue sections of the experimental and control group mice. (i=control group, ii=example 1, iii=example 25, iv=DNCB, v=DNCB+example 1, vi=DNCB+example 25)

Figure 8:
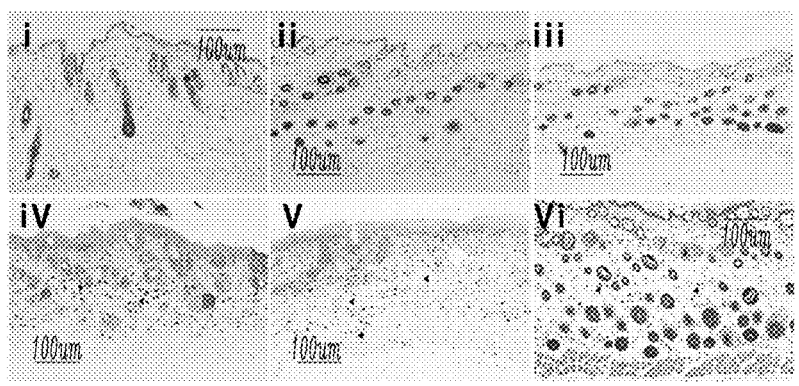
FIG. 8 is a set of optical micrographs taken after toluidine blue staining of adipocytes of the dorsal skin tissue sections of the experimental and control group mice. (i=control group, ii=example 1, iii=example 25, iv=DNCB, v=DNCB+example 1, vi=DNCB+example 25)

FIG. 8 is a set of optical micrographs taken after toluidine blue staining of adipocytes of the dorsal skin tissue sections of the experimental and control group mice. (i=control group, ii=example 1, iii=example 25, iv=DNCB, v=DNCB+example 1, vi=DNCB+example 25)

Figure 9:
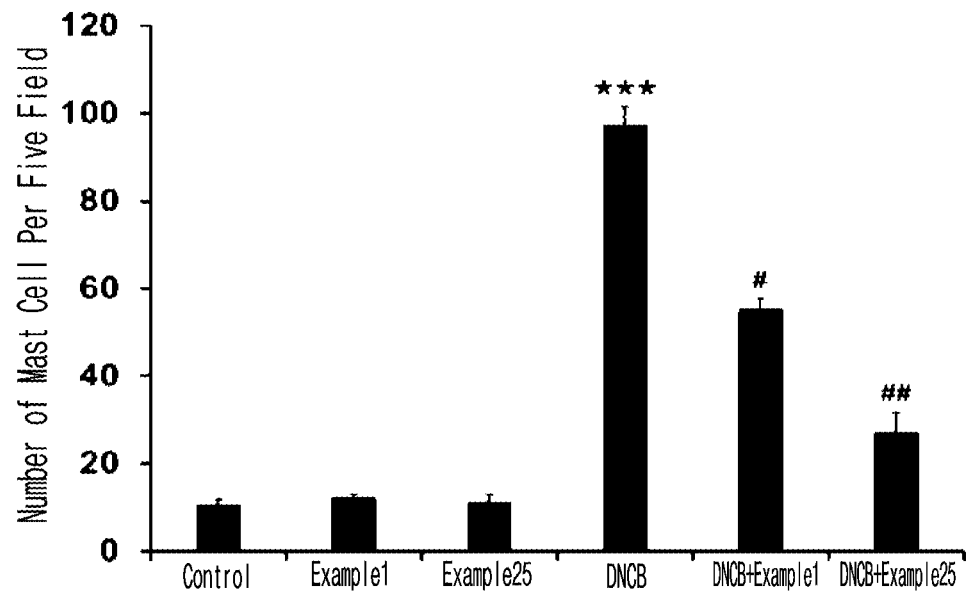
FIG. 9 is a graph showing the number of adipocytes in the dorsal skin tissue sections of the experimental group and control group mice.

FIG. 9 is a graph showing the number of adipocytes in the dorsal skin tissue sections of the experimental group and control group mice.

As shown in FIG. 7, the skin tissue sections of the control group and the groups treated with the compounds of Example 1 and Example 25 showed the normal skin structure. On the other hand, the skin sections of the mouse treated with DNCB alone showed severe epidermal hyperplasia (acanthosis) and keratosis, and inflammatory cells penetrated deeply into both the epidermal and dermal regions at high density. In the skin sections of the mouse treated with the compounds of Example 1 and Example 25 with DNCB, epidermal hyperplasia and keratosis were significantly reduced, and there were almost no inflammatory cells.

As shown in FIGS. 8 and 9, the number of mast cells was increased in the skin tissue of the mouse treated with DNCB alone, compared to that of the control group. On the other hand, the number of mast cells was significantly reduced in the skin tissue of the mouse treated with the compounds of Example 1 and Example 25, compared to that of the mouse treated with DNCB alone.

Therefore, it was confirmed that the acanthosis and keratosis in the skin were alleviated, the production of inflammatory cells was suppressed, and the increase of mast cells was reduced by the compounds of Example 1 and Example 25 according to the present invention, so they can be effectively used as a pharmaceutical composition for the treatment or prevention of inflammatory disease.

In addition, the mouse tissue CD4+ cells were stained to confirm the expressions of IL-17, IFN-γ, IL-4 and IL-5.

FIG. 10(a)-FIG. 10(d) are microphotographs showing the expression levels of IL-17, IFN-γ, IL-4 and IL-5, respectively, after staining CD4+ cells of the dorsal skin tissues of the experimental group and control group mice. (i=control group, ii=example 1, iii=example 25, iv=DNCB, v=DNCB+example 1, vi=DNCB+example 25)

Figure 10A:
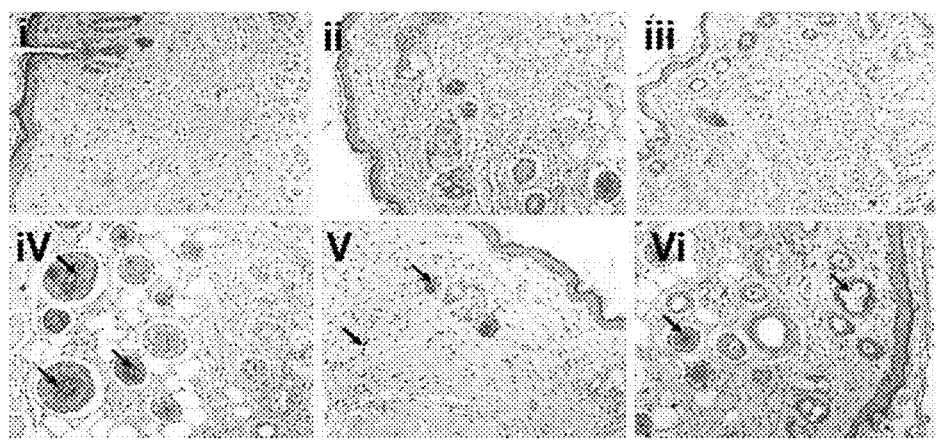
FIG. 10(a)-FIG. 10(d) are microphotographs showing the expression levels of IL-17, IFN-γ, IL-4 and IL-5, respectively, after staining CD4+ cells of the dorsal skin tissues of the experimental group and control group mice. (i=control group, ii=example 1, iii=example 25, iv=DNCB, v=DNCB+example 1, vi=DNCB+example 25)
Figure 10B:
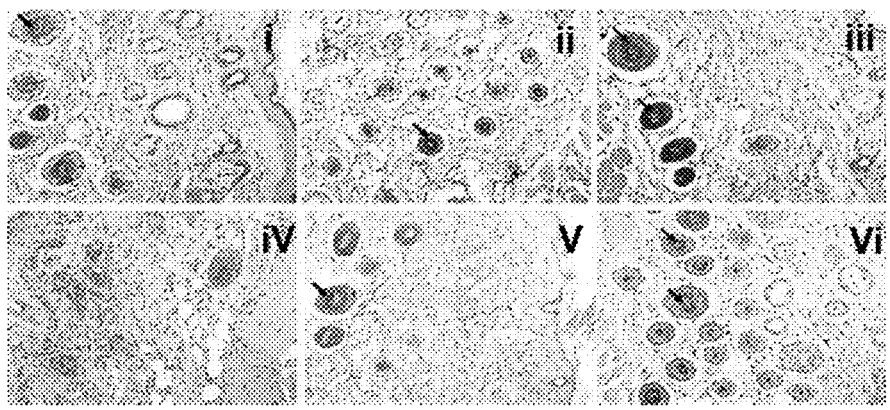
Figure 10C:
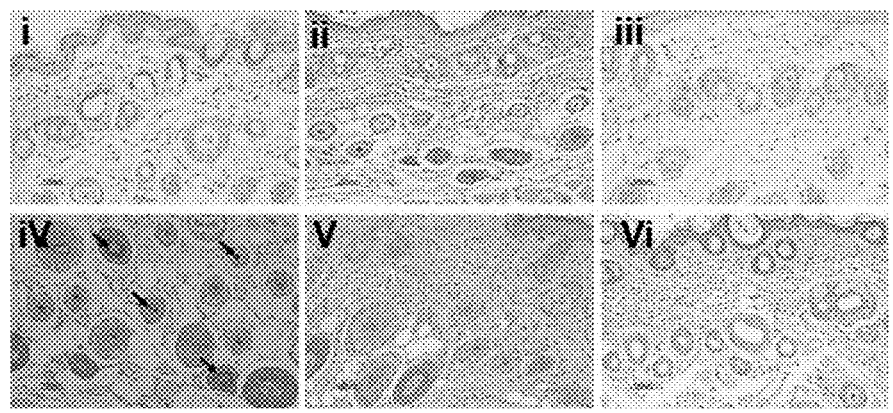
Figure 10D:
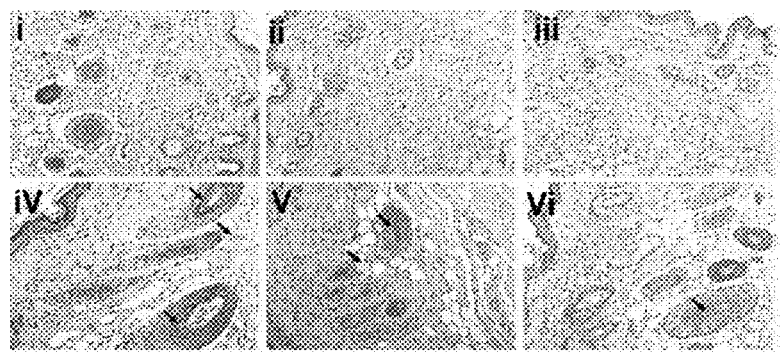

As shown in FIGS. 10(a), 10(c) and 10(d), when the compounds of Example 1 and Example 25 were applied on the skin, the expressions of IL-17, IL-4 and IL-5 of CD4+ cells were more suppressed than when DNCB was treated alone. IL-17, IL-4 and IL-5 are cytokines associated with the expression of inflammation, and when the compound according to the present invention is applied on the skin with inflammatory disease, the expressions of IL-17, IL-4 and IL-5 are suppressed. Therefore, the compound according to the present invention can be effectively used as a pharmaceutical composition for the treatment or prevention of inflammatory disease.

As shown in FIG. 10(b), when the compounds of Example 1 and Example 25 were applied on the skin, the expression of IFN-γ was activated in DC4+ cells. IFN-γ is a cytokine protein that suppresses viral proliferation in cells, and when the compound according to the present invention is applied on the skin, the expression of IFN-γ is activated to suppress inflammatory diseases in cells. Therefore, the compound according to the present invention can be effectively used as a pharmaceutical composition for the treatment or prevention of inflammatory disease.

<Experimental Example 5> Enzyme-Linked Immunosorbent Assay (ELISA) Experiment of Compounds According to the Present Invention To confirm the effect of the compounds according to the present invention on the synthesis of DNCB-induced IgE and inflammatory mediators, ELISA (Enzyme-Linked ImmunoSorbent Assay) was performed with the control group and the experimental group treated with the compounds of Example 1 and Example 25.

FIG. 11(a)-FIG. 11(e) are graphs showing the expression levels of IL-4, IL-5, IFN-γ, IL-17 and IgE, respectively, shown when performing sandwich ELISA (Enzyme-Linked ImmunoSorbent Assay) with the mouse skin tissues.

Figure 11A:
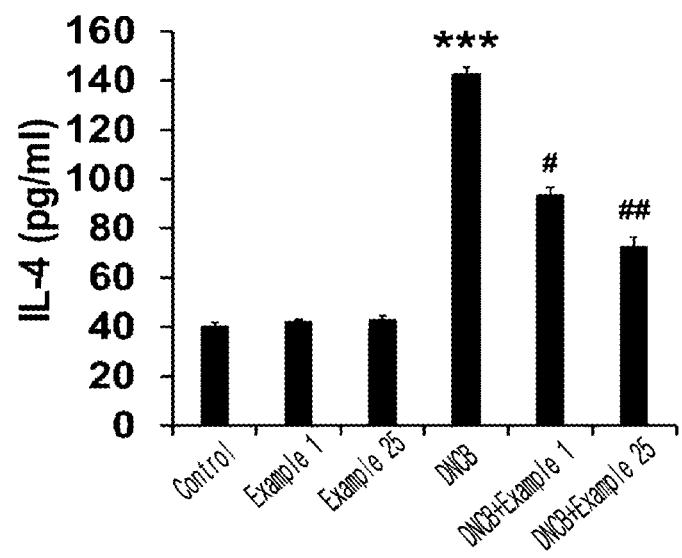
FIG. 11(a)-FIG. 11(e) are graphs showing the expression levels of IL-4, IL-5, IFN-γ, IL-17 and IgE, respectively, shown when performing sandwich ELISA (Enzyme-Linked ImmunoSorbent Assay) with the mouse skin tissues.
Figure 11B:
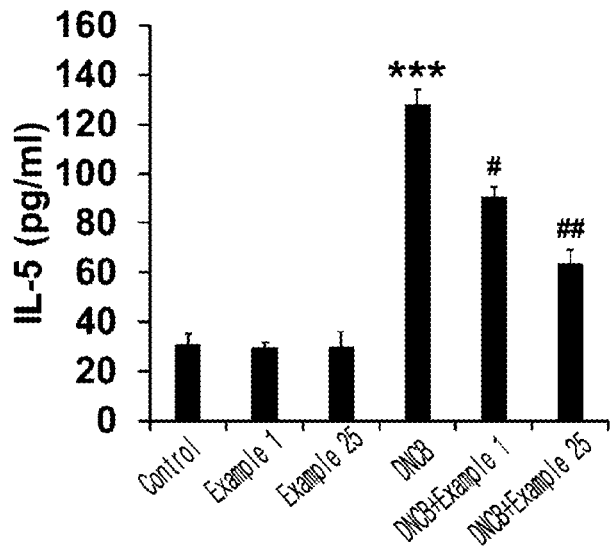
Figure 11C:
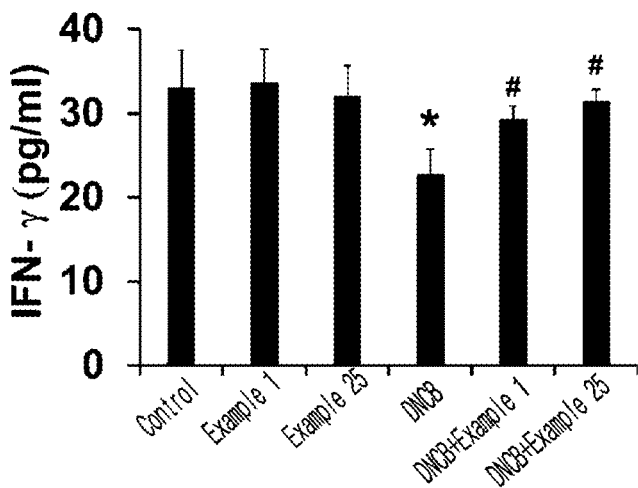
Figure 11D:
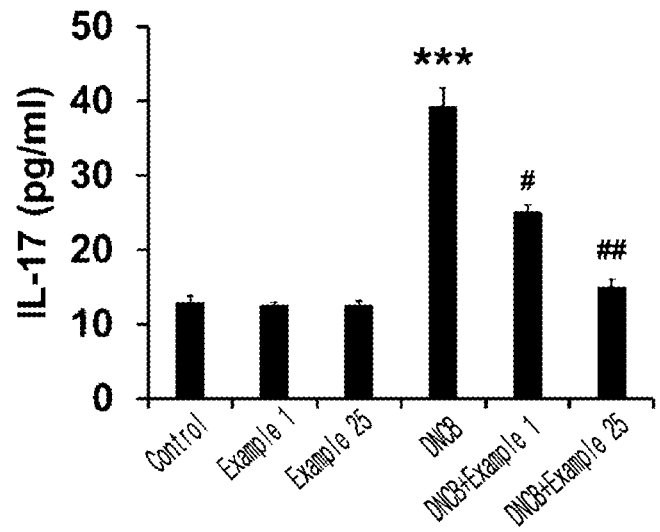

As shown in FIGS. 11(a), 11(b) and 11(d), the expressions of cytokines such as IL-4, IL-5 and IL-17 were significantly higher in the skin of the mouse treated with DNCB alone. On the other hand, when the compounds of Example 1 and Example 25 were treated, the expressions of IL-4, IL-5 and IL-17 were significantly suppressed.

IL-4, IL-5 and IL-17 are cytokines associated with the expression of inflammation, and when the compound according to the present invention is applied on the skin with inflammatory disease, the expressions of IL-17, IL-4 and IL-5 are suppressed. Therefore, the compound according to the present invention can be effectively used as a pharmaceutical composition for the treatment or prevention of inflammatory disease. In contrast, the expression of IFN-γ was high in the skin of the mouse treated with the compounds of Example 1 and Example 25.

IFN-γ is a cytokine protein that suppresses viral proliferation in cells, and when the compound according to the present invention is applied on the skin, the expression of IFN-γ is activated to suppress inflammatory diseases in cells. Therefore, the compound according to the present invention can be effectively used as a pharmaceutical composition for the treatment or prevention of inflammatory disease.

Figure 11E:
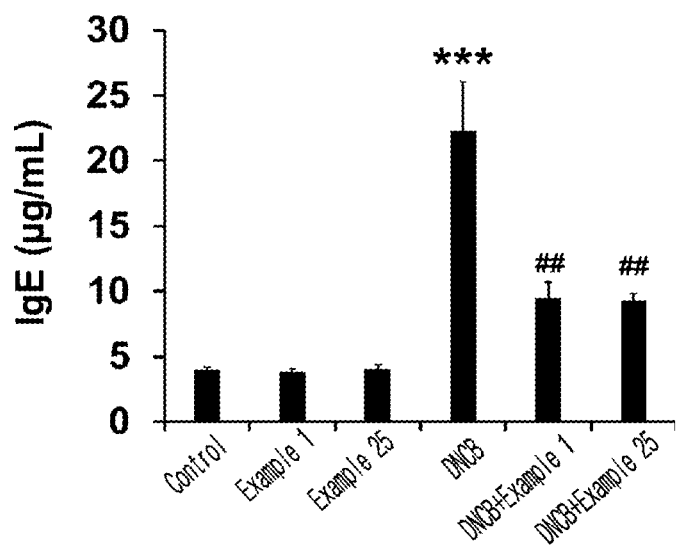

As shown in FIG. 11(e), the expression of IgE (immunoglobulin E) in the skin of the mouse treated with DNCB alone was significantly higher than that of the control group mouse. On the other hand, when the compounds of Example 1 and Example 25 were treated with DNCB, the expression of IgE (immunoglobulin E) was significantly reduced.

IgE (immunoglobulin E) is a substance that initiates IgE-mediated allergic reaction by binding to Fc receptors on the surfaces of mast cells and basophils, and when the compound according to the present invention is applied on the skin, the expression of IgE is inhibited to suppress inflammatory diseases in cells. Therefore, the compound according to the present invention can be effectively used as a pharmaceutical composition for the treatment or prevention of inflammatory disease.

In addition, to evaluate the inhibitory effect of the compounds of Example 1 and Example 25 on the synthesis of TNF-α, in vitro assay was performed. Particularly, after culturing human PBMC cells, the secretion of TNF-α was stimulated using bacterial LPS, and the expression level of TNF-α was measured.

Figure 11F:
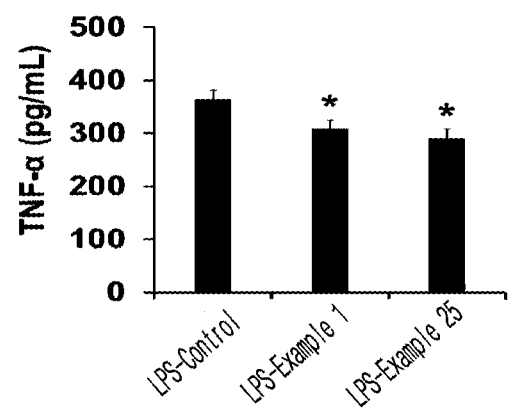
FIG. 11(f) is a graph showing the inhibitory effect of the compounds of Example 1 and Example 25 on the synthesis of TNF-α.

FIG. 11(f) is a graph showing the inhibitory effect of the compounds of Example 1 and Example 25 on the synthesis of TNF-α.

As shown in FIG. 11(f), both the compounds of Example 1 and Example 25 effectively inhibited the synthesis of TNF-α in lymphocyte culture experiment.

TNF-α is a well-known pro-inflammatory mediator, and its synthesis is known to occur in T lymphocytes. Since the compound according to the present invention was confirmed to inhibit the expression of TNF-α through this experiment, the compound according to the present invention can be effectively used for the prevention or treatment of inflammatory diseases.

<Experimental Example 6> Molecular Docking Experiment of Compounds According to the Present Invention Molecular docking experiment was performed to confirm the binding force of the compound of Example 25 to the cAMP binding site of PDE4B enzyme.

Molecular docking of the compound of Example 25 to PDE4B (PDB: 1F0J) was observed using Accelrys Discovery Studio (v 4.0) implemented via the graphical interface DS-CDOCKER protocol.

Figure 12:
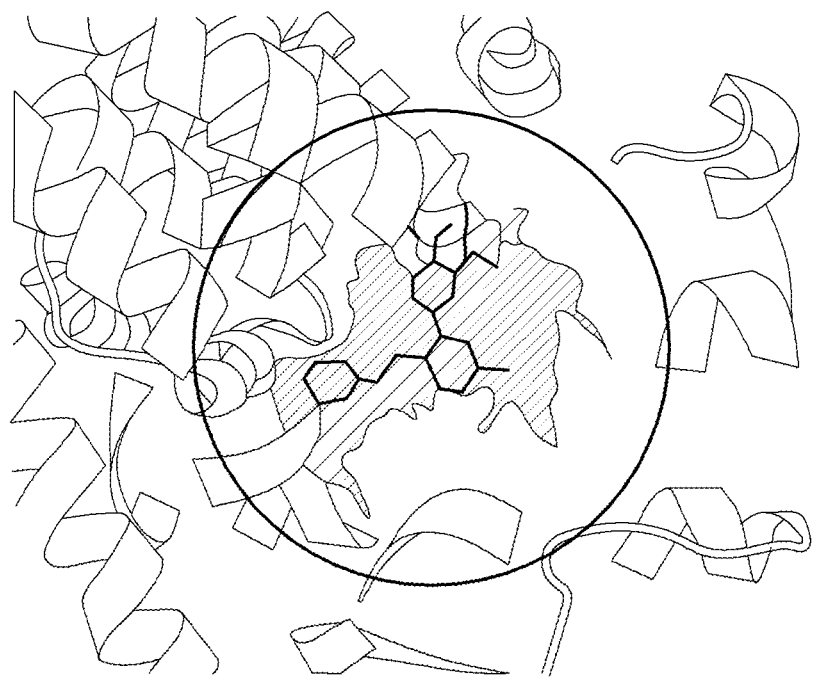
FIG. 12 is a Discovery Srudio photograph showing the binding between the ligand and PDE4B in the catalytic binding region.

FIG. 12 is a Discovery Srudio photograph showing the binding between the ligand and PDE4B in the catalytic binding region.

Figure 13:
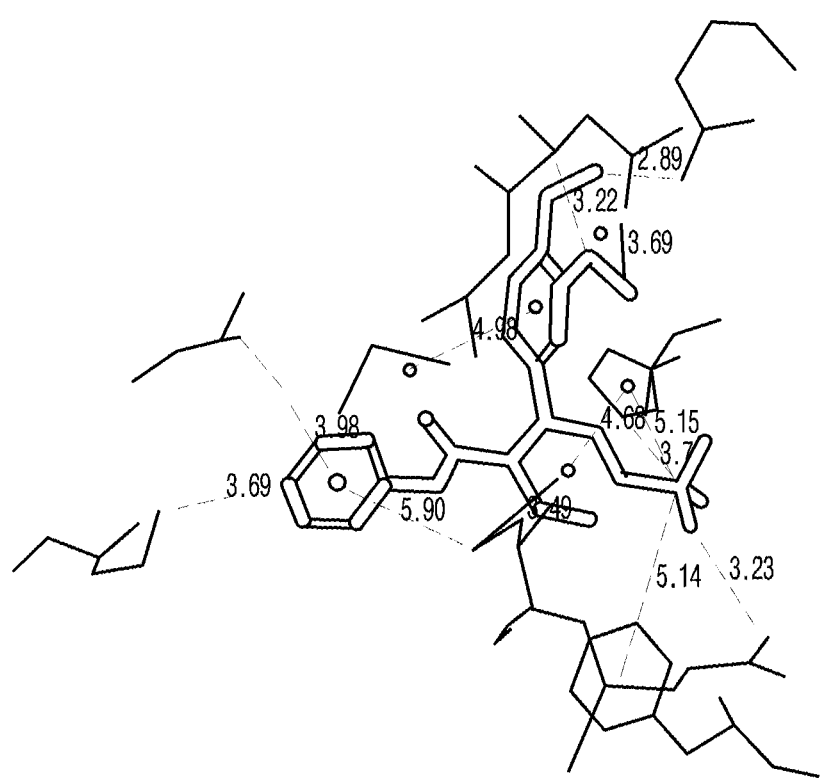
FIG. 13 is a three-dimensional diagram showing the binding distance between the compound of Example 25 and the PDE4B ligand.

FIG. 13 is a diagram showing the binding distance between the compound of Example 25 and the PDE4B ligand.

Figure 14:
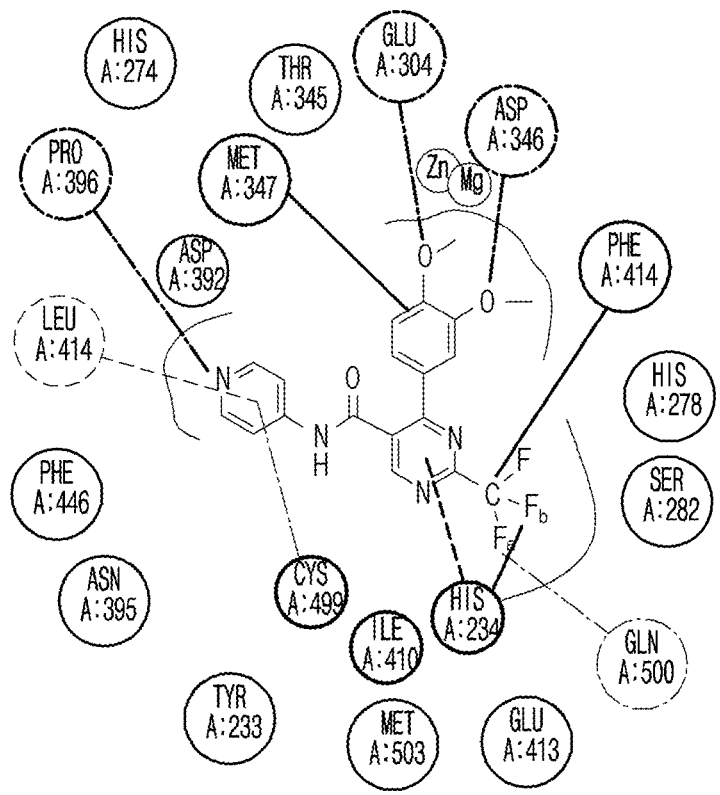
FIG. 14 is a two-dimensional diagram showing the binding between the compound of Example 25 and the PDE4B ligand.
Figure 14:
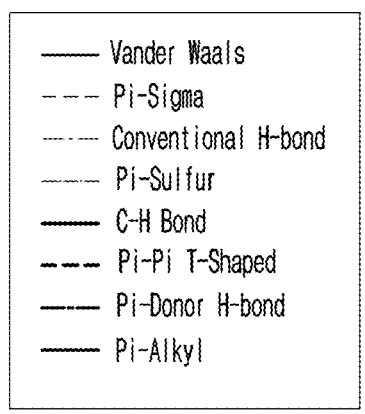

FIG. 14 is a two-dimensional diagram showing the binding between the compound of Example 25 and the PDE4B ligand.

Figure 15:
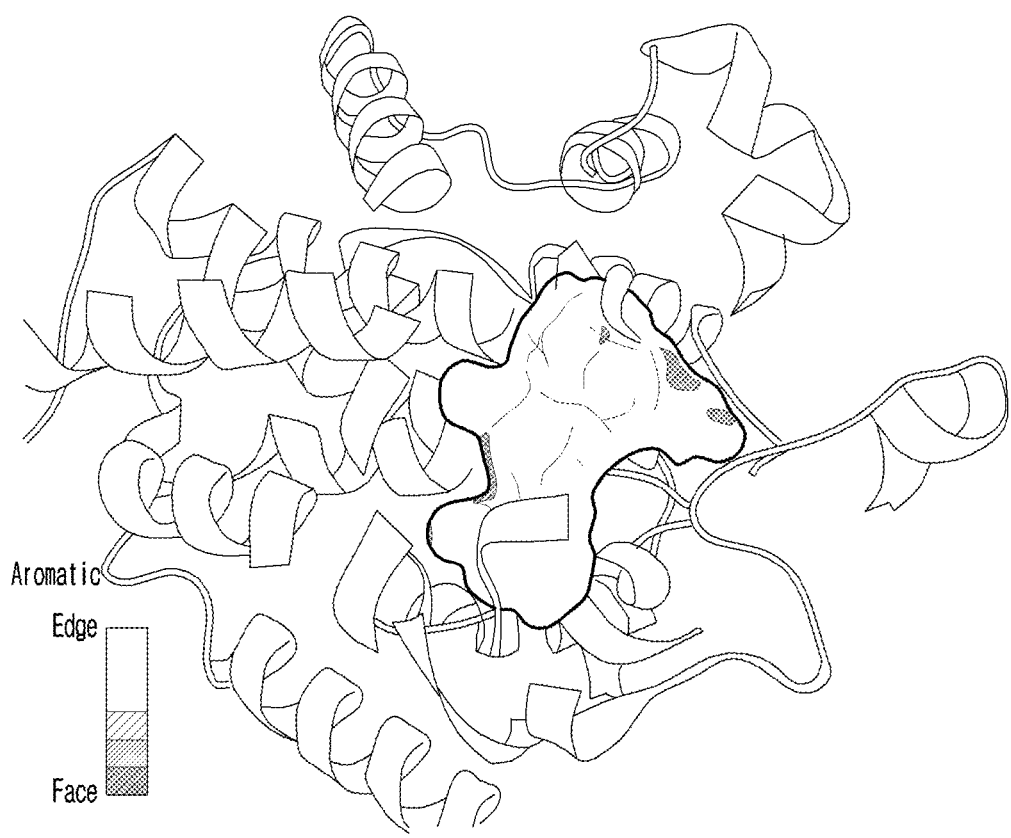
FIG. 15 is an aromatic three-dimensional diagram showing the PDE4B catalyst binding site of the compound of Example 25.

FIG. 15 is an aromatic three-dimensional diagram showing the PDE4B catalyst binding site of the compound of Example 25.

Figure 16:
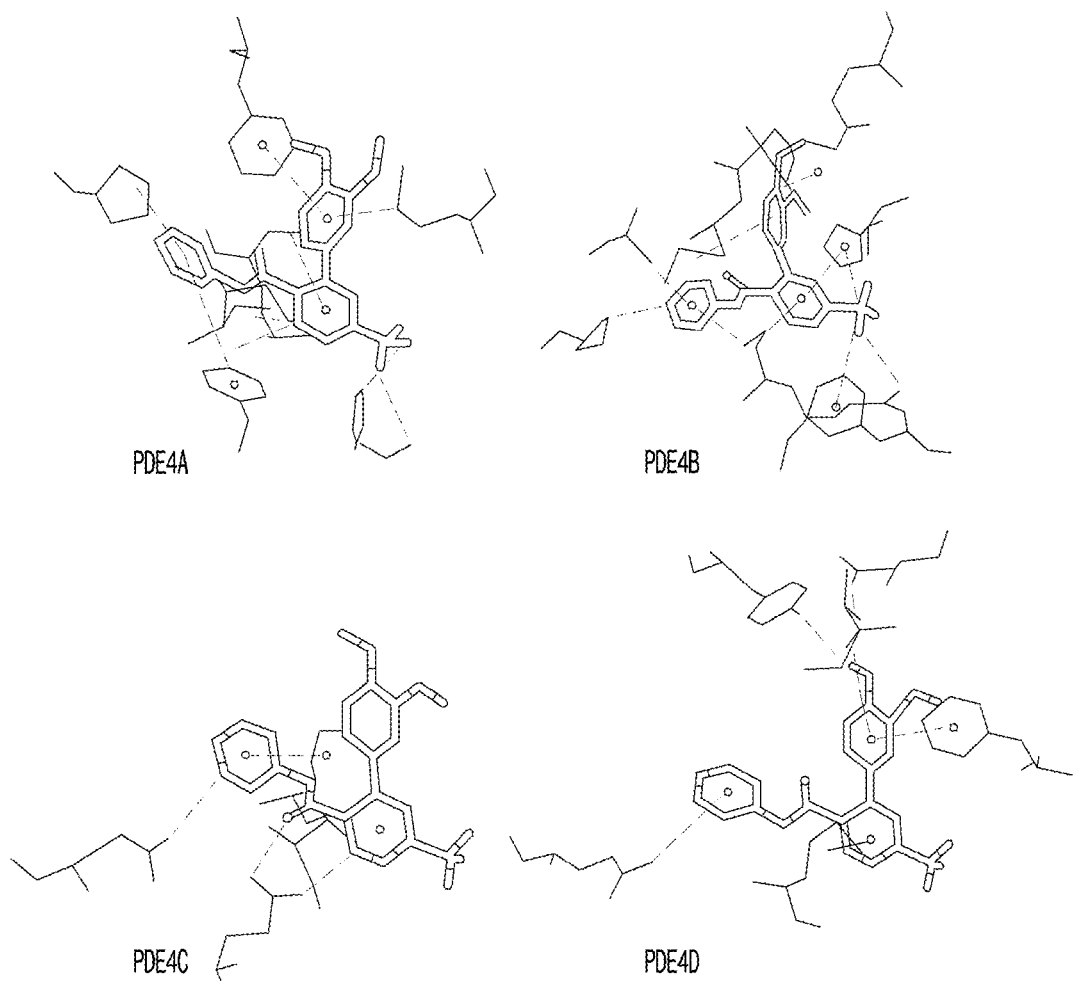
FIG. 16 is a set of three-dimensional diagrams showing the binding structure of the compound of Example 25 in the active sites of PDE4A, PDE4B, PDE4C and PDE4D.

FIG. 16 is a set of three-dimensional diagrams showing the binding structure of the compound of Example 25 in the active sites of PDE4A, PDE4B, PDE4C and PDE4D.

As shown in FIGS. 13 and 14, the fluorine atom of the compound of Example 25 (fluorine atom represented by a in FIG. 14) formed a strong hydrogen bond of 3.23 Å with Gln 500 of PDE4B, and another fluorine atom (fluorine atom represented by b in FIG. 14) formed a strong carbon hydrogen bond with His234 of PDE4B.

As shown in FIG. 15, the compound of Example 25 penetrated deeply into the active region of PDE4B and combined.

As shown in FIG. 16, it was confirmed that the compound of Example 25 had a very limited binding property to PDE4A, PDE4C and PDE4D.

Therefore, it was confirmed that the compound of Example 25 had the selectivity to PDE4B, so that it can more effectively inhibit PDE4B, an inflammatory disease-related enzyme.

Through the molecular docking experiment with the compound of Example 25 according to the present invention, it was confirmed that the compound of Example 25 had excellent and selective binding properties to PDE4B. It was also confirmed from the above results that the compound according to the present invention effectively inhibited the expression of PDE4B, an inflammatory disease-related enzyme, at the molecular level. Therefore, the compound according to the present invention can be effectively used for the treatment or prevention of inflammatory diseases.

INDUSTRIAL APPLICABILITY

The benzamide derivative compound according to the present invention can be effectively used as a pharmaceutical composition for the treatment or prevention of inflammatory diseases.

What is claimed is:

1. A compound represented by Formula 1 below, an optical isomer thereof or a pharmaceutically acceptable salt thereof:

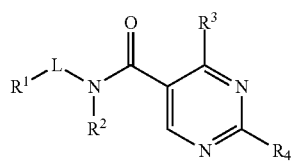

[Formula 1]

wherein,

L is single bond or straight or branched $C_1$-$C_6$ alkylene;

$R^1$ is hydrogen; $C_3$-$C_8$ cycloalkyl; substituted or unsubstituted $C_6$-$C_{12}$ aryl, wherein the substituted $C_6$-$C_{12}$ aryl is substituted with one or more substituents selected from the group consisting of halogen, —$NH_2$, straight or branched $C_1$-$C_3$ alkyl, and straight or branched $C_1$-$C_3$ alkoxy; substituted or unsubstituted heteroaryl consisting of 6 to 12 atoms containing one or more heteroatoms selected from the group consisting of N and O, wherein the substituted heteroaryl consisting of 6 to 12 atoms is substituted with one or more halogens; or heterocycloalkyl consisting of 6 to 10 atoms containing one or more heteroatoms selected from the group consisting of N and O; and $R^2$ is hydrogen or straight or branched $C_1$-$C_3$ alkyl;

R3 is substituted or unsubstituted $C_6$-$C_{10}$ aryl, wherein the substituted $C_6$-$C_{10}$ aryl is substituted with one or more methoxy groups; or substituted or unsubstituted morpholinyl or piperazinyl, wherein the substituted morpholinyl or piperazinyl is substituted with one or more hydroxyl ethyl groups; and $R^4$ is $C_1$-$C_3$ haloalkyl, or wherein, L is single bond;

$R^1$ is $C_3$-$C_8$ cycloalkyl; substituted or unsubstituted $C_6$-$C_{12}$ aryl, wherein the substituted $C_6$-$C_{12}$ aryl is substituted with one or more substituents selected from the group consisting of halogen, —$NH_2$, straight or branched $C_1$-$C_3$ alkyl, and straight or branched $C_1$-$C_3$ alkoxy; substituted or unsubstituted heteroaryl consisting of 6 to 12 atoms containing one or more heteroatoms selected from the group consisting of N and O, wherein the substituted heteroaryl consisting of 6 to 12 atoms is substituted with one or more halogens; or heterocycloalkyl consisting of 6 to 10 atoms containing one or more heteroatoms selected from the group consisting of N and O; and $R^2$ is hydrogen or straight or branched $C_1 C_3$ alkyl;

$R^3$ is substituted $C_6$-$C_{10}$ aryl, wherein the substituted $C_6$-$C_{10}$ aryl is substituted with one or more methoxy groups; or substituted or unsubstituted morpholinyl or piperazinyl, wherein the substituted morpholinyl or piperazinyl is substituted with one or more hydroxyl ethyl groups; and $R^4$ is —$SR^5$ or $SO_2R^5$, wherein $R^5$ is straight or branched $C_1$-$C_6$ alkyl, or wherein, L is straight or branched $C_1$-$C_6$ alkylene;

$R^1$ is substituted or unsubstituted $C_6$-$C_{12}$ aryl, wherein the substituted $C_6$-$C_{12}$ aryl is substituted with one or more substituents selected from the group consisting of halogen, —$NH_2$, straight or branched $C_1$-$C_3$ alkyl, and straight or branched $C_1$-$C_3$ alkoxy; substituted or unsubstituted heteroaryl consisting of 6 to 12 atoms containing one or more heteroatoms selected from the group consisting of N and O, wherein the substituted heteroaryl consisting of 6 to 12 atoms is substituted with one or more halogens; or heterocycloalkyl consisting of 6 to 10 atoms containing one or more heteroatoms selected from the group consisting of N and O; and $R^2$ is hydrogen or straight or branched $C_1$-$C_3$ alkyl;

$R^3$ is substituted or unsubstituted morpholinyl or piperazinyl, wherein the substituted morpholinyl or piperazinyl is substituted with one or more hydroxyl ethyl groups; and $R^4$ is —$SR^5$ or $SO_2R^5$, wherein $R^5$ is straight or branched $C_1$-$C_6$ alkyl.

2. The compound, the optical isomer thereof or the pharmaceutically acceptable salt thereof according to claim 1, wherein:

L is single bond or straight or branched $C_1$-$C_3$ alkylene;

$R^1$ is hydrogen; $C_3$-$C_6$ cycloalkyl; substituted or unsubstituted $C_6$-$C_{10}$ aryl, wherein the substituted $C_6$-$C_{10}$ aryl is substituted with one or more substituents selected from the group consisting of fluoro —$NH_2$, methoxy and isopropyl; substituted or unsubstituted heteroaryl consisting of 6 to 10 atoms containing one or more heteroatoms selected from the group consisting of N and O, wherein the substituted heteroaryl consisting of 6 to 10 atoms is substituted with one or more chloro; or heterocycloalkyl consisting of 6 to 8 atoms containing one or more heteroatoms selected from the group consisting of N and O;

$R^2$ is hydrogen or straight or branched $C_1$-$C_3$ alkyl;

$R^3$ is $C_6$-$C_{10}$ aryl substituted with one or more methoxy groups; or substituted or unsubstituted morpholinyl or piperazinyl, wherein the substituted morpholinyl or piperazinyl is substituted with one or more hydroxyl ethyl groups; and $R^4$ is —$CH_2F$, —$CHF_2$, —$CF_3$, —$CH_2Cl$, —$CHCl_2$, —$CCl_3$, —$CH_2Br$, —$CHBr_2$, or —$CBr_3$, or L is single bond;

$R^1$ is $C_3$-$C_6$ cycloalkyl; substituted or unsubstituted $C_6$-$C_{10}$ aryl, wherein the substituted $C_6$-$C_{10}$ aryl is substituted with one or more substituents selected from the group consisting of fluoro, —$NH_2$, methoxy and isopropyl; substituted or unsubstituted heteroaryl consisting of 6 to 10 atoms containing one or more heteroatoms selected from the group consisting of N and O, wherein the substituted heteroaryl consisting of 6 to 10 atoms is substituted with one or more chloro; or heterocycloalkyl consisting of 6 to 8 atoms containing one or more heteroatoms selected from the group consisting of N and O;

$R^2$ is hydrogen or straight or branched $C_1$-$C_3$ alkyl;

$R^3$ is $C_6$-$C_{10}$ aryl substituted with one or more methoxy groups; or substituted or unsubstituted morpholinyl or piperazinyl, wherein the substituted morpholinyl or piperazinyl is substituted with one or more hydroxyl ethyl groups; and $R^4$ is —$SR^5$ or $SO_2R^5$, wherein $R^5$ is straight or branched $C_1$-$C_3$ alkyl, or L is straight or branched $C_1$-$C_3$ alkylene;

$R^1$ is hydrogen; $C_3$-$C_6$ cycloalkyl; substituted or unsubstituted $C_6$-$C_{10}$ aryl, wherein the substituted $C_6$-$C_{10}$ aryl is substituted with one or more substituents selected from the group consisting of fluoro, —$NH_2$, methoxy and isopropyl; substituted or unsubstituted heteroaryl consisting of 6 to 10 atoms containing one or more heteroatoms selected from the group consisting of N and O, wherein the substituted heteroaryl consisting of 6 to 10 atoms is substituted with one or more chloro; or heterocycloalkyl consisting of 6 to 8 atoms containing one or more heteroatoms selected from the group consisting of N and O;

$R^2$ is hydrogen or straight or branched $C_1$-$C_3$ alkyl;

$R^3$ is substituted or unsubstituted morpholinyl or piperazinyl, wherein the substituted morpholinyl or piperazinyl is substituted with one or more hydroxyl ethyl groups; and $R^4$ is —$SR^5$ or $SO_2R^5$, wherein $R^5$ is straight or branched $C_1$-$C_3$ alkyl.

3. The compound, the optical isomer thereof or the pharmaceutically acceptable salt thereof according to claim 1, wherein:

L is single bond, —$CH_2$— or —$CH_2CH_2$—;

$R^1$ is hydrogen, cyclopropyl, morpholinyl, tetrahydropyranyl, indolyl, phenyl or pyridinyl unsubstituted or substituted with one or more chloro; wherein phenyl can be substituted with one or more substituents selected from the group consisting of methoxy, fluoro, isopropyl and —$NH_2$;

$R^2$ is hydrogen, methyl or ethyl;

$R^3$ is morpholinyl; phenyl unsubstituted or substituted with one or more methoxy; or piperazinyl unsubstituted or substituted with one or more hydroxy ethyl groups; and $R^4$ is —$CHF_2$, —$CH_2F$, or —$CF_3$, or wherein, L is single bond;

$R^1$ is cyclopropyl, morpholinyl, tetrahydropyranyl, indolyl, phenyl or pyridinyl unsubstituted or substituted with one or more chloro; wherein phenyl can be substituted with one or more substituents selected from the group consisting of methoxy, fluoro, isopropyl and —$NH_2$;

$R^2$ is hydrogen, methyl or ethyl;

$R^3$ is morpholinyl; phenyl unsubstituted or substituted with one or more methoxy; or piperazinyl unsubstituted or substituted with one or more hydroxy ethyl groups; and $R^4$ is —$SCH_3$ or —$SO_2CH_3$, or wherein, L is —$CH2$— or —$CH_2CH_2$—;

$R^1$ is cyclopropyl, morpholinyl, tetrahydropyranyl, indolyl, phenyl or pyridinyl unsubstituted or substituted with one or more chloro; wherein phenyl can be substituted with one or more substituents selected from the group consisting of methoxy, fluoro, isopropyl and —$NH_2$;

$R^2$ is hydrogen, methyl or ethyl;

$R^3$ is morpholinyl or or piperazinyl unsubstituted or substituted with one or more hydroxy ethyl groups; and $R^4$ is —$SCH_3$ or $SO_2CH_3$.

4. The compound, the optical isomer thereof or the pharmaceutically acceptable salt thereof according to claim 1, wherein:

L is single bond or —$CH_2CH_2$—;

$R^1$ is hydrogen,

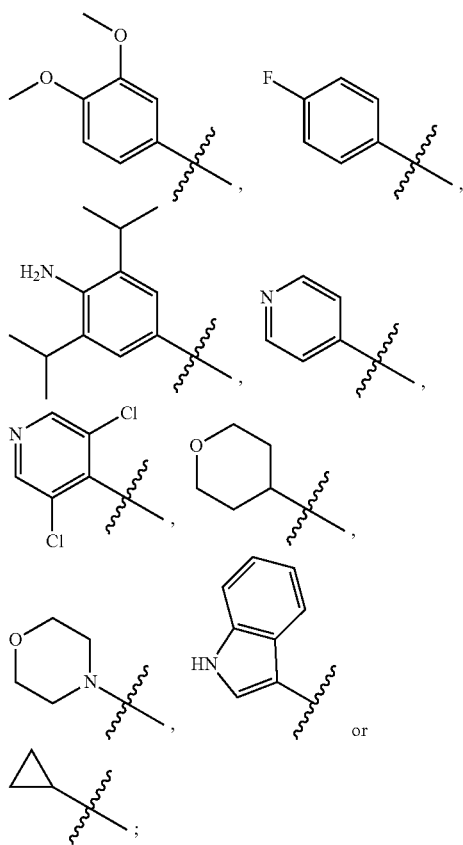

R² is hydrogen or ethyl;
R³ is
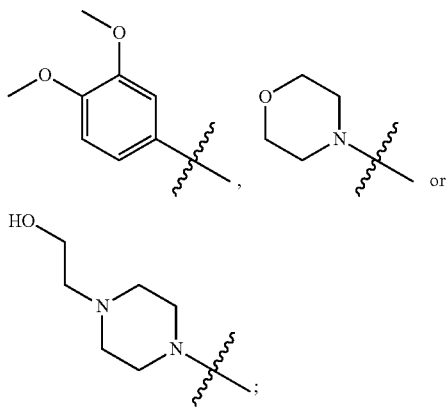
and
R⁴ is —CF₃,
or
wherein
L is single bond;
R¹ is
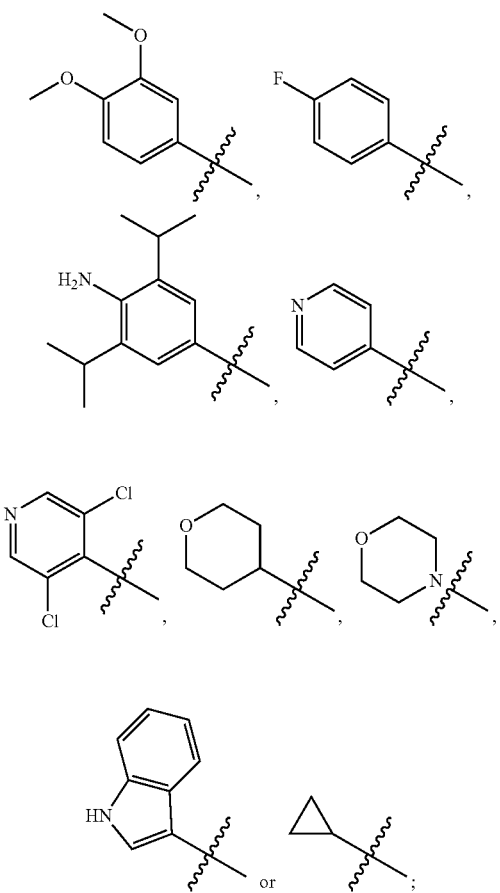
R² is hydrogen or ethyl;
R³ is
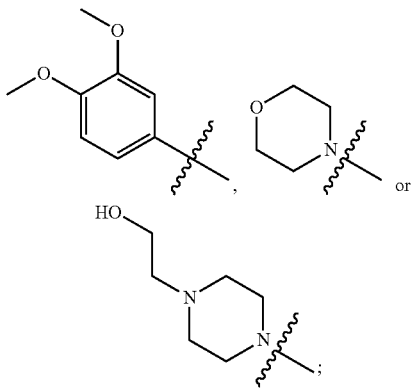
and
R⁴ is —SCH₃ or —SO₂CH₃,
or
wherein
L is —CH₂CH₂—;
R¹ is
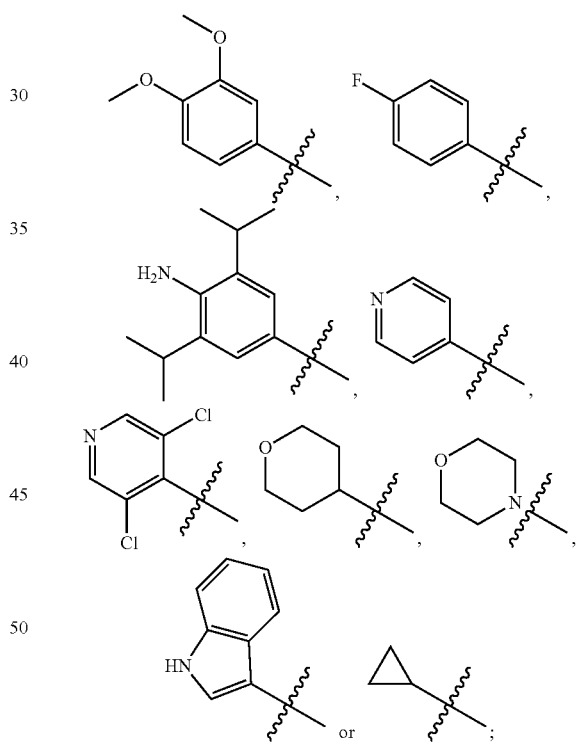
R² is hydrogen or ethyl;
R³ is
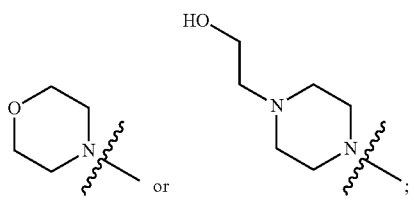

and
R⁴ is —SCH₃ or SO₂CH₃.

5. A preparation method of a compound represented by Formula 1 of claim 1 comprising the step of preparing a compound represented by Formula 1 by reacting the compound represented by Formula 2 with a compound represented by Formula 3, as shown in Reaction Formula 1 below:

[Reaction Formula 1]

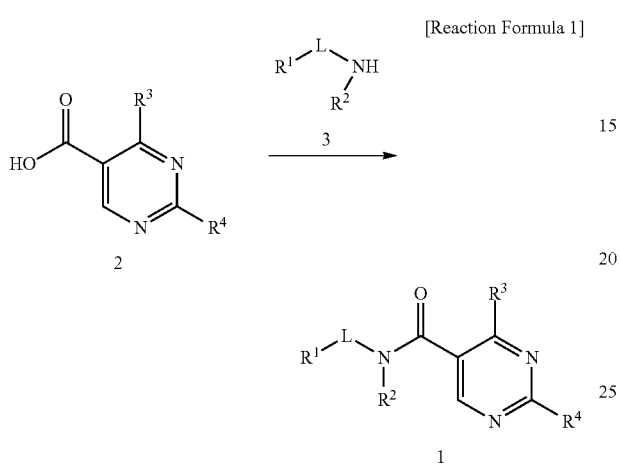

wherein, L, R¹, R², R³ and R⁴ are as defined in formula 1 of claim 1.

6. A method for treating an inflamuna dermatitis comprising:
administering a pharmaceutically effective amount of a compound of claim 1 to a subject in need thereof.

7. A compound, the optical isomer thereof or the pharmaceutically acceptable salt thereof, wherein the compound is selected from the group consisting of the following compounds:
(1) N-(3,4-dimethoxyphenyl)-2-(methylthio)-4-morpholinopyrimidine-5-carboxamide;
(2) N-(3,5-dichloropyridine-4-yl)-4-(3,4-dimethoxyphenyl)-2-(methylthio) pyrimidine-5-carboxamide;
(3) 4-(3,4-dimethoxyphenyl)-2-(methylthio)-N-(pyridine-4-yl) pyrimidine-5-carboxamide;
(4) N-(2-(1H-indole-3-yl) ethyl)-2-(methylthio)-4-morpholinopyrimidine-5-carboxamide;
(5) 4-(3,4-dimethoxyphenyl)-2-(methylthio)-N-(tetrahydro-2H-pyran-4-yl) pyrimidine-5-carboxamide;
(6) N-(4-fluorophenyl)-2-(methylthio)-4-morpholinopyrimidine-5-carboxamide;
(7) N-(3,4-dimethoxyphenetyl)-2-(methylthio)-4-morpholinopyrimidine-5-carboxamide;
(8) N-(2,4-dimethoxybenzyl)-4-morpholino-2-(trifluoromethyl) pyrimidine-5-carboxamide;
(9) N-(2,4-dimethoxybenzyl)-2-(methylthio)-4-morpholinopyrimidine-5-carboxamide;
(10) N-(3,5-dichloropyridine-4-yl)-2-(methylthio)-4-morpholinopyrimidine-5-carboxamide;
(11) N-(3,4-dimethoxyphenyl)-4-morpholino-2-(trifluoromethyl) pyrimidine-5-carboxamide;
(12) 4-(3,4-dimethoxyphenyl)-N-(tetrahydro-2H-pyran-4-yl)-2-(trifluoromethyl) pyrimidine-5-carboxamide;
(13) 4-(3,4-dimethoxyphenyl)-N,N-diethyl-2-(trifluoromethyl) pyrimidine-5-carboxamide;
(14) 4-(3,4-dimethoxyphenyl)-2-(methylsulfonyl)-N-(tetrahydro-2H-pyran-4-yl) pyrimidine-5-carboxamide;
(15) N-cyclopropyl-4-(3,4-dimethoxyphenyl)-2-(trifluoromethyl) pyrimidine-5-carboxamide;
(16) N-(3,5-dichloropyridine-4-yl)-4-(3,4-dimethoxyphenyl)-2-(trifluoromethyl) pyrimidine-5-carboxamide;
(17) 4-(3,4-dimethoxyphenyl)-N,N-diethyl-2-(methylthio) pyrimidine-5-carboxamide;
(18) N-cyclopropyl-4-(3,4-dimethoxyphenyl)-2-(methylthio) pyrimidine-5-carboxamide;
(19) N-cyclopropyl-4-(3,4-dimethoxyphenyl)-2-(methylsulfonyl) pyrimidine-5-carboxamide;
(20) N-(4-amino-3,5-diisopropylphenyl)-4-(3,4-dimethoxyphenyl)-2-(methylthio) pyrimidine-5-carboxamide;
(21) N-(4-amino-3,5-diisopropylphenyl)-4-(3,4-dimethoxyphenyl)-2-(trifluoromethyl) pyrimidine-5-carboxamide;
(22) N-(3,4-dimethoxyphenyl)-4-(4-(2-hydroxyethyl) piperazine-1-yl)-2-(methylthio) pyrimidine-5-carboxamide;
(23) N-(3,4-dimethoxyphenetyl)-4-morpholino-2-(trifluoromethyl) pyrimidine-5-carboxamide;
(24) N-(2-(1H-indole-3-yl) ethyl)-4-morpholino-2-(trifluoromethyl) pyrimidine-5-carboxamide;
(25) 4-(3,4-dimethoxyphenyl)-N-(pyridine-4-yl)-2-(trifluoromethyl) pyrimidine-5-carboxamide;
(26) 4-(3,4-dimethoxyphenyl)-N-(2-morpholinoethyl)-2-(trifluoromethyl) pyrimidine-5-carboxamide;
(27) 4-(3,4-dimethoxyphenyl)-2-(methylthio)-N-(2-morpholinoethyl) pyrimidine-5-carboxamide;
(28) N-(3,4-dimethoxyphenetyl)-4-(4-(2-hydroxyethyl) piperazine-1-yl)-2-(methylthio) pyrimidine-5-carboxamide;
(29) N,4-bis (3,4-dimethoxyphenyl)-2-(methylthio) pyrimidine-5-carboxamide; and
(30) N,4-bis (3,4-dimethoxyphenyl)-2-(trifluoromethyl) pyrimidine-5-carboxamide.

8. A method for treating an atopic dermatitis comprising:
administering a pharmaceutically effective amount of a compound of claim 7 to a subject in need thereof.

* * * * *